United States Patent
Hato et al.

(10) Patent No.: US 7,792,100 B2
(45) Date of Patent: Sep. 7, 2010

(54) USER MAC FRAME TRANSFER METHOD EDGE TRANSFER DEVICE, AND PROGRAM

(75) Inventors: Kunio Hato, Tokyo (JP); Muneyoshi Suzuki, Tokyo (JP); Fumio Katayama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1402 days.

(21) Appl. No.: 10/543,236

(22) PCT Filed: Jan. 17, 2005

(86) PCT No.: PCT/JP2005/000480

§ 371 (c)(1),
(2), (4) Date: Jul. 21, 2005

(87) PCT Pub. No.: WO2005/069551

PCT Pub. Date: Jul. 28, 2005

(65) Prior Publication Data

US 2006/0248227 A1    Nov. 2, 2006

(30) Foreign Application Priority Data

Jan. 16, 2004 (JP) .............................. 2004-009482
Jun. 11, 2004 (JP) .............................. 2004-173744
Oct. 5, 2004 (JP) .............................. 2004-292423

(51) Int. Cl.
H04L 12/28 (2006.01)
(52) U.S. Cl. ..................................... 370/389; 709/245
(58) Field of Classification Search ................. 370/389, 370/401, 402; 709/230, 243
See application file for complete search history.

(56) References Cited

U.S. PATENT DOCUMENTS

| | | | | |
|---|---|---|---|---|
| 5,999,536 | A * | 12/1999 | Kawafuji et al. | 370/401 |
| 7,072,346 | B2 * | 7/2006 | Hama | 370/395.53 |
| 7,436,784 | B2 * | 10/2008 | Hashimoto | 370/258 |
| 2003/0152075 | A1 * | 8/2003 | Hawthorne et al. | 370/389 |

FOREIGN PATENT DOCUMENTS

| | | |
|---|---|---|
| JP | 05-235942 A | 9/1993 |
| JP | 2001-197114 A | 7/2001 |
| JP | 2002-344476 A | 11/2002 |
| JP | 2003-273911 A | 9/2003 |
| JP | 2003-324462 A | 11/2003 |

* cited by examiner

Primary Examiner—Dang T Ton
Assistant Examiner—Wei Zhao
(74) Attorney, Agent, or Firm—Blakely, Sokoloff, Taylor & Zafman LLP

(57) ABSTRACT

An edge Bridge (2A) executes Ethernet encapsulation. Even when redundant MAC addresses are used in the network of a customer, the MAC address of the customer is not referred to in a backbone network (1). Since forwarding is done on the basis of a MAC address added by the edge Bridge (2A), correct forwarding is possible. Additionally, in the edge Bridge (2A), a Service VLAN ID based on the customer-facing port which has received a customer MAC frame and the VLAN ID in the customer MAC frame is added to the customer MAC frame, thereby building a completely closed network for each customer. The customer can belong to a plurality of Service VLANs through a single customer-facing port and select, by a VLAN ID, a Service VLAN to which he/she should belong.

45 Claims, 35 Drawing Sheets

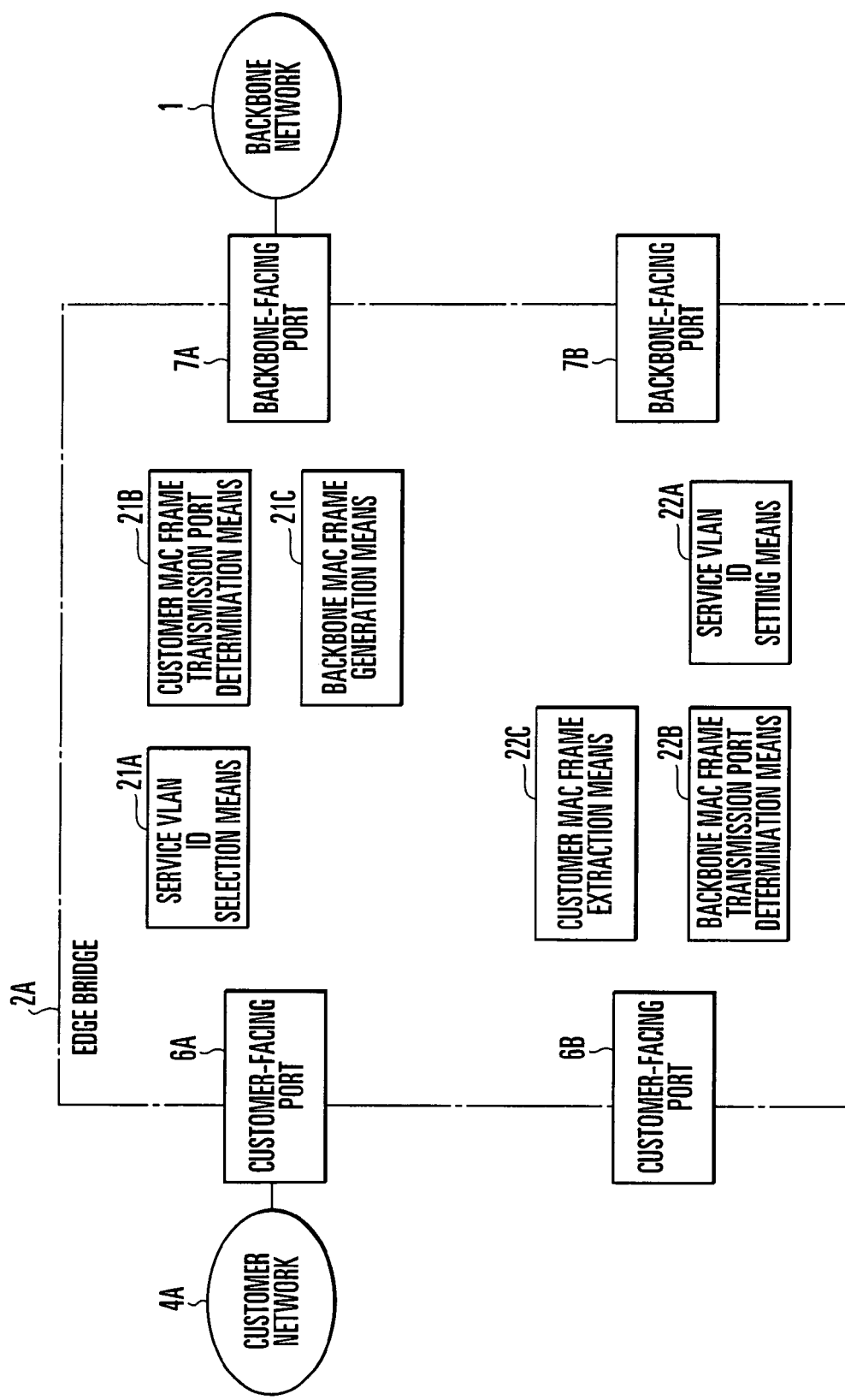

SERVICE VLAN DETERMINATION TABLE 10A

| PORT NUMBER | SERVICE VLAN ID |
|---|---|
| | |
| | |
| | |

FIG.3A

VLAN OPERATION PRESENCE/ABCENCE TABLE 10B

| PORT NUMBER | PRESENCE/ABSENCE OF VLAN FILTER | PRESENCE/ABSENCE OF SERVICE VLAN/VLAN CONVERSION |
|---|---|---|
| | | |
| | | |
| | | |

FIG.3B

SERVICE VLAN/VLAN CONVERSION TABLE 10C

| PORT NUMBER | VLAN ID | SERVICE VLAN ID | VLAN ID |
|---|---|---|---|
| | | | |
| | | | |
| | | | |

FIG.3C

VLAN FILTER TABLE 10D

| PORT NUMBER | VLAN ID GROUP |
|---|---|
| | |
| | |
| | |

FIG.3D

FORWARDING TABLE

FLOODING FORWARDING TABLE

BACKBONE PORT TABLE

VLAN OPERATION PRESENCE/ABCENCE TABLE     11A

| PORT NUMBER | PRESENCE/ABSENCE OF VLAN FILTER | PRESENCE/ABSENCE OF SERVICE VLAN/VLAN CONVERSION |
|---|---|---|
|  |  |  |
|  |  |  |
|  |  |  |

FIG.4A

VLAN FILTER TABLE    11B

| PORT NUMBER | VLAN ID GROUP |
|---|---|
|  |  |
|  |  |
|  |  |

FIG.4B

SERVICE VLAN DETERMINATION TABLE    11C

| PORT NUMBER | SERVICE VLAN ID |
|---|---|
|  |  |
|  |  |
|  |  |

FIG.4C

SERVICE VLAN/VLAN CONVERSION TABLE    11D

| PORT NUMBER | SERVICE VLAN ID | VLAN ID | SERVICE VLAN ID | VLAN ID |
|---|---|---|---|---|
|  |  |  |  |  |
|  |  |  |  |  |
|  |  |  |  |  |

FIG.4D

| FORWARDING TABLE | | | | | 13A |
|---|---|---|---|---|---|
| SERVICE VLAN ID | VLAN ID | DESTINATION MAC ADDRESS | DESTINATION BACKBONE MAC ADDRESS | BACKBONE-FACING PORT | CUSTOMER-FACING PORT |
| | | | | | |
| | | | | | |
| | | | | | |

SERVICE VLAN TABLE

| PORT NUMBER | VLAN ID | PROVIDER VLAN ID | SERVICE VLAN ID |
|---|---|---|---|
|  |  |  |  |
|  |  |  |  |
|  |  |  |  |

VLAN TABLE

| PORT NUMBER | VLAN ID | SERVICE VLAN ID | VLAN ID |
|---|---|---|---|
|  |  |  |  |
|  |  |  |  |
|  |  |  |  |

SERVICE VLAN TABLE

| PORT NUMBER | VLAN ID | PROVIDER VLAN ID | SERVICE VLAN ID | VLAN ID |
|---|---|---|---|---|
| | | | | |
| | | | | |
| | | | | |

PROVIDER VLAN TABLE

| PORT NUMBER | VLAN ID | SERVICE VLAN ID | SERVICE VLAN ID | VLAN ID |
|---|---|---|---|---|
| | | | | |
| | | | | |
| | | | | |

USER MAC FRAME TRANSFER METHOD EDGE TRANSFER DEVICE, AND PROGRAM

TECHNICAL FIELD

The present invention relates to a technique of a network system which is connected to a plurality of networks to provide a wide area network service and, more particularly, to a customer MAC frame forwarding technique in Ethernet communication suitable for a VPN service which groups a number of Ethernet (registered trademark) networks and provides virtually closed connection in the group.

BACKGROUND ART

The market of wide area LAN services using the Ethernet technology is rapidly developing in recent years. The dedicated line service of company networks has been inherited by the ATM service to integrate voice and data and the frame backbone service specialized to data, and developed into IP-VPN (IP-Virtual Private Network) oriented to network outsourcing and the wide area LAN service which virtually connects already built LANs. In the wide area LAN communication, when a customer ID of a VLAN (Virtual LAN) is given to a customer, a logical private network, i.e., VPN (Virtual Private Network) can be provided.

In the VPN service, the wide area LAN service can use the provided public network as if it were a dedicated line. The VPN service is called a virtual closed network or virtual private network. More specifically, in this service a customer telephone network can be used like extensions in a company. A customer such as a company prepares an arbitrary telephone number system of two to seven digits. VPN customers can freely call each other by using the telephone numbers. Even in data communication, data is transmitted/received by using a VLAN stack frame, like the telephone. In the VPN service, data is forwarded by using a customer MAC frame (Customer's Media Access Control Frame: also called an Ethernet frame).

[Address Space in Customer MAC frame Forwarding]

The address space in conventional customer MAC frame forwarding will be described.

FIG. 9 is a view showing a conventional VLAN stack frame format.

In the header of a conventional VLAN stack frame format 12E, the destination MAC address, source MAC address, VLAN tag, VLAN tag, type ID, customer data, and FCS (Frame Check Sequence) are transmitted in this order. In each VLAN tag, the type ID, priority, CFI (Canonical Format Indicator), and VLAN ID are transmitted in this order.

When a customer MAC frame forwarded from a customer network is received, the destination MAC address and VLAN ID contained in the header information of the customer MAC frame, the number of the port which has received the customer MAC frame, and the Service VLAN ID set for the port number in advance are analyzed. The Service VLAN ID is added to the customer MAC frame as a VLAN tag. By using the Service VLAN ID and destination MAC address as keys, the port to transmit is searched from a forwarding table which is learned in advance. The received customer MAC frame is transmitted to that port.

A Bridge in the backbone network analyzes the destination MAC address and Service VLAN ID contained in the header information of the customer MAC frame. By using the Service VLAN ID and destination MAC address as keys, the port to transmit is searched from a forwarding table which is learned in advance. The received customer MAC frame is transmitted to that port.

In the above-described prior art, the backbone network and customer network are managed on the basis of the same address system. The Bridge in the backbone network must search for the destination for all addresses on the customer network connected to the backbone network. In addition, since the Service VLAN ID is implemented by 12 bits, the possible range is limited to 4,096. Furthermore, the Bridge in the backbone network does not refer to the VLAN ID and cannot therefore identify terminals which have the same destination MAC address on different VLANs in the same VPN.

Examples of proposals similar to the conventional method are "Simple Bridge Apparatus" in Japanese Patent Laid-Open No. 5-235942 (to be referred to as a first prior art hereinafter), "Frame Forwarding Method and Frame Bridge" in Japanese Patent Laid-Open No. 2003-273911 to be referred to as a second prior art hereinafter), and "Method used in Packet Communication and Edge Switch" in Japanese Patent Laid-Open No. 2002-344476 (to be referred to as a third prior art hereinafter).

In the first prior art, a station address management unit for the secondary LAN is provided in a bridge HUB. A frame conversion unit in the bridge HUB encapsulates a frame to be communicated between stations connected to the primary LAN into data of the secondary LAN so the frame is not succeeded to the destination address of a frame of the secondary LAN.

The destination address is used to succeed only a frame to be communicated between a station connected to the primary LAN and a station connected to the secondary LAN. In this arrangement, processing by the frame conversion unit is simple as compared to an arrangement to convert all frames transparently. The requirement for the bridge processing speed is relaxed, and the apparatus can be implemented at a low cost.

However, the first prior art has no function as a VPN to virtually connect a plurality of primary LANs.

In the frame forwarding method of the second prior art, a forwarding route to forward a frame is set between nodes in the network. A terminal to send a frame or a node outside the forwarding route is to transmit a frame which should be forwarded through the forwarding route, forwarding route selection information about the forwarding route and output line information about the output line of the node of the terminal of the forwarding route are written in the frame from frame forwarding destination information in the frame. Then, the frame is transmitted. In this case, the node of the start of the forwarding route determines, on the basis of the forwarding route selection information in the frame, the forwarding route to be used for forwarding, and transmits the frame to the forwarding route. The node of the terminal of the forwarding route determines, on the basis of the output line information in the frame, the output line to which the frame should be output from the node, and transmits the frame to the output line. With this arrangement, a network capable of accommodating a larger number of VPNs can be provided.

In the second prior art, however, forwarding routes to forward a frame must be set in advance between all nodes in the network.

In the third prior art, each original Ethernet packet (EP) generated in the first network of a company, customer, or network service provider is encapsulated into another EP. This EP is given an interface address between the first Ethernet network (EN) and a second EN such as a metropolitan EN.

The encapsulated packet is transmitted in accordance with this address. When the encapsulated packet exceeds the permitted EP length, the original EP is divided by the interface between the first and second networks. Resultant divided parts are encapsulated as two encapsulated packets.

In this prior art, however, since the VPN ID is expressed by 12 bits, the possible range is limited to 4,096. Additionally, since the VPN space has no hierarchical structure, management is cumbersome. As the address to be used for forwarding in the backbone network, the address of a customer-facing port is used. For this reason, if the number of customer-facing ports increases, the number of addresses in the backbone network increases. The entity (VPN) is determined on the basis of the input port of the packet (paragraph [0022] of this prior art). Hence, the input ports and VPNs can permit only a one-to-one relationship. To belong to a plurality of VPNs, a plurality of input ports and a plurality of logical lines to connect to the input ports are necessary.

[Mutual Connection Between Stacked VLAN Network and Backbone Network]

Conventional mutual connection between a stacked VLAN network and a backbone network will be described next.

FIG. 23 is an explanatory view showing a conventional customer MAC frame forwarding method.

Referring to FIG. 23, a stacked VLAN/MAC frame forwarded from a stacked VLAN network 4E is received by a stacked VLAN port 6E of a stacked VLAN edge Bridge 2S. When a stacked VLAN/MAC frame forwarded from a stacked VLAN network 4F, it is received by a stacked VLAN port 6F. By using the destination MAC address, Provider VLAN ID, and VLAN ID contained in the header information of the received stacked VLAN/MAC frame as keys, the stacked VLAN edge Bridge 2S searches for the port to transmit from a forwarding table which is learned in advance.

The received stacked VLAN/MAC frame is converted into a customer MAC frame by removing the Provider VLAN ID information and the like from the stacked VLAN/MAC frame. The customer MAC frame is transmitted to found ports 8A to 8K.

An edge Bridge 2Q receives the customer MAC frame by customer-facing ports 9A to 9K and analyzes the destination MAC address and VLAN ID contained in the header information of the customer MAC frame, the number of the port which has received the customer MAC frame, and the Service VLAN ID set for the port number in advance. By using the Service VLAN ID, VLAN ID, and destination MAC address as keys, the backbone MAC address to transmit is searched from a forwarding table which is learned in advance, and a port to transmit is searched on the basis of the backbone MAC address. The customer MAC frame is encapsulated into a backbone MAC frame. The backbone MAC frame is transmitted to backbone-facing ports 7A and 7B.

In this prior art, to mutually connect the stacked VLAN networks 4E and 4F to a backbone network 1, two apparatuses, i.e., the stacked VLAN edge Bridge 2S and edge Bridge 2Q are necessary.

In addition, there is no means for identifying the Provider VLAN and Service VLAN of the customer MAC frame forwarded between the two, stacked VLAN edge Bridge 2S and edge Bridge 2Q.

As an alternate means for identifying the Provider VLAN and Service VLAN of the customer MAC frame, ports are prepared for the respective Provider VLANs and Service VLANs. The ports of corresponding Provider VLAN and Service VLAN are connected by a cable. In this case, to accommodate a number of Provider VLANs and Service VLANs, a number of ports and cables are necessary, and management of them is complex.

In addition, to connect an arbitrary VLAN belonging to an arbitrary Provider VLAN and an arbitrary VLAN belonging to an arbitrary Service VLAN, setting for it is necessary for both the stacked VLAN edge Bridge 2S and the edge Bridge 2Q. To identify the connection relationship, individual ports and cables are necessary for both apparatuses.

Furthermore, in the second and third prior arts, the stacked VLAN network and backbone network cannot be connected.

[Generation of Loop in Backbone Network]

Generation of a frame forwarding loop in the backbone network will be described next.

FIG. 37 is a view showing a customer MAC frame forwarding method according to a prior art.

In this prior art, upon receiving a customer MAC frame from a customer-facing port 6A or 6B, an edge Bridge 2 identifies the Service VLAN ID corresponding to the customer MAC frame on the basis of the customer-facing port and the VLAN ID of the customer MAC frame. To transmit the customer MAC frame from the backbone-facing port 7A or 7B, the customer MAC frame is encapsulated into a backbone MAC frame and transmitted to a backbone network 1A or 1B.

Upon receiving a backbone MAC frame from the backbone-facing port 7A or 7B, the edge Bridge 2 sets, as the Service VLAN ID contained in the backbone MAC frame, the Service VLAN ID corresponding to the customer MAC frame contained in the backbone MAC frame. To transmit the backbone MAC frame from the customer-facing port 6A or 6B, the customer MAC frame is extracted from the backbone MAC frame and transmitted.

A Bridge (not shown) in the backbone network 1A or 1B analyzes the destination backbone MAC address and Service VLAN ID contained in the header information of the backbone MAC frame. By using the Service VLAN ID and destination backbone MAC address as keys, a port to transmit is searched from a forwarding table which is learned in advance. The backbone MAC frame is transmitted to that port.

In this prior art, when the edge Bridge 2 receives, from a backbone-facing port, a backbone MAC frame that the apparatus itself has transmitted from a backbone-facing port, it cannot be determined because no means for detecting it is present, and a loop may be generated. In addition, even when a loop is generated in the backbone network connected to the backbone-facing port, the loop cannot be detected.

In the above prior art, when the source address of the backbone MAC frame which the edge Bridge 2 has received from the backbone-facing port is an invalid address such as a broadcast address or multicast address, it cannot be determined because no means for detecting it is present, and the frame may be forwarded.

In the above prior art, when the edge Bridge 2 executes loop-back forwarding between the backbone-facing ports, and the destination address of the backbone MAC frame received from the backbone-facing port is not the address of the edge Bridge, it cannot be determined because no means for detecting it is present, and the frame may be forwarded.

In the above prior art, even when a loop is generated in backbone MAC frame forwarding, the position of the loop cannot be specified.

FIG. 31 is a view showing a VLAN stack frame format 15C of a prior art.

In this prior art, the edge Bridge 2 receives a customer MAC frame forwarded from a customer network and analyzes the destination MAC address and VLAN ID contained in the header information of the customer MAC frame, the number of the port which has received the customer MAC frame, and the Service VLAN ID set for the port number in advance.

The Service VLAN ID is added to the customer MAC frame as a VLAN tag. By using the Service VLAN ID and destination MAC address as keys, a port to transmit is searched from a forwarding table which is learned in advance. The customer MAC frame is transmitted to that port.

A Bridge (not shown) in the backbone network 1A or 1B analyzes the destination MAC address and Service VLAN ID contained in the header information of the customer MAC frame. By using the Service VLAN ID and destination address as keys, a port to transmit is searched from a forwarding table which is learned in advance. The customer MAC frame is transmitted to that port.

In this prior art, when the edge Bridge receives, from a backbone-facing port, a stacked VLAN/MAC frame that the apparatus itself has transmitted from a backbone-facing port, it cannot be determined because no means for detecting it is present, and a loop may be generated. In addition, even when a loop is generated in the backbone network connected to the backbone-facing port, the loop cannot be detected.

In the above prior art, even when a loop is generated in stacked VLAN/MAC frame forwarding, the position of the loop cannot be specified.

The customer MAC frame forwarding technique in Ethernet communication is currently being standardized under the name of "802.1ad Provider Bridges" in IEEE (Institute of Electric and Electronics Engineers). No patent references which describe the contents of technique of this type could not be found at the time of patent application.

DISCLOSURE OF INVENTION

Problem to be Solved by the Invention

As described above, the prior arts have the following problems in relation to the address space in customer MAC frame forwarding.
(1) Address Space Separation:
  When a network becomes wide, and a number of terminals are connected, the number of MAC addresses to be processed in a Bridge in a backbone network increases, and the forwarding table becomes bulky. Hence, the time required for address resolution increases, the customer MAC frame forwarding speed decreases, and the stitch manufacturing cost increases in proportion to the table size. When the number of terminals connected to the network exceeds the upper limit of the table size, no MAC address can be registered in the table, and the destination cannot appropriately be searched. In addition, the Bridge on the backbone network cannot identify terminals which have the same destination MAC address on different VLANs in the same VPN.
(2) A Plurality of Service VLAN IDs
  Since the possible range of a Service VLAN ID is limited to 4,096, VPNs necessary for the telecommunications carrier cannot be set enough. Additionally, since the VPN space has no hierarchical structure, management is cumbersome.
(3) Address Assignment Position
  A customer-facing port is used as the address to be used for forwarding in the backbone network. In this case, if the number of customer-facing ports increases, the number of addresses in the backbone network increases.
(4) Customer-Facing Port
  To make a Service VLAN ID correspond to a customer-facing port of reception, a customer can be connected to only a specific VPN for each customer-facing port. To connect to a plurality of VPNs, a plurality of customer-facing ports are necessary.

In addition, the prior arts have the following problems in relation to mutual connection between a stacked VLAN network and a backbone network.
(5) To mutually connect a stacked VLAN network to a backbone network, two apparatuses, i.e., a stacked VLAN edge Bridge and edge Bridge are necessary.
(6) There is no means for identifying the Provider VLAN and Service VLAN of a customer MAC frame forwarded between the two, stacked VLAN edge Bridge and edge Bridge.
(7) As an alternate means for identifying the Provider VLAN and Service VLAN of a customer MAC frame, ports are prepared for the respective Provider VLANs and Service VLANs. The ports of corresponding Provider VLAN and Service VLAN are connected by a cable. In this case, to accommodate a number of Provider VLANs and Service VLANs, a number of ports and cables are necessary, and management of them is complex.
(8) To connect an arbitrary VLAN belonging to an arbitrary Provider VLAN and an arbitrary VLAN belonging to an arbitrary Service VLAN, setting for it is necessary for both the stacked VLAN edge Bridge and the edge Bridge. To identify the connection relationship, individual ports and cables are necessary for both apparatuses.
(9) When the stacked VLAN network and backbone network are mutually connected, the edge Bridge must execute conversion of the provider and Service VLAN at a high speed.
(10) A table having an enormous memory space is necessary for conversion of a Provider VLAN ID and Service VLAN ID.

Furthermore, the prior arts have the following problems in relation to generation of a loop in a backbone network.
(11) Loop Detection and Frame Loss
  When an edge Bridge receives a backbone MAC frame from a backbone-facing port, a loop may be generated. In addition, even when a loop is generated in the backbone network connected to the backbone-facing port, the loop cannot be detected.
(12) Loss of Frame with Invalid Source Address
  When the source address of a backbone MAC frame which an edge Bridge has received from a backbone-facing port is an invalid address such as a broadcast address or multicast address, it cannot be determined because no means for detecting it is present, and the frame may be forwarded.
(13) Loss of Frame Addressed to Another Apparatus
  When an edge Bridge does not execute loop-back forwarding between backbone-facing ports, and the destination address of a backbone MAC frame received from the backbone-facing port is not the address of the edge Bridge, it cannot be determined because no means for detecting it is present, and the frame may be forwarded.
(14) Specifying Loop Position
  Even when a loop is generated in backbone MAC frame forwarding, the position of the loop cannot be specified.

The present invention has been made to solve the above problems, and has as its object to provide a customer MAC frame forwarding method, edge Bridge, and program which can increase/decrease the number of MAC addresses to be processed by the switch in the backbone network portion.

It is another object of the present invention to provide a customer MAC frame forwarding method, edge Bridge, and program which can cause an edge Bridge to implement mutual connection between a backbone network and a stacked VLAN network and allow frame switching between a specific Service VLAN in the backbone network and a specific Provider VLAN network in the stacked VLAN network.

It is still another object of the present invention to provide a customer MAC frame forwarding method, edge Bridge, and program which can detect the presence/absence of a loop and the position of the loop in a backbone network to forward a backbone MAC frame.

Means of Solution to the Problems

In order to achieve the above objects, according to the present invention, there is provided a customer MAC frame forwarding method by an edge Bridge which includes a customer-facing port to transmit/receive a customer MAC frame and a backbone-facing port to transmit/receive a backbone MAC frame and in which a backbone MAC frame format containing at least a destination backbone MAC address, a source backbone MAC address, a Service VLAN ID, and a customer MAC frame is predetermined, one or a plurality of Service VLAN IDs corresponding to each customer-facing port are predetermined, and the customer MAC frame is forwarded only between customer-facing ports corresponding to the same Service VLAN ID, comprising the steps of, when an origination-side edge Bridge receives a customer MAC frame from the customer-facing port, selecting a Service VLAN ID corresponding to the customer MAC frame from Service VLAN IDs corresponding to the customer-facing port, determining, on the basis of at least one of the Service VLAN ID, a VLAN ID of the customer MAC frame, and a destination MAC address, at least one customer-facing port and backbone-facing port to transmit the customer MAC frame, when it is determined that the customer MAC frame is to be transmitted from the backbone-facing port, encapsulating the customer MAC frame into a backbone MAC frame, when a termination-side edge Bridge receives the backbone MAC frame from the backbone-facing port, setting the Service VLAN ID corresponding to the customer MAC frame contained in the backbone MAC frame to the Service VLAN ID contained in the backbone MAC frame, determining, on the basis of at least one of the Service VLAN ID, the destination MAC address of the customer MAC frame contained in the backbone MAC frame, the VLAN ID, and the destination backbone MAC address of the backbone MAC frame, the customer-facing port and backbone-facing port to transmit the backbone MAC frame, and when the backbone MAC frame is to be transmitted from the customer-facing port, extracting the customer MAC frame from the backbone MAC frame.

According to the present invention, there is also provided an edge Bridge of a system in which a backbone MAC frame format containing at least a destination backbone MAC address, a source backbone MAC address, a Service VLAN ID, and a customer MAC frame is predetermined, and one or a plurality of Service VLAN IDs corresponding to each customer-facing port are predetermined, comprising means, having a customer-facing port to transmit/receive a customer MAC frame and a backbone-facing port to transmit/receive a backbone MAC frame, for forwarding the customer MAC frame only between customer-facing ports corresponding to the same Service VLAN ID, and storage means for storing a forwarding table to search for one of a set of the destination backbone MAC address and backbone-facing port and the customer-facing port by using a combination of at least one of the Service VLAN ID, the VLAN ID, and the destination MAC address as a search key, a flooding forwarding table to search for at least one backbone-facing port and customer-facing port by using a combination of at least one of the Service VLAN ID and the VLAN ID as a search key, and a backbone-facing port table to search for the backbone-facing port by using the destination backbone MAC address as a search key.

EFFECT OF THE INVENTION

According to the present invention, in a wide area network to which a number of terminals are connected, the edge Bridge executes Ethernet encapsulation. For this reason, the number of MAC addresses to be processed by a switch in the backbone network can greatly be reduced. Hence, the forwarding processing by the switch in the backbone network can be executed at a higher speed and lower cost.

When a Service VLAN ID is added to a customer MAC frame in the edge Bridge, a completely closed network can be built for each customer.

The customer can belong to a plurality of Service VLANs through a single customer-facing port and select, by a VLAN ID, a Service VLAN to which he/she should belong. In addition, the Service VLAN IDs can be managed hierarchically.

BRIEF DESCRIPTION OF DRAWINGS

FIG. 2 is a functional block diagram showing an arrangement example of an edge Bridge according to the first embodiment of the present invention;

FIG. 3A is a view showing an arrangement example of a Service VLAN determination table used in the edge Bridge according to the first embodiment of the present invention;

FIG. 3B is a view showing an arrangement example of a VLAN operation presence/absence table used in the edge Bridge according to the first embodiment of the present invention;

FIG. 3C is a view showing an arrangement example of a Service VLAN/VLAN conversion table used in the edge Bridge according to the first embodiment of the present invention;

FIG. 3D is a view showing an arrangement example of a VLAN filter table used in the edge Bridge according to the first embodiment of the present invention;

FIG. 4A is a view showing an arrangement example of a VLAN operation presence/absence table used in the edge Bridge according to the first embodiment of the present invention;

FIG. 4B is a view showing an arrangement example of a VLAN filter table used in the edge Bridge according to the first embodiment of the present invention;

FIG. 4C is a view showing an arrangement example of a Service VLAN determination table used in the edge Bridge according to the first embodiment of the present invention;

FIG. 4D is a view showing an arrangement example of a Service VLAN/VLAN conversion table used in the edge Bridge according to the first embodiment of the present invention;

BEST MODE FOR CARRYING OUT THE INVENTION

The embodiments of the present invention will be described next with reference to the accompanying drawings.

First Embodiment

Figure 1:
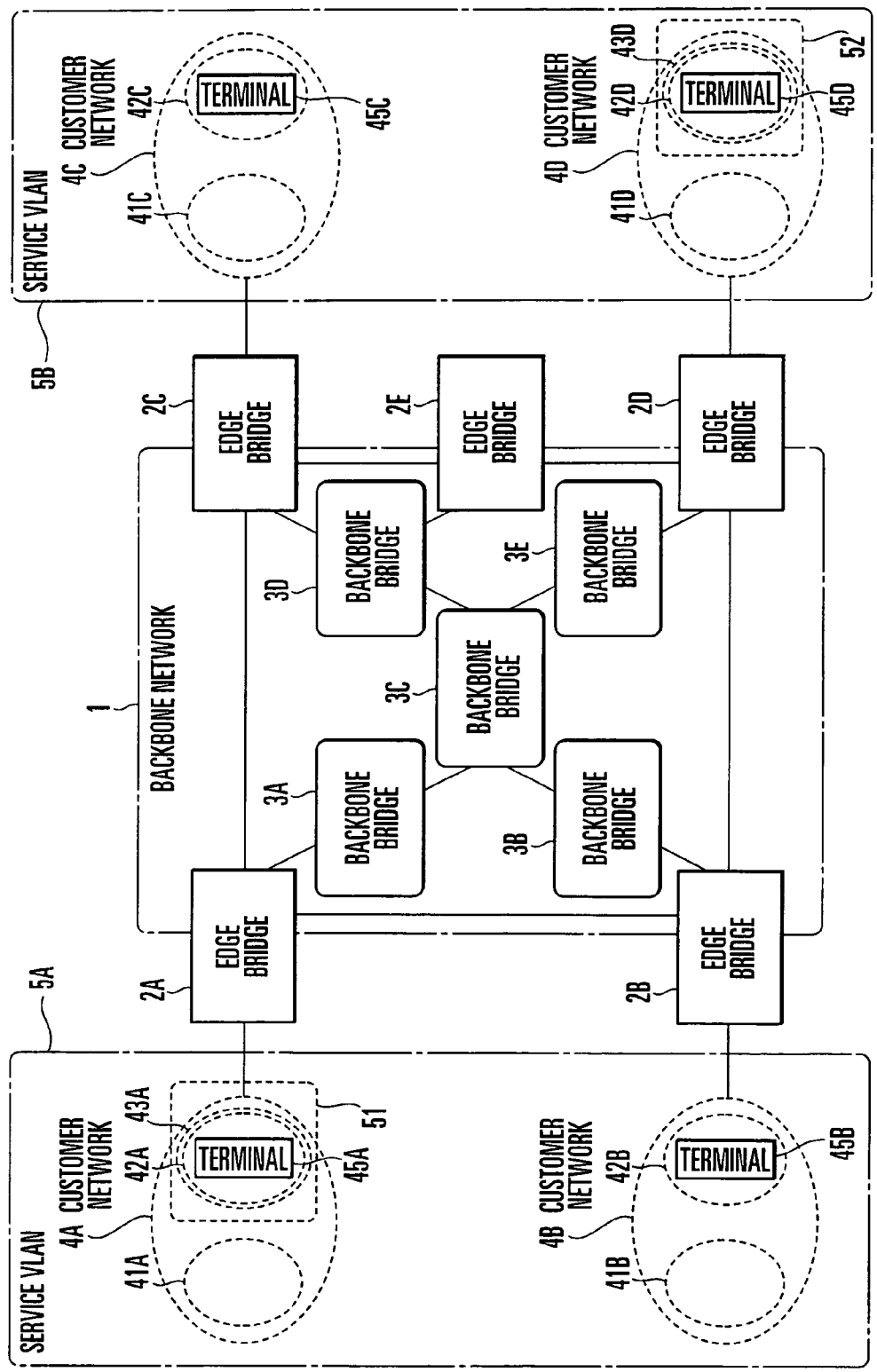
FIG. 1 is a block diagram showing an arrangement example of a network to which a customer MAC frame forwarding method according to the first embodiment of the present invention is applied.

A customer MAC frame forwarding method and edge Bridge according to the first embodiment of the present invention will be described with reference to FIG. 1. FIG. 1 is a block diagram showing an arrangement example of a network to which the customer MAC frame forwarding method according to the first embodiment of the present invention is applied.

Referring to FIG. 1, a backbone network 1 comprises a plurality of edge Bridges 2A to 2E, and a plurality of backbone Bridges 3A to 3E. The backbone network 1 is connected to a customer network 4A through the edge Bridge 2A, to a customer network 4B through the edge Bridge 2B, to a customer network 4C through the edge Bridge 2C, and to a customer network 4D through the edge Bridge 2D. Reference numerals 41A to 41D, 42A to 42D, 43A, and 43D included in the customer networks 4A to 4D denote VLANs; and 45, terminals. Reference numerals 5A, 5B, 51, and 52 denote Service VLANs.

FIG. 2 is a functional block diagram showing an arrangement example of the edge Bridge according to the first embodiment of the present invention.

The edge Bridge 2A has, as functional means necessary for frame forwarding, a Service VLAN ID selection means 21A, customer MAC frame transmission port determination means 21B, backbone MAC frame generation means 21C, Service VLAN ID setting means 22A, backbone MAC frame transmission port determination means 22B, and customer MAC frame extraction means 22C. These functional means may be implemented by an information processing unit (not shown) having a CPU and peripheral circuits thereof. That is, these means are implemented by reading and executing a predetermined program to make the hardware and program cooperate. These means may be formed by a dedicated processing circuit.

The edge Bridge 2A also has customer-facing ports 6A and 6B and backbone-facing ports 7A and 7B. The number of customer-facing ports and the number of backbone-facing ports are determined as needed. A plurality of customer-facing ports or backbone-facing ports need not always be provided.

In FIG. 2, the edge Bridge 2A will be described as an example. The remaining edge Bridges 2B to 2E also have the same arrangement as in FIG. 2.

The Service VLAN ID selection means 21A has a function of, when the edge Bridge receives a customer MAC frame from the customer-facing port 6A or 6B, selecting a Service VLAN ID corresponding to the customer MAC frame from Service VLAN IDs corresponding to the reception customer-facing port 6A or 6B.

The customer MAC frame transmission port determination means 21B has a function of determining at least one customer-facing port 6A or 6B and backbone-facing port 7A or 7B, which are to be used to transmit the customer MAC frame, on the basis of at least one of the Service VLAN ID, and the VLAN ID and destination MAC address of the received customer MAC frame.

The backbone MAC frame generation means 21C has a function of encapsulating the received customer MAC frame into a backbone MAC frame and transmitting it from the backbone-facing port 7A or 7B.

The Service VLAN ID setting means 22A has a function of, when the edge Bridge receives a backbone MAC frame from a backbone-facing port, setting a Service VLAN ID corresponding to a customer MAC frame contained in the backbone MAC frame as the Service VLAN ID contained in the backbone MAC frame.

The backbone MAC frame transmission port determination means 22B has a function of determining the customer-facing port 6A or 6B or the backbone-facing port 7A or 7B to transmit the backbone MAC frame or the customer MAC frame in the backbone MAC frame on the basis of at least one of the Service VLAN ID, the destination MAC address, VLAN ID, and destination backbone MAC address of the customer MAC frame contained in the received backbone MAC frame.

The customer MAC frame extraction means 22C has a function of, when the received backbone MAC frame is to be transmitted from the customer-facing port 6A or 6B, extracting the customer MAC frame from the backbone MAC frame.

Figure 5:
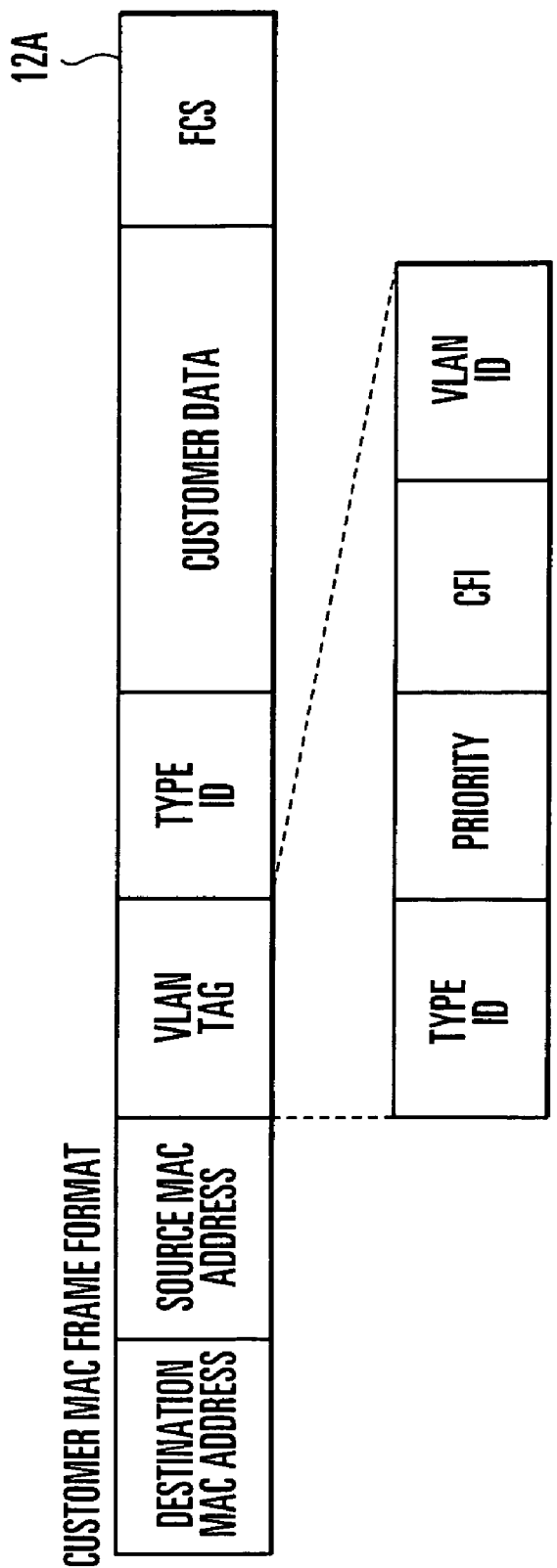
FIG. 5 is a view showing the format of a customer MAC frame transmitted/received by a customer-facing port of the edge Bridge according to the first embodiment of the present invention.

FIG. 5 is a view showing the format of a customer MAC frame transmitted/received by a customer-facing port of the edge Bridge according to the first embodiment of the present invention. In each of the customer networks 4A to 4D, information is transmitted in the form of a customer MAC frame format 12A shown in FIG. 5. The customer MAC frame has the information of a destination MAC address, source MAC address, VLAN tag, customer data, and FCS (Frame Check Sequence). The VLAN tag contains the information of a type ID, priority, CFI, and VLAN ID. In some networks, a customer MAC frame having no VLAN tag is forwarded. The customer MAC frame format 12A is based on the series of IEEE802 standards.

As shown in FIG. 1, the customer network 4A incorporates a logical network of the VLANs 41A and 42A. A terminal 45A is connected in the VLAN 42A. Similarly, the customer network 4B incorporates a logical network of the VLANs 41B and 42B. A terminal 45B is connected in the VLAN 42B. The customer networks 4C and 4D also incorporate logical networks. The terminals 45A, 45B, 45C, and 45D have individual MAC addresses.

As indicated by a broken line in FIG. 1, the customer networks 4A and 4B form the Service VLAN 5A. The customer networks 4C and 4D form the Service VLAN 5B.

Figure 6:
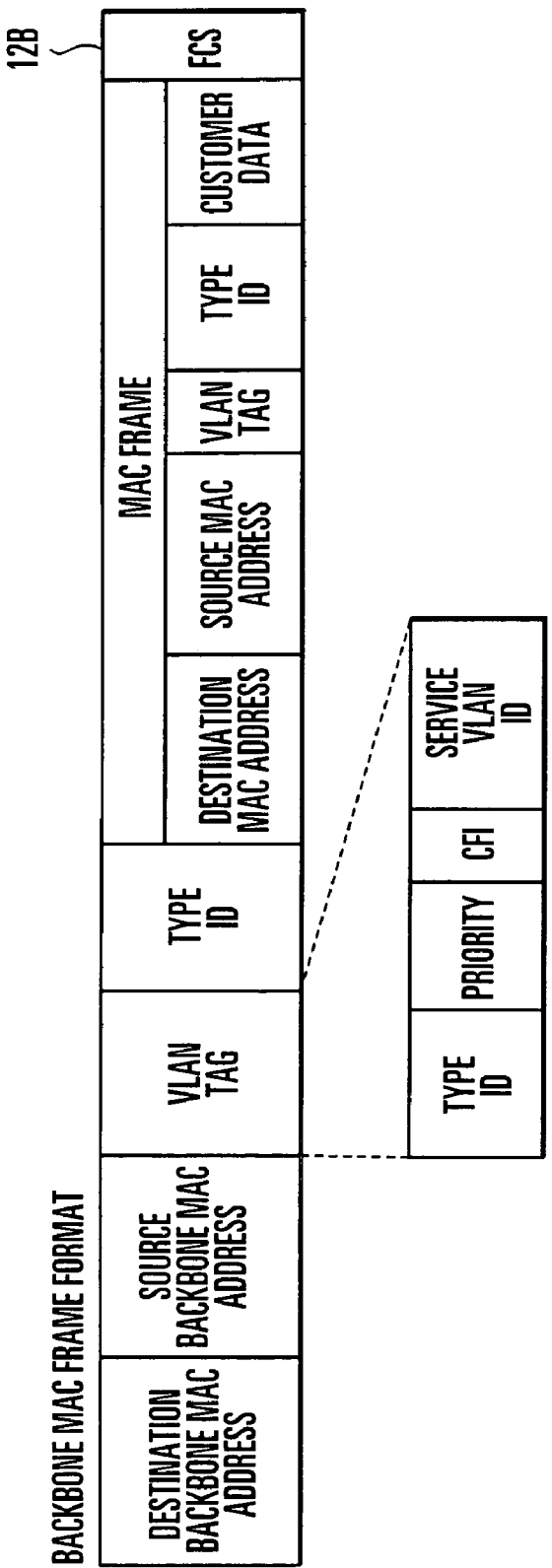
FIG. 6 is a view showing a format of a backbone MAC frame transmitted/received by a backbone-facing port of the edge Bridge according to the first embodiment of the present invention.

FIG. 6 is a view showing the format of a backbone MAC frame transmitted/received by a backbone-facing port of the edge Bridge according to the first embodiment of the present invention (corresponding to claim 1).

In the backbone network 1, information is transmitted in the form of a backbone MAC frame format 12B shown in FIG. 6. The backbone MAC frame format 12B has the information of a destination backbone MAC address, source backbone MAC address, and VLAN tag containing a Service VLAN ID in addition to the information of the customer MAC frame. The VLAN tag contains the information of a priority and Service VLAN ID.

Figure 7:
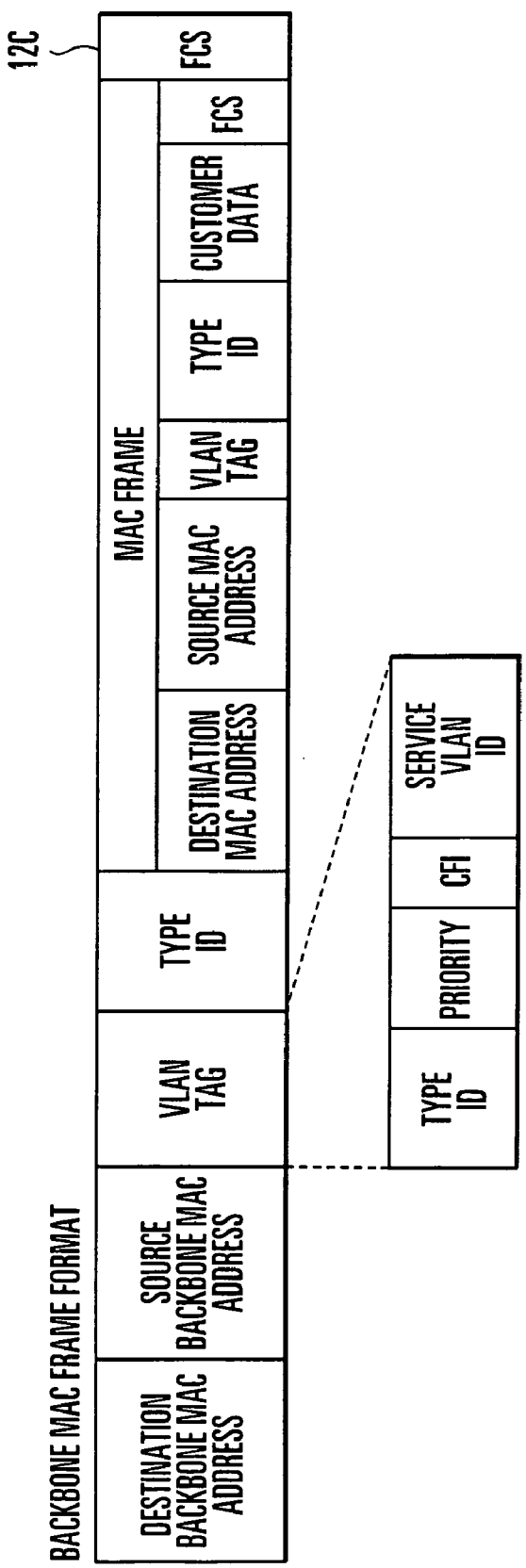
FIG. 7 is a view showing another format of the backbone MAC frame transmitted/received by a backbone-facing port of the edge Bridge according to the first embodiment of the present invention.

FIG. 7 is a view showing another format of the backbone MAC frame transmitted/received by a backbone-facing port of the edge Bridge according to the first embodiment of the present invention. The backbone MAC frame may have the FCS of the customer MAC frame independently of the FCS of the backbone MAC frame, like a backbone MAC frame format 12C shown in FIG. 7.

Figure 8:
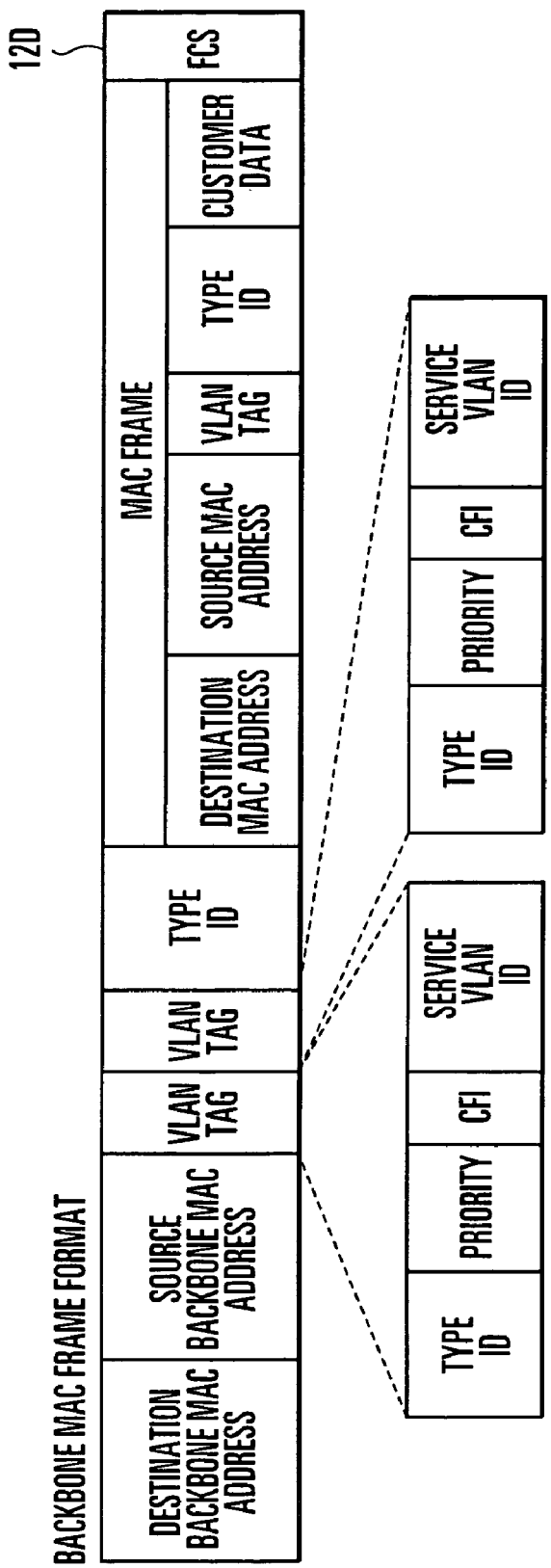
FIG. 8 is a view showing still another format of the backbone MAC frame transmitted/received by a backbone-facing port of the edge Bridge according to the first embodiment of the present invention.
Figure 9:
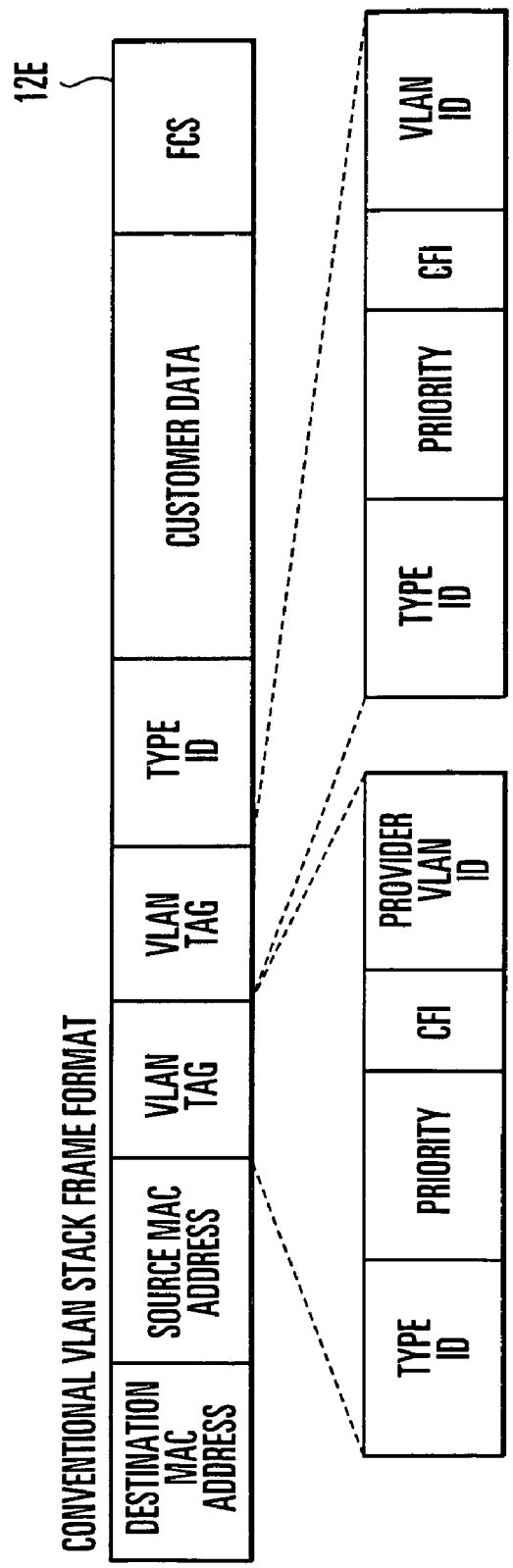
FIG. 9 is a view showing the format of a frame used in a conventional VLAN stack.

FIG. 8 is a view showing still another format of the backbone MAC frame transmitted/received by a backbone-facing port of the edge Bridge according to the first embodiment of the present invention (corresponding to claims 2 and 3).

The backbone MAC frame may have a plurality of VLAN tags, like a backbone MAC frame format 12D shown in FIG. 8. When the Service VLAN IDs in all VLAN tags are connected and handled as the Service VLAN ID of the backbone MAC frame, the space of the Service VLAN ID can be enlarged, and a number of Service VLANs can be handled.

Operation of First Embodiment

Figure 10:
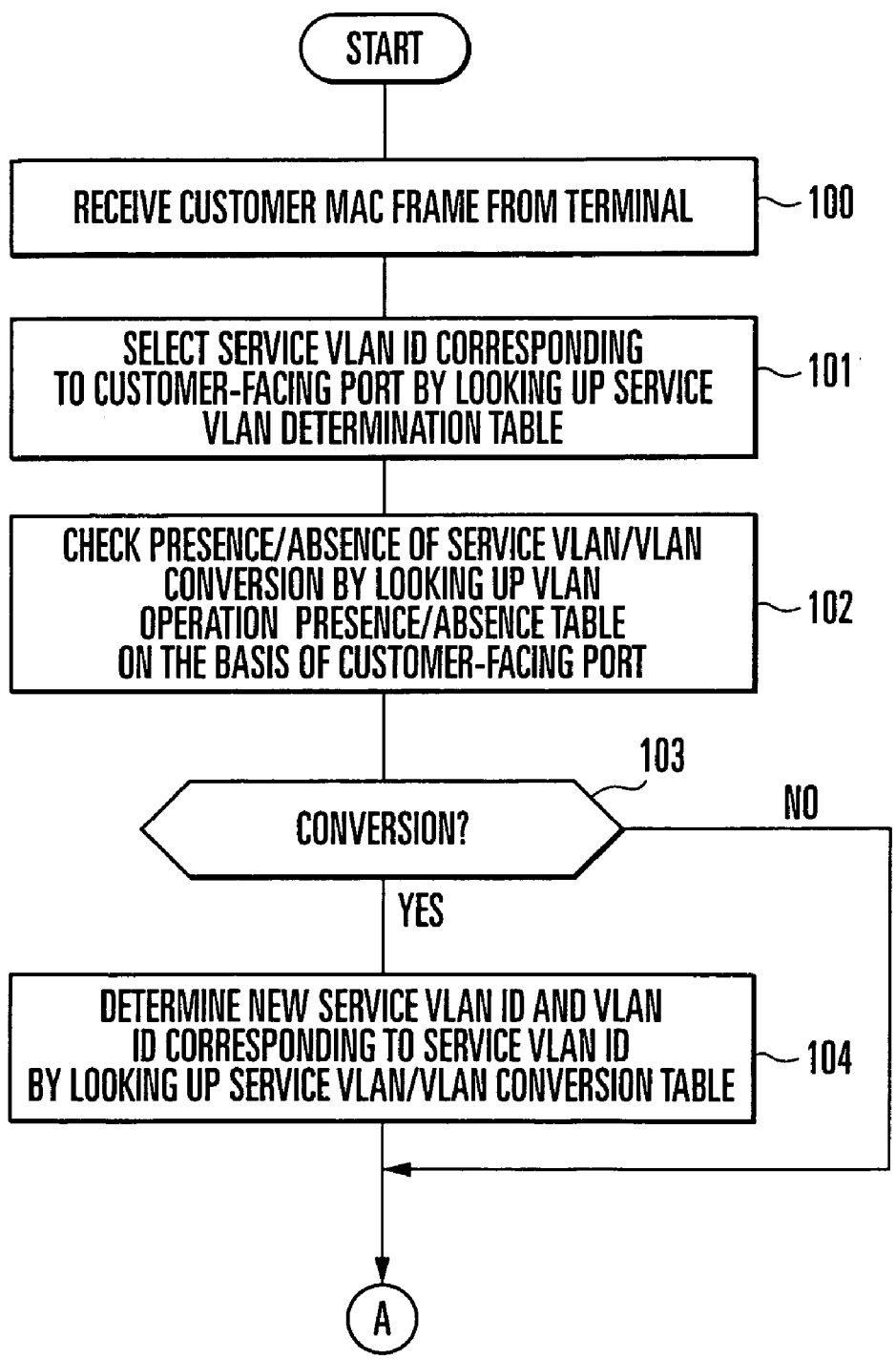
FIG. 10 is a flowchart showing frame forwarding processing of the edge Bridge (transmitting side) according to the first embodiment of the present invention.
Figure 11:
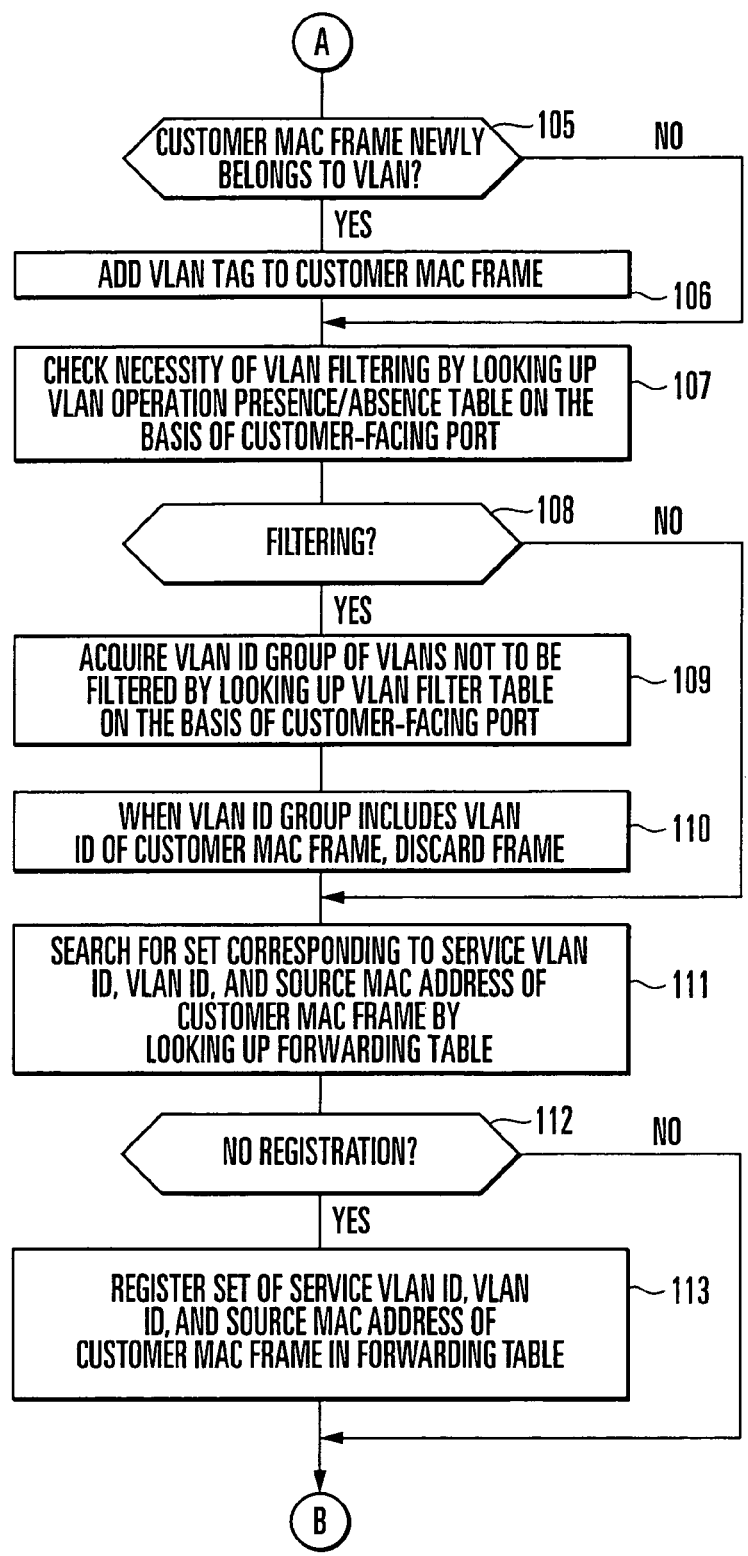
FIG. 11 is a flowchart showing frame forwarding processing (continuation) of the edge Bridge (transmitting side) according to the first embodiment of the present invention.
Figure 12:
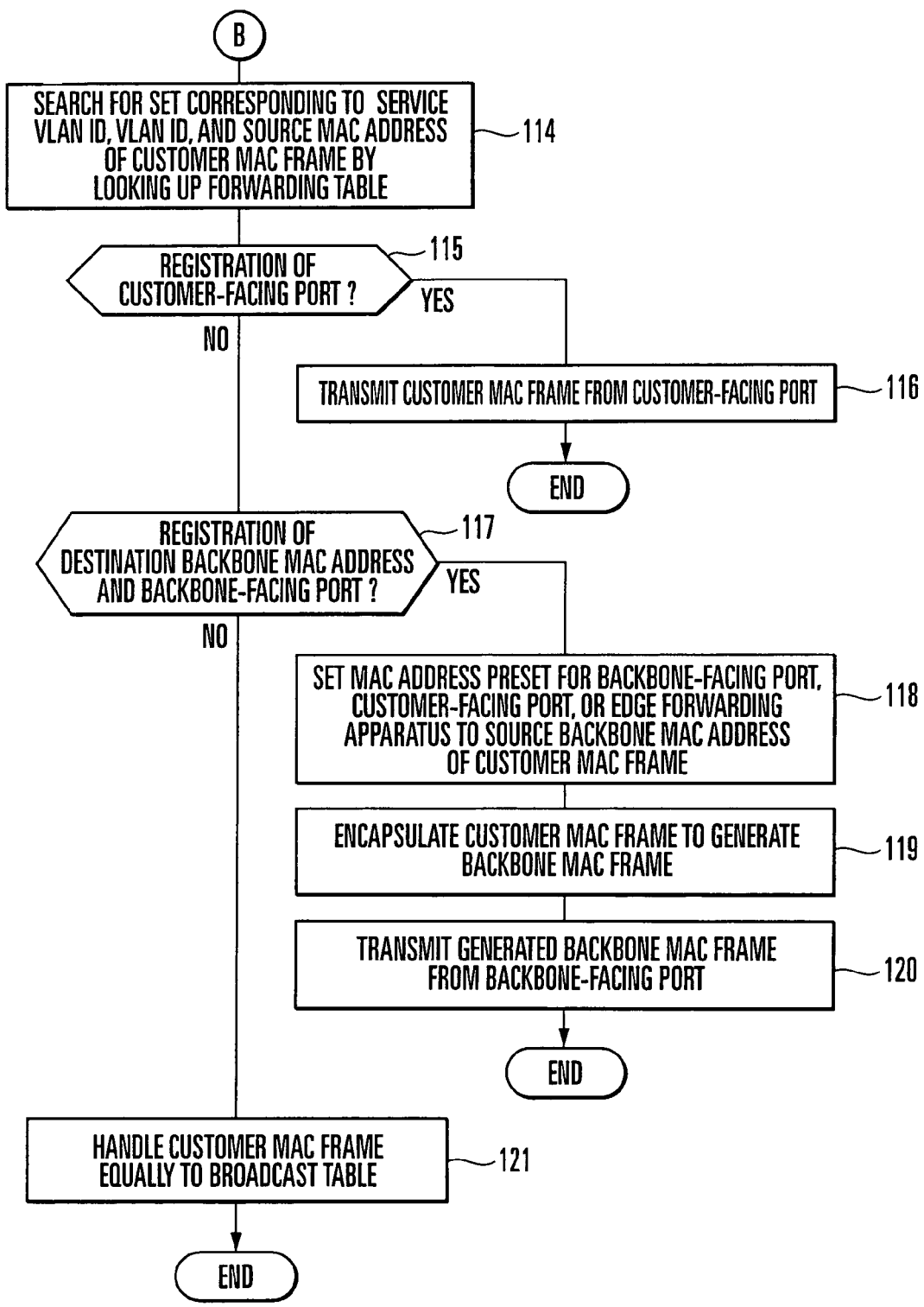
FIG. 12 is a flowchart showing frame forwarding processing (continuation) of the edge Bridge (transmitting side) according to the first embodiment of the present invention.
Figure 13:
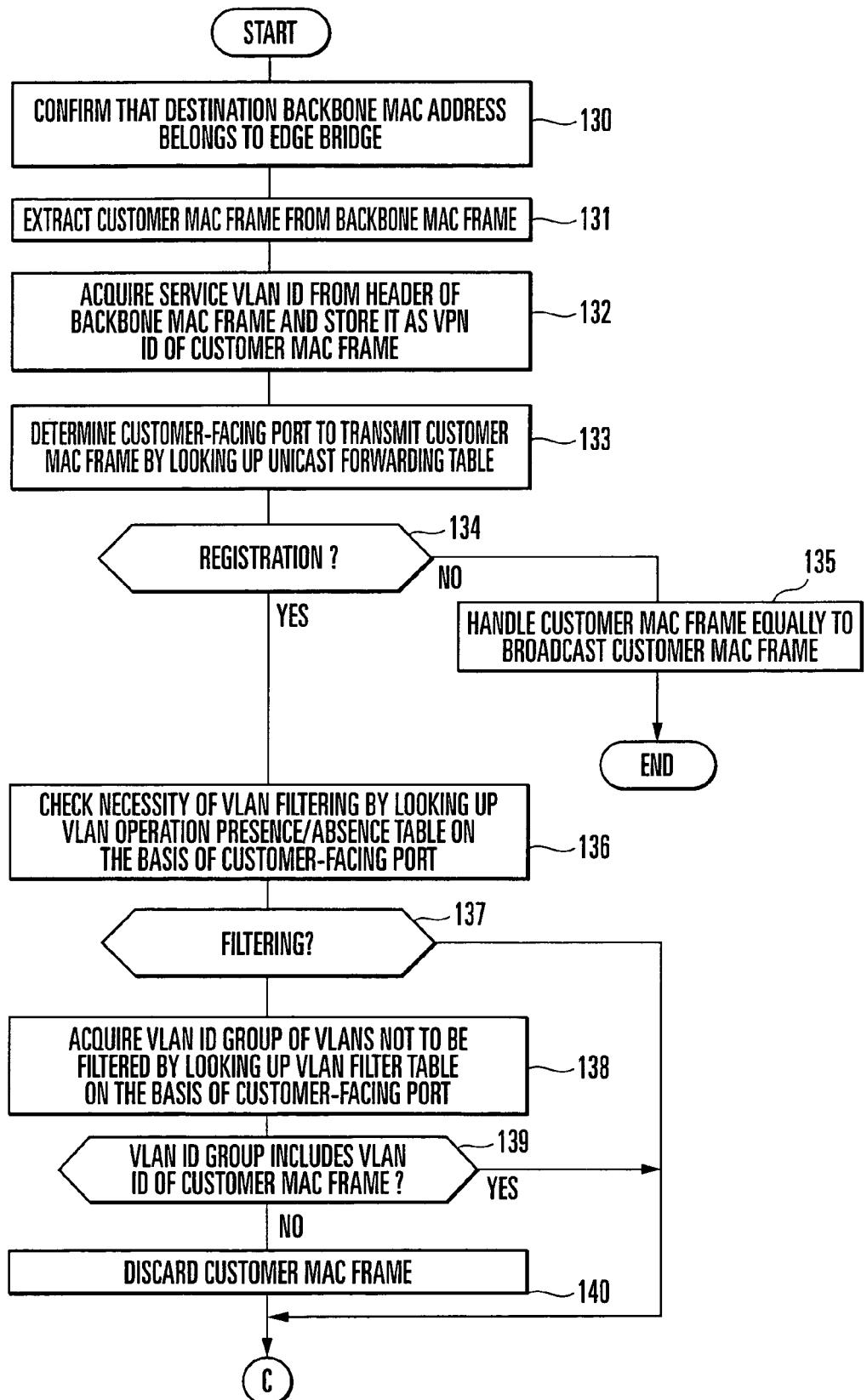
FIG. 13 is a flowchart showing frame forwarding processing of the edge Bridge (receiving side) according to the first embodiment of the present invention.
Figure 14:
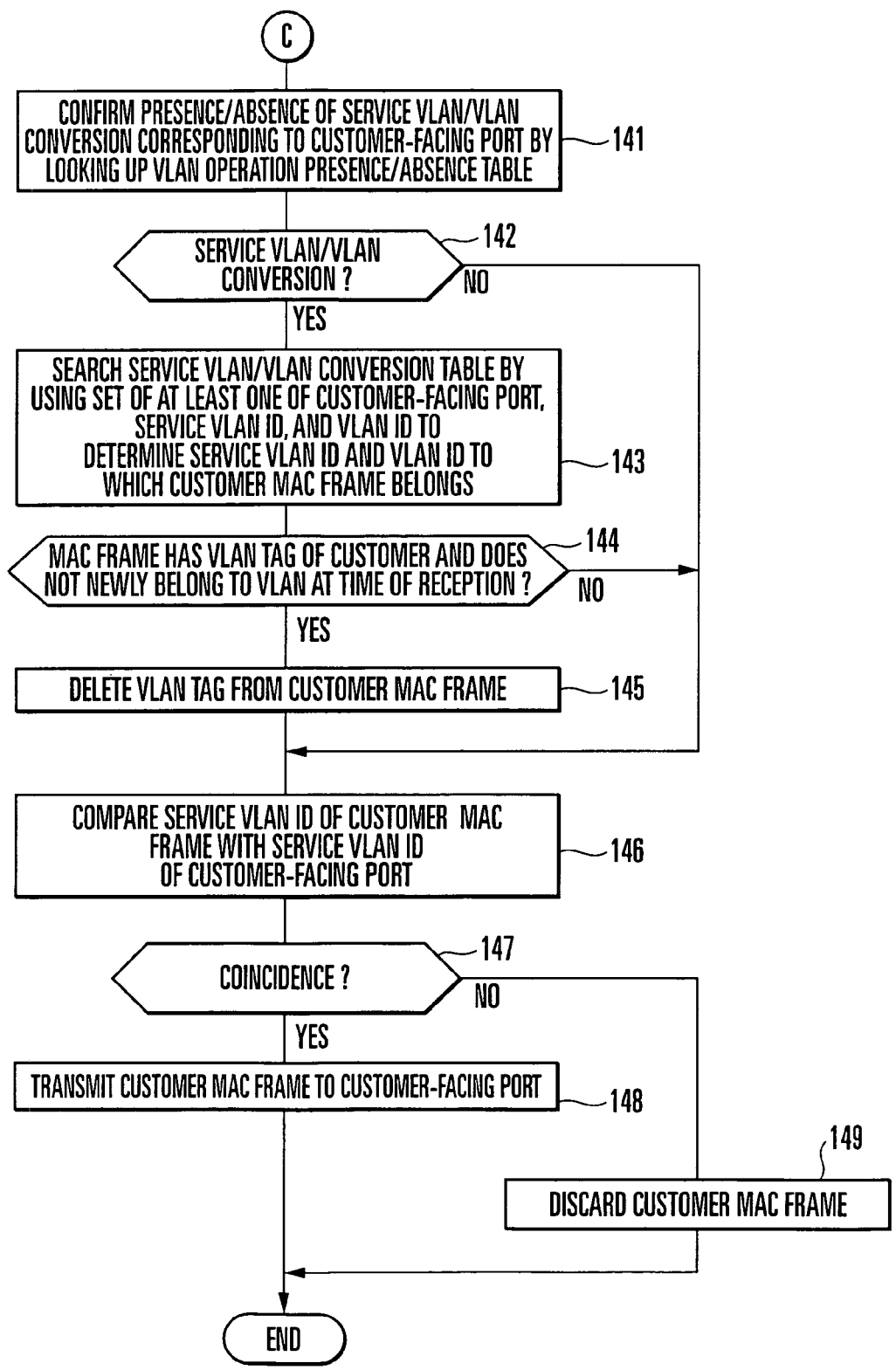
FIG. 14 is a flowchart showing frame forwarding processing (continuation) of the edge Bridge (receiving side) according to the first embodiment of the present invention.

The operation of the edge Bridge according to the first embodiment of the present invention will be described next with reference to FIGS. 10 to 14. FIGS. 10 to 12 are flowcharts showing frame forwarding processing of the edge Bridge (transmitting side) according to the first embodiment of the present invention. FIGS. 13 and 14 are flowcharts showing frame forwarding processing of the edge Bridge (receiving side) according to the first embodiment of the present invention.

An example will be described with reference to FIGS. 10 to 12, in which a customer MAC frame is forwarded from the terminal 45A in the customer network 4A to the terminal 45D in the customer network 4D.

As shown in FIG. 1, the customer network 4A belongs to the Service VLAN 5A, and the customer network 4D belongs to the Service VLAN 5B. The VLAN 42A of the Service VLAN 5A to which the terminal 45A belongs and the VLAN 42D of the Service VLAN 5B to which the terminal 45D belongs respectively virtually belong to the VLAN 43A of the Service VLAN 51 and the VLAN 43D of the Service VLAN 52, which are logically identical, to form an extranet and are set on the apparatuses on the backbone network.

A customer MAC frame is transmitted from the terminal 45A in the customer network 4A to the edge Bridge 2A. The edge Bridge 2A receives the customer MAC frame (step 100). The received customer MAC frame has the customer MAC frame format 12A shown in FIG. 5. The destination MAC address of the customer MAC frame indicates the destination terminal in the customer network 4D. The source MAC address indicates the source terminal in the customer network 4A. The VLAN ID indicates the number of a VLAN to which the destination terminal and source terminal belong. In this customer MAC frame, the VLAN ID indicates a VLAN 42.

On the basis of the VLAN ID and the customer-facing port which has received the customer MAC frame, the edge Bridge 2A determines the Service VLAN ID and VLAN ID to which the customer MAC frame belongs (corresponding to claim 1).

Figure 3E:
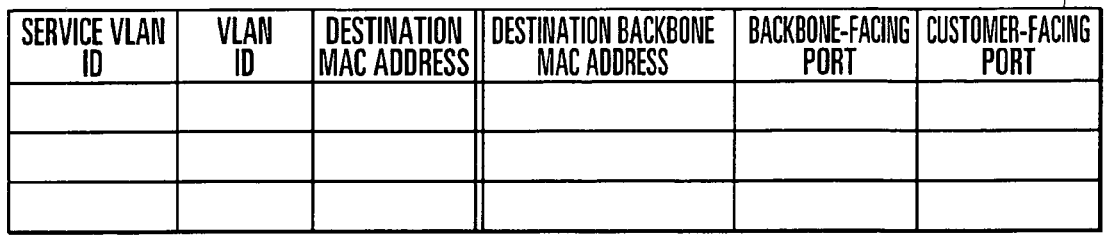
FIG. 3E is a view showing an arrangement example of a forwarding table used in the edge Bridge according to the first embodiment of the present invention.
Figure 3F:
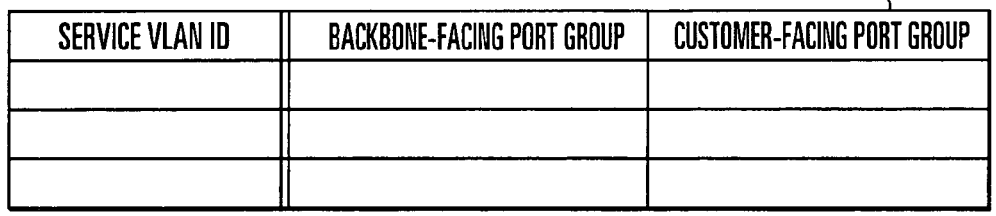
FIG. 3F is a view showing an arrangement example of a flooding forwarding table used in the edge Bridge according to the first embodiment of the present invention.
Figure 3G:
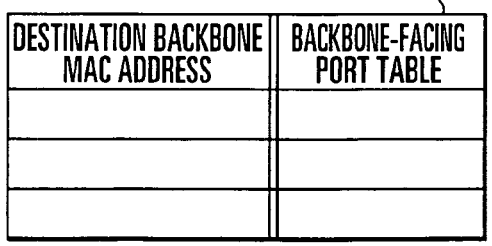
FIG. 3G is a view showing an arrangement example of a backbone-facing port table used in the edge Bridge according to the first embodiment of the present invention.

FIGS. 3A to 3G are views mainly showing, of forwarding tables used in the edge Bridge according to the first embodiment of the present invention, arrangement examples of forwarding tables (in the input mode) used at the time of reception from a customer-facing port. FIG. 3A is a view showing an arrangement example of a Service VLAN determination table. FIG. 3B is a view showing an arrangement example of a VLAN operation presence/absence table. FIG. 3C is a view showing an arrangement example of a Service VLAN/VLAN conversion table. FIG. 3D is a view showing an arrangement example of a VLAN filter table. FIG. 3E is a view showing an arrangement example of a forwarding table. FIG. 3F is a view showing an arrangement example of a flooding forwarding table used in the edge Bridge according to the first embodiment of the present invention. FIG. 3G is a view showing an arrangement example of a backbone-facing port table.

For example, a Service VLAN ID is determined by searching a Service VLAN determination table 10A shown in FIG. 3A by using the customer-facing port as a key (step 101) (corresponding to claim 6). Whether to execute Service VLAN/VLAN conversion is determined by searching a VLAN operation presence/absence table 10B shown in FIG. 3B by using the customer-facing port as a key (step 102). When it is determined that Service VLAN/VLAN conversion is to be executed (step 103: YES), a Service VLAN/VLAN conversion table 10C shown in FIG. 3C is searched by using the customer-facing port and Service VLAN ID as keys, thereby determining a new Service VLAN ID and VLAN ID. With this step, the Service VLAN ID and VLAN ID to which the customer MAC frame belongs are determined (step 104) (corresponding to claims 8 and 9). It is determined here that the customer MAC frame belongs to the VLAN 43A of the Service VLAN 51.

When it is determined that the customer MAC frame has no VLAN tag at the time of reception and newly belongs to a VLAN (step 105 in FIG. 11: YES), a VLAN tag is added to the customer MAC frame (step 106). In this embodiment, since the customer MAC frame has a VLAN tag, no new VLAN tag is added (corresponding to claim 9).

The edge Bridge 2A searches, e.g., the VLAN operation presence/absence table 10B on the basis of the customer-facing port which has received the customer MAC frame, thereby determining whether to execute VLAN filtering (step 107). When it is determined that VLAN filtering is to be executed (step 108: YES), for example, a VLAN filter table 10D shown in FIG. 3D is searched by using the customer-facing port as a key, thereby determining the group of VLANs not to be filtered (step 109). When the VLAN ID of the customer MAC frame is not included in the group of VLAN IDs, the edge Bridge 2A discards the customer MAC frame without forwarding (step 110) (corresponding to claim 11).

The edge Bridge 2A stores the combination of the Service VLAN ID, VLAN ID, and source MAC address of the received customer MAC frame and the customer-facing port and automatically learns the customer-facing port to which a customer MAC frame having the source MAC address as the address should be transmitted. For example, a forwarding table 10E shown in FIG. 3E is searched by using the Service VLAN ID, VLAN ID, and source MAC address of the customer MAC frame as keys (step 111), thereby determining whether a corresponding set is present in the table. If no corresponding field is registered (step 112: YES), the set of the Service VLAN ID, VLAN ID, source MAC address, and customer-facing port is registered in the forwarding table (step 113) (corresponding to claim 4).

The edge Bridge 2A searches, e.g., the forwarding table 10E on the basis of the Service VLAN ID, VLAN ID, and destination MAC address of the customer MAC frame, thereby determining the destination backbone MAC address and backbone-facing port to transmit (step 114).

When the destination of the customer MAC frame is present ahead of the customer-facing port of the edge Bridge and is registered in the edge Bridge in advance (step 115: YES), the search result is not a destination backbone MAC address and backbone-facing port but a customer-facing port. The edge Bridge transmits the customer MAC frame to the customer-facing port (step 116) (corresponding to claim 5) and ends the series of frame forwarding processing operations.

On the other hand, when the destination is an address except a MAC address assigned to a customer-facing port or backbone-facing port in advance or a MAC address assigned to the edge Bridge 2A (step 117: YES), a backbone-facing port table 10G shown in FIG. 3G is searched by using the destination backbone MAC address as a search key, thereby determining a backbone-facing port to transmit a backbone MAC frame (corresponding to claim 5).

The edge Bridge 2A sets the MAC address preset for the backbone-facing port, customer-facing port, or edge Bridge as the source backbone MAC address of the customer MAC frame (step 118) (corresponding to claims 13, 14, and 15).

The edge Bridge 2A encapsulates the customer MAC frame into the backbone MAC frame format 12B shown in FIG. 6 on the basis of the destination backbone MAC address, source backbone MAC address, and Service VLAN ID (step 119). The edge Bridge 2A transmits the encapsulated backbone MAC frame from the backbone-facing port (step 120) (corresponding to claim 1) and ends the series of frame forwarding processing operations.

The transmitted backbone MAC frame is forwarded sequentially through the backbone Bridge 3A→backbone Bridge 3C→backbone Bridge 3D in accordance with the destination backbone MAC address and finally forwarded to the edge Bridge 2D (corresponding to claim 1).

If no corresponding field is registered in the forwarding table 10E (step 117: NO), the edge Bridge 2A handles the customer MAC frame equally to a broadcast customer MAC frame (step 121) and ends the series of frame forwarding processing operations. The broadcast customer MAC frame forwarding method will be described later.

Frame forwarding processing of the receiving-side edge Bridge 2D will be described next with reference to FIGS. 13 and 14.

The edge Bridge 2D confirms that the destination backbone MAC address of the backbone MAC frame belongs to the edge Bridge 2D (step 130) (corresponding to claim 5) and extracts the customer MAC frame contained in the backbone MAC frame (step 131). In decapsulating, the Service VLAN ID contained in the header information of the backbone MAC frame is stored as the Service VLAN ID of the customer MAC frame (step 132). The Service VLAN ID indicates the Service VLANs 51 and 52 (corresponding to claim 1).

The edge Bridge 2D searches, e.g., the forwarding table 10E shown in FIG. 3E on the basis of the Service VLAN ID, VLAN ID, and destination MAC address of the customer MAC frame, thereby determining the customer-facing port number to transmit (step 133). If no corresponding field is present in the table (step 134: NO), the edge Bridge 2D handles the customer MAC frame equally to a broadcast customer MAC frame (step 135) and ends the series of frame forwarding processing operations. The broadcast customer MAC frame forwarding method will be described later (corresponding to claim 5).

FIGS. 4A to 4D are views mainly showing, of forwarding tables in the edge Bridge of the present invention, arrangement examples of forwarding tables (in the output mode) used at the time of transmission to a customer-facing port. FIG. 4A is a view showing an arrangement example of a VLAN operation presence/absence table. FIG. 4B is a view showing an arrangement example of a VLAN filter table. FIG. 4C is a view showing an arrangement example of a Service VLAN determination table. FIG. 4D is a view showing an arrangement example of a Service VLAN/VLAN conversion table.

The edge Bridge 2D searches, e.g., a VLAN operation presence/absence table 11A shown in FIG. 4A by using the customer-facing port to transmit the customer MAC frame as a key, thereby determining whether to execute VLAN filtering (step 136). When it is determined that VLAN filtering is to be executed (step 137: YES), for example, a VLAN filter table 11B shown in FIG. 4B is searched by using the customer-facing port as a key, thereby determining the group of VLANs not to be filtered (step 138). When the VLAN ID of the customer MAC frame is not included in the group of VLAN IDs (step 139: YES), the edge Bridge 2D discards the customer MAC frame without forwarding (step 140) (corresponding to claim 12) and ends the series of frame forwarding processing operations.

On the basis of at least one of the customer-facing port to transmit the customer MAC frame, the Service VLAN ID, and the VLAN ID, the edge Bridge 2D determines the Service VLAN ID and VLAN ID to which the customer MAC frame belongs. For example, a table like the VLAN operation presence/absence table 11A is searched by using the customer-facing port as a key, thereby determining whether to execute Service VLAN/VLAN conversion (step 141). When it is determined that Service VLAN/VLAN conversion is to be executed (step 142: YES), a Service VLAN/VLAN conversion table 11D shown in FIG. 4 is searched by using at least one of the customer-facing port, Service VLAN ID, and VLAN ID as a key, thereby determining a new Service VLAN ID and VLAN ID. With this step, the Service VLAN ID and VLAN ID to which the customer MAC frame belongs are determined (step 143).

The Service VLAN ID of the customer MAC frame indicates the Service VLAN 5B. The VLAN ID indicates the VLAN 42D. When it is determined that the customer MAC frame has a VLAN tag at the time of reception and does not newly belong to a VLAN (step 144: YES), the VLAN tag is deleted from the customer MAC frame (step 145). In this embodiment, since the customer MAC frame belongs to the VLAN 42D, the VLAN tag is not removed (corresponding to claim 10).

The edge Bridge 2D compares the Service VLAN ID of the customer MAC frame with the Service VLAN ID of each customer-facing port (step 146). If any of the Service VLAN IDs of the customer-facing ports does not coincide with the Service VLAN ID of the customer MAC frame (step 147: NO), the customer MAC frame is discarded (step 148) (corresponding to claim 7), and the series of frame forwarding processing operations is ended.

If any of the Service VLAN IDs of the customer MAC frames coincides (step 147: YES), the edge Bridge 2D transmits the customer MAC frame to the customer-facing port (step 149) and ends the series of frame forwarding processing operations. The customer MAC frame arrives at the customer network 4D and finally arrives at the terminal 45D (corresponding to claim 1).

As described above, according to this embodiment, in the wide area network to which a number of terminals are connected, the edge Bridge executes Ethernet encapsulation. For this reason, the number of MAC addresses to be processed by a switch in the backbone network can greatly be reduced. Hence, the forwarding processing by the switch in the backbone network can be executed at a higher speed and lower cost.

When a Service VLAN ID is added to a customer MAC frame in the edge Bridge, a completely closed network can be built for each customer.

The customer can belong to a plurality of Service VLANs through a single customer-facing port and select, by a VLAN ID, a Service VLAN to which he/she should belong. In addition, the Service VLAN IDs can be managed hierarchically.

Second Embodiment

A customer MAC frame forwarding method and edge Bridge according to the second embodiment of the present invention will be described next.

In the above-described first embodiment, normal hit forwarding has been described in which a customer MAC frame to be transmitted/received between two terminals is forwarded by an edge Bridge. In the second embodiment, broadcast forwarding will be described in which a single customer MAC frame is forwarded in parallel to a number of terminals. The arrangement example of the network and that of the edge Bridge of the second embodiment are the same as in the embodiment shown in FIGS. 1 and 2, and a detailed description thereof will be omitted.

Operation of Second Embodiment

An example of the operation of forwarding a customer MAC frame by broadcast from a terminal 45A in a customer network 4A will be described. As in the above-described embodiment, the customer network 4A belongs to a Service VLAN 5A, and a customer network 4D belongs to a Service VLAN 5B. VLANs 42A and 42B of the Service VLAN 5A and VLANs 42C and 42D of the Service VLAN 5B respectively virtually belong to a VLAN 43A of a Service VLAN 51 and a VLAN 43D of a Service VLAN 52, which are logically identical, to form an extranet and are set on the apparatuses on the backbone network.

An edge Bridge 2A receives a customer MAC frame from the terminal 45A in the customer network 4A. The received customer MAC frame has a customer MAC frame format 12A. The destination MAC address of the customer MAC frame indicates a broadcast address. The source MAC address indicates the source terminal in the customer network 4A. The VLAN ID of the customer MAC frame indicates the number of a VLAN to which the source terminal belongs. The VLAN tag containing the VLAN ID is an option.

On the basis of the VLAN ID and the customer-facing port which has received the customer MAC frame, the edge Bridge 2A determines the Service VLAN ID and VLAN ID to which the customer MAC frame belongs (corresponding to claim 1).

For example, a Service VLAN ID is determined by searching a Service VLAN determination table 10A shown in FIG. 3A described above by using the customer-facing port as a key (corresponding to claim 6). Whether to execute Service VLAN/VLAN conversion is determined by searching a VLAN operation presence/absence table 10B shown in FIG. 3B described above by using the customer-facing port as a key. When it is determined that Service VLAN/VLAN conversion is to be executed, a Service VLAN/VLAN conversion table 10C shown in FIG. 3C described above is searched by using the customer-facing port and Service VLAN ID as keys, thereby determining a new Service VLAN ID and VLAN ID. With this step, the Service VLAN ID and VLAN ID to which the customer MAC frame belongs are determined. It is determined here that the customer MAC frame belongs to the VLAN 43A of the Service VLAN 51 (corresponding to claims 8 and 9).

When it is determined that the customer MAC frame has no VLAN tag at the time of reception and newly belongs to a VLAN, a VLAN tag is added to the customer MAC frame. In this embodiment, since the customer MAC frame has a VLAN tag, no new VLAN tag is added (corresponding to claim 9).

The edge Bridge 2A searches, e.g., the VLAN operation presence/absence table 10B by using the customer-facing port which has received the customer MAC frame as a key, thereby determining whether to execute VLAN filtering. When it is determined that VLAN filtering is to be executed, for example, a VLAN filter table 10D shown in FIG. 3D described above is searched by using the customer-facing port as a key, thereby determining the group of VLANs not to be filtered.

When the VLAN ID of the customer MAC frame is not included in the group of VLAN IDs, the edge Bridge 2A discards the customer MAC frame without forwarding (corresponding to claim 11).

The edge Bridge 2A stores the combination of the Service VLAN ID, VLAN ID, and source MAC address of the received customer MAC frame and the customer-facing port which has received the customer MAC frame and automatically learns the customer-facing port to which a customer MAC frame having the source MAC address as the address should be transmitted.

For example, a forwarding table 10E shown in FIG. 3E described above is searched by using the Service VLAN ID, VLAN ID, and source MAC address as keys, thereby determining whether a corresponding set is present in the table. If no corresponding set is present, the set of the Service VLAN ID, VLAN ID, source MAC address, and customer-facing port is additionally stored in the forwarding table (corresponding to claim 4).

The edge Bridge 2A searches, e.g., the forwarding table 10E by using the Service VLAN ID, VLAN ID, and destination MAC address of the customer MAC frame as keys. It is determined here that the destination MAC address is a broadcast address (corresponding to claim 5).

The edge Bridge 2A searches, e.g., a flooding forwarding table 10F shown in FIG. 3F described above by using the Service VLAN ID of the customer MAC frame as a key, thereby determining one or a plurality of customer-facing ports and backbone-facing ports to transmit (corresponding to claim 5).

When the customer MAC frame is to be transmitted from a backbone-facing port, the edge Bridge 2A sets the MAC address preset for the customer-facing port which has received the customer MAC frame, the backbone-facing port, or the edge Bridge as the source backbone MAC address of the customer MAC frame (corresponding to claims 13, 14, and 15). The customer MAC frame is encapsulated into a backbone MAC frame format 12B on the basis of the destination backbone MAC address, source backbone MAC address, and Service VLAN ID (corresponding to claim 1).

The destination backbone MAC address is the broadcast address (corresponding to claim 5).

When the customer MAC frame is to be transmitted from a customer-facing port, the edge Bridge 2A does not execute encapsulation. Since the transmitted backbone MAC address is a broadcast address, the backbone MAC frame is forwarded sequentially through the edge Bridge 2A→backbone Bridge 3A→backbone Bridges 3B and 3C, the backbone Bridge 3B→edge Bridge 2B, the backbone Bridge 3C→backbone Bridges 3D and 3E, the backbone Bridge 3D→edge Bridges 2C and 2E, and the backbone Bridge 3E→edge Bridge 2D. At the time of forwarding, when the backbone Bridge 3D determines on the basis of not only the destination backbone MAC address but also the Service VLAN ID that the edge Bridge 2E does not connect the Service VLANs 51 and 52 and does not forward the customer MAC frame to the edge Bridge 2E, the forwarding efficiency in the backbone network can be increased (corresponding to claim 5).

The edge Bridges 2B, 2C, 2D, and 2E which have received the backbone MAC frame confirm that the destination backbone MAC address of the backbone MAC frame is a broadcast address (corresponding to claim 5) and extract the customer MAC frame contained in the backbone MAC frame. In decapsulating, the Service VLAN ID contained in the header information of the backbone MAC frame is stored as the Service VLAN ID of the customer MAC frame (corresponding to claim 1).

The edge Bridges 2B, 2C, 2D, and 2E search, e.g., the forwarding table 10E on the basis of the Service VLAN ID, VLAN ID, and destination MAC address of the customer MAC frame, thereby searching for the customer-facing port number to transmit. It is determined here that the destination MAC address is a broadcast address.

The edge Bridges 2A, 2B, 2C, 2D, and 2E search, e.g., the flooding forwarding table 10F on the basis of the Service VLAN ID of the customer MAC frame, thereby determining one or a plurality of customer-facing ports and backbone-facing ports. If the port to transmit is the same as the port which has received the customer MAC frame, it is not transmitted to that port (corresponding to claim 5).

The edge Bridges 2A, 2B, 2C, 2D, and 2E search, e.g., a VLAN operation presence/absence table 11A shown in FIG. 4A described above on the basis of the customer-facing port of the customer MAC frame, thereby determining whether to execute VLAN filtering. When it is determined that VLAN filtering is to be executed, for example, a VLAN filter table 11B shown in FIG. 4C described above is searched to search for the group of VLAN IDs to be filtered. When the VLAN ID of the customer MAC frame is not included in the found group of VLAN IDs, the customer MAC frame is discarded (corresponding to claim 12).

The edge Bridges 2A, 2B, 2C, 2D, and 2E search, e.g., the VLAN operation presence/absence table 11A on the basis of the customer-facing port of the customer MAC frame, thereby determining whether to execute Service VLAN/VLAN conversion. When it is determined that Service VLAN/VLAN conversion is to be executed, for example, a Service VLAN/VLAN conversion table 11D shown in FIG. 4 described above is searched by using at least one of the customer-facing port, Service VLAN ID, and VLAN ID as a key, thereby determining a new Service VLAN ID and VLAN ID. With this step, the Service VLAN ID and VLAN ID to which the customer MAC frame belongs are determined (corresponding to claim 10).

If any of the Service VLAN IDs of the customer-facing ports does not coincide with the Service VLAN ID of the customer MAC frame, the edge Bridges 2A, 2B, 2C, 2D, and 2E discard the customer MAC frame. Otherwise, the customer MAC frame is transmitted (corresponding to claim 7).

The edge Bridges 2A, 2B, 2C, 2D, and 2E transmit the customer MAC frame to the customer-facing port. The customer MAC frame reaches the destination network (corresponding to claim 1).

When the flowcharts shown in FIGS. 10 to 14 are prepared as a program and recorded on a recording medium such as a CD-ROM, it is convenient in selling or lending the customer MAC frame forwarding program of the present invention. In addition, when a recording medium is loaded in the computer of the edge Bridge of the customer MAC frame forwarding system of the present invention, and the program is installed and executed, the present invention can easily be implemented.

Third Embodiment

Figures 15A, 15B:
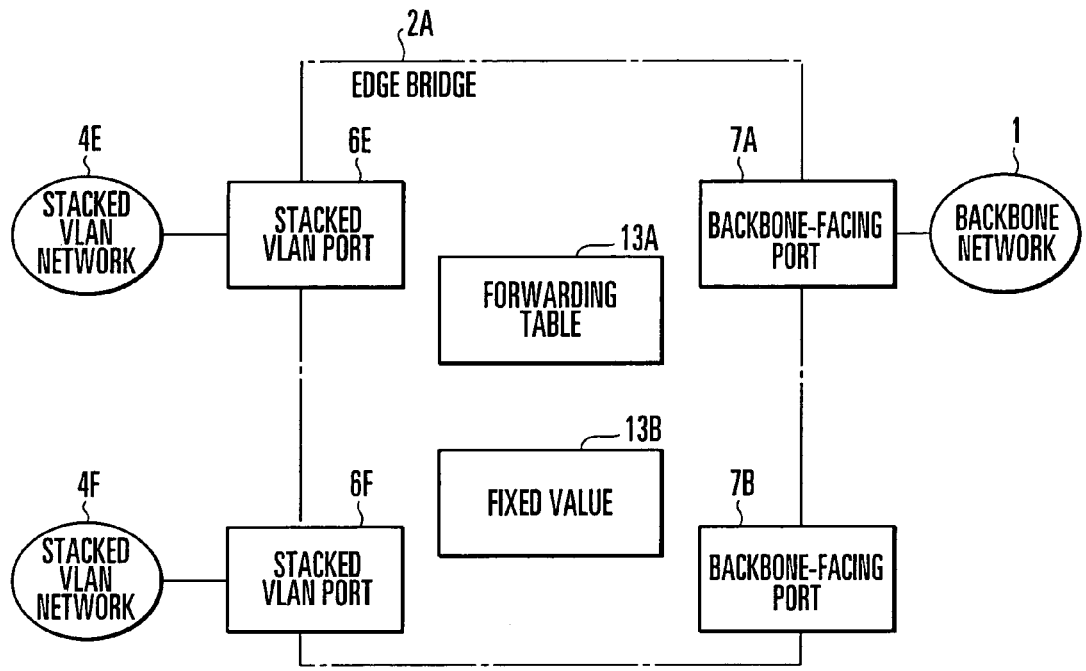
FIG. 15A is a block diagram showing an arrangement example of a network to which a customer MAC frame forwarding method according to the third embodiment of the present invention is applied.
FIG. 15B is a view showing an arrangement example of a forwarding table used in an edge Bridge according to the third embodiment of the present invention.

A customer MAC frame forwarding method and edge Bridge according to the third embodiment of the present invention will be described next with reference to FIGS. 15A and 15B. FIG. 15A is a block diagram showing an arrangement example of a network to which the customer MAC frame forwarding method according to the third embodiment of the present invention is applied. The same reference numerals as in FIGS. 1 and 2 described above denote the same or similar parts in FIG. 15A (corresponding to claims 16 to 20). FIG. 15B is a view showing an arrangement example of a forwarding table used in the edge Bridge according to the third embodiment of the present invention.

Referring to FIG. 15A, an edge Bridge 2A has a plurality of stacked VLAN ports 6E and 6F and a plurality of backbone-facing ports 7A and 7B. The number of stacked VLAN ports 6E and 6F and the number of backbone-facing ports 7A and 7B are determined as needed. A plurality of stacked VLAN ports or backbone-facing ports need not always be provided. The edge Bridge 2A may also have one or a plurality of customer-facing ports to transmit/receive a customer MAC frame.

A fixed value 13B is preset in the edge Bridge 2A. The edge Bridge 2A has a forwarding table 13A.

Figure 18:
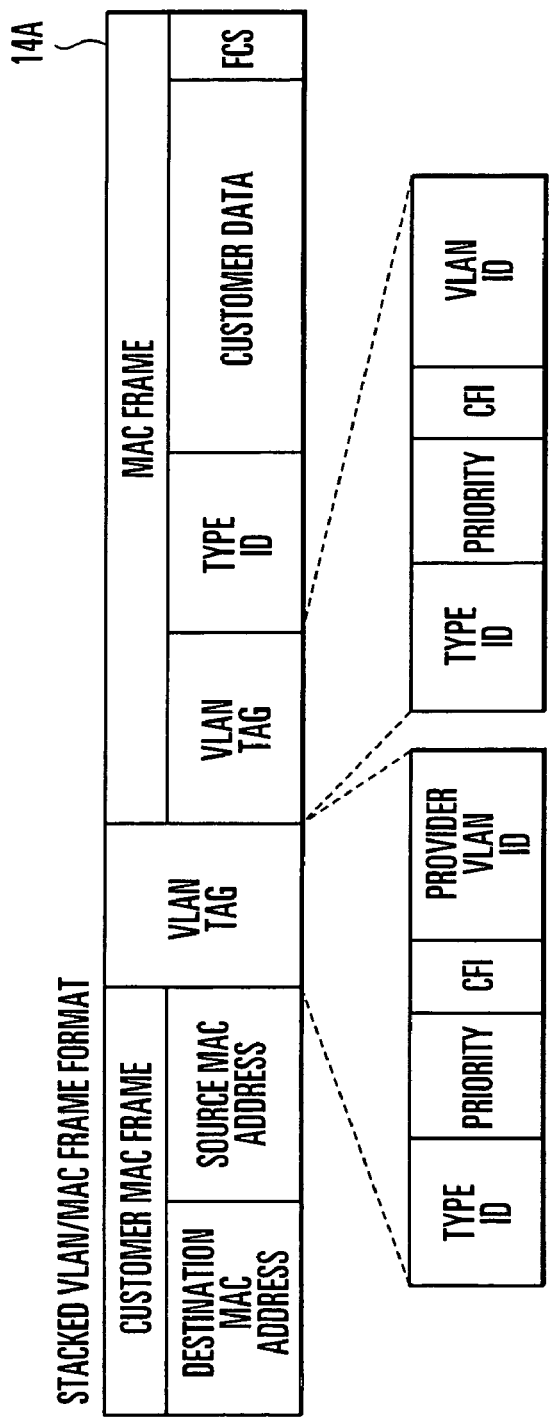
FIG. 18 is a view showing the format of a stacked VLAN frame used in the stacked VLAN network shown in FIG. 1.

FIG. 18 is a view showing the format of a frame used in stacked VLAN networks 4E and 4F shown in FIG. 15A.

Referring to FIG. 15A, the edge Bridge 2A is connected to a backbone network 1 through the backbone-facing port 7A, to the stacked VLAN network 4E through the stacked VLAN port 6E, and to the stacked VLAN network 4F through the stacked VLAN port 6F.

In the stacked VLAN networks 4E and 4F, customer information is transmitted in a stacked VLAN/MAC frame format 14A shown in FIG. 18. The stacked VLAN/MAC frame format has the information of a destination MAC address, source MAC address, two VLAN tags, and customer data. The first VLAN tag contains the information of a priority and Provider VLAN ID. The second VLAN tag contains the information of a priority and VLAN ID. A customer MAC frame having no second VLAN tag is sometimes forwarded as needed.

Figure 20:
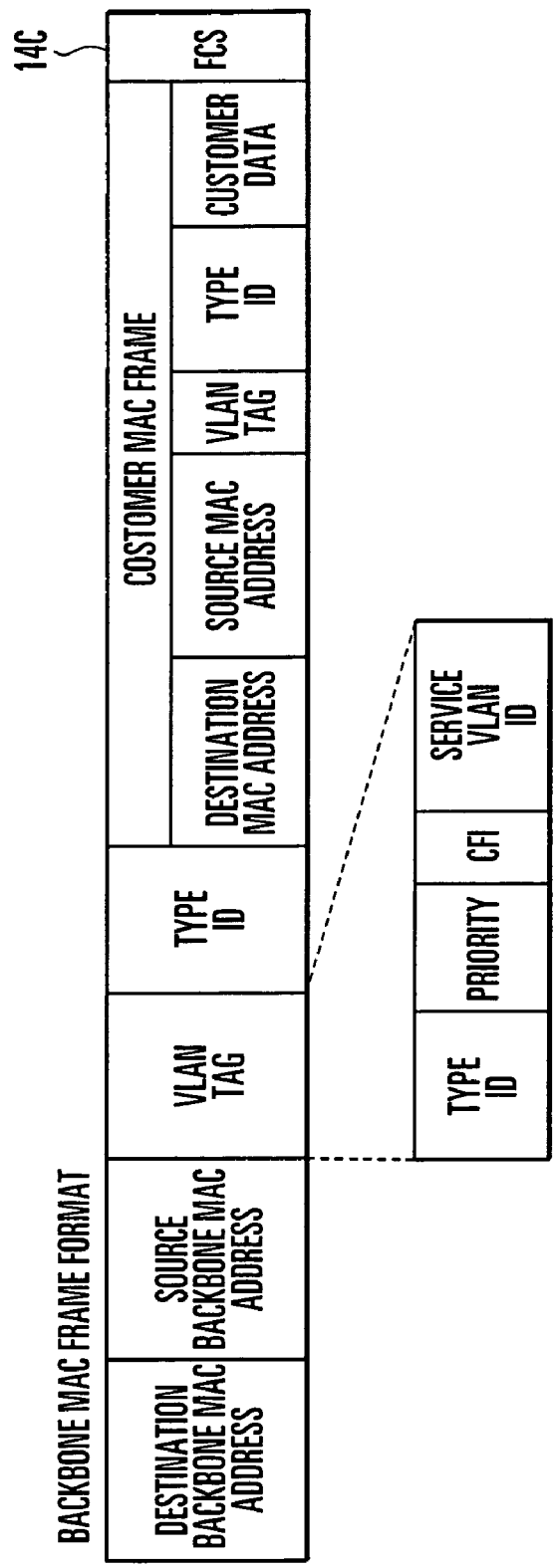
FIG. 20 is a view showing the format of a backbone MAC frame transmitted/received by a backbone-facing port of the edge Bridge according to the third embodiment of the present invention.

FIG. 20 is a view showing the format of a backbone MAC frame transmitted/received from a backbone-facing port of the edge Bridge shown in FIG. 15A (third embodiment).

Figure 19:
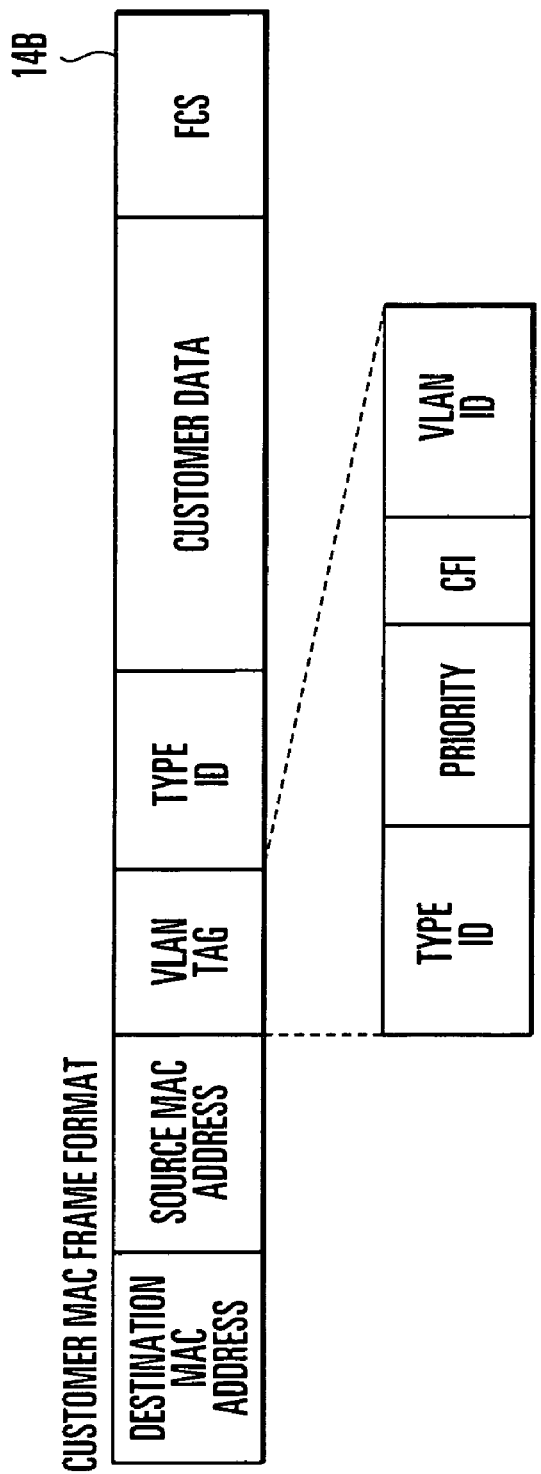
FIG. 19 is a view showing the format of a customer MAC frame based on the series of IEEE802 standards.

In a backbone network 1A, customer information is transmitted in a backbone MAC frame format 14C shown in FIG. 20. The backbone MAC frame has the information of a destination backbone MAC address, source backbone MAC address, and VLAN tag in addition to the information of the customer MAC frame based on the series of IEEE802 standards. The VLAN tag contains the information of a priority and Service VLAN ID. FIG. 19 is a view showing the format of a customer MAC frame 14B based on the series of IEEE802 standards.

Figure 21:
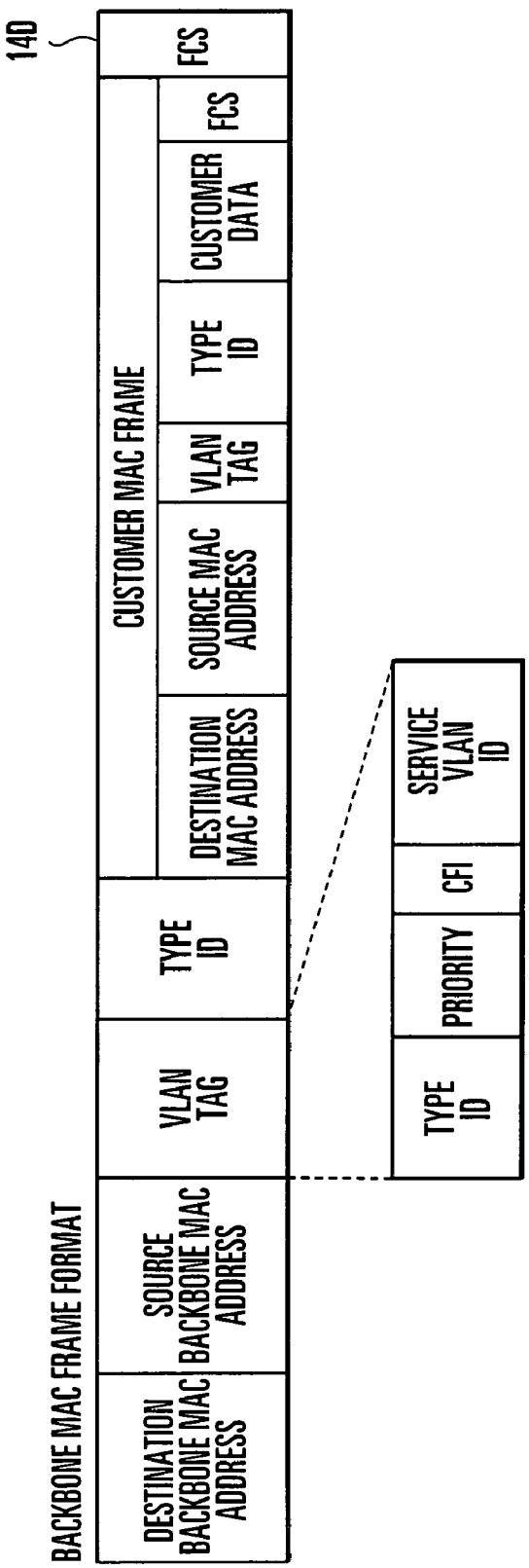
FIG. 21 is a view showing the format of a backbone MAC frame transmitted/received by a backbone-facing port of the edge Bridge according to the fourth embodiment of the present invention.

FIG. 21 is a view showing the format of a backbone MAC frame transmitted/received from a backbone-facing port of the edge Bridge shown in FIG. 15A (fourth embodiment).

As shown in FIG. 21, the backbone MAC frame may have the FCS of the customer MAC frame independently of the FCS of the backbone MAC frame.

Figure 22:
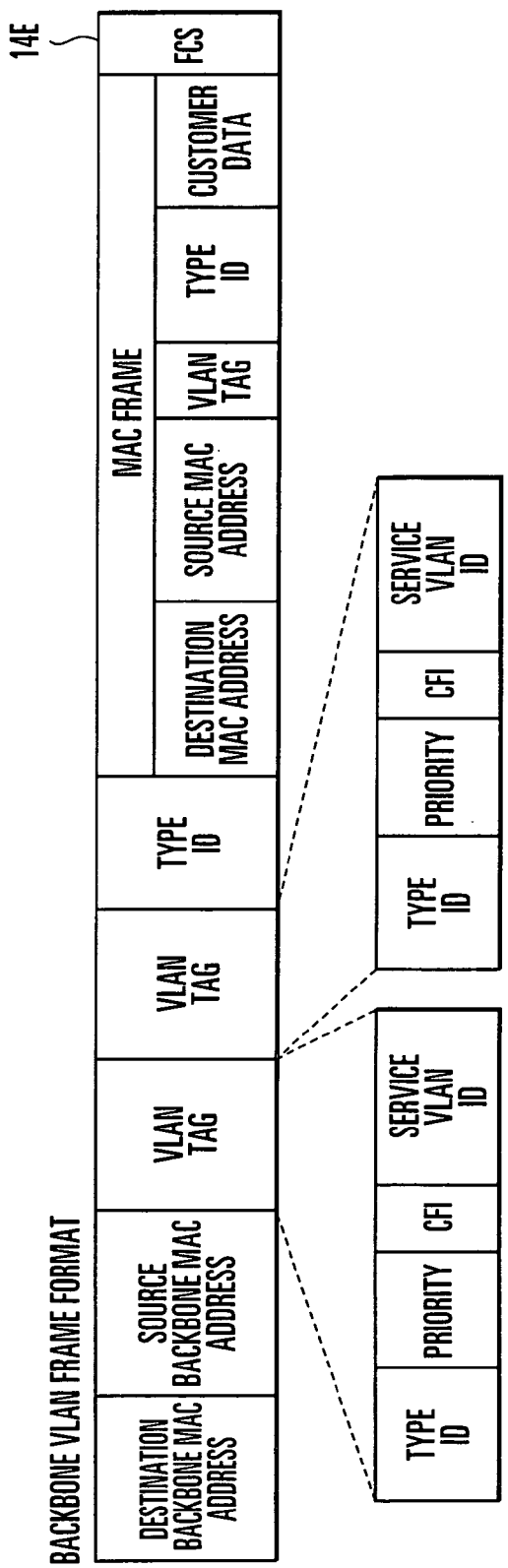
FIG. 22 is a view showing the format of a backbone MAC frame transmitted/received by a backbone-facing port of the edge Bridge according to the fifth embodiment of the present invention.
Figure 23:
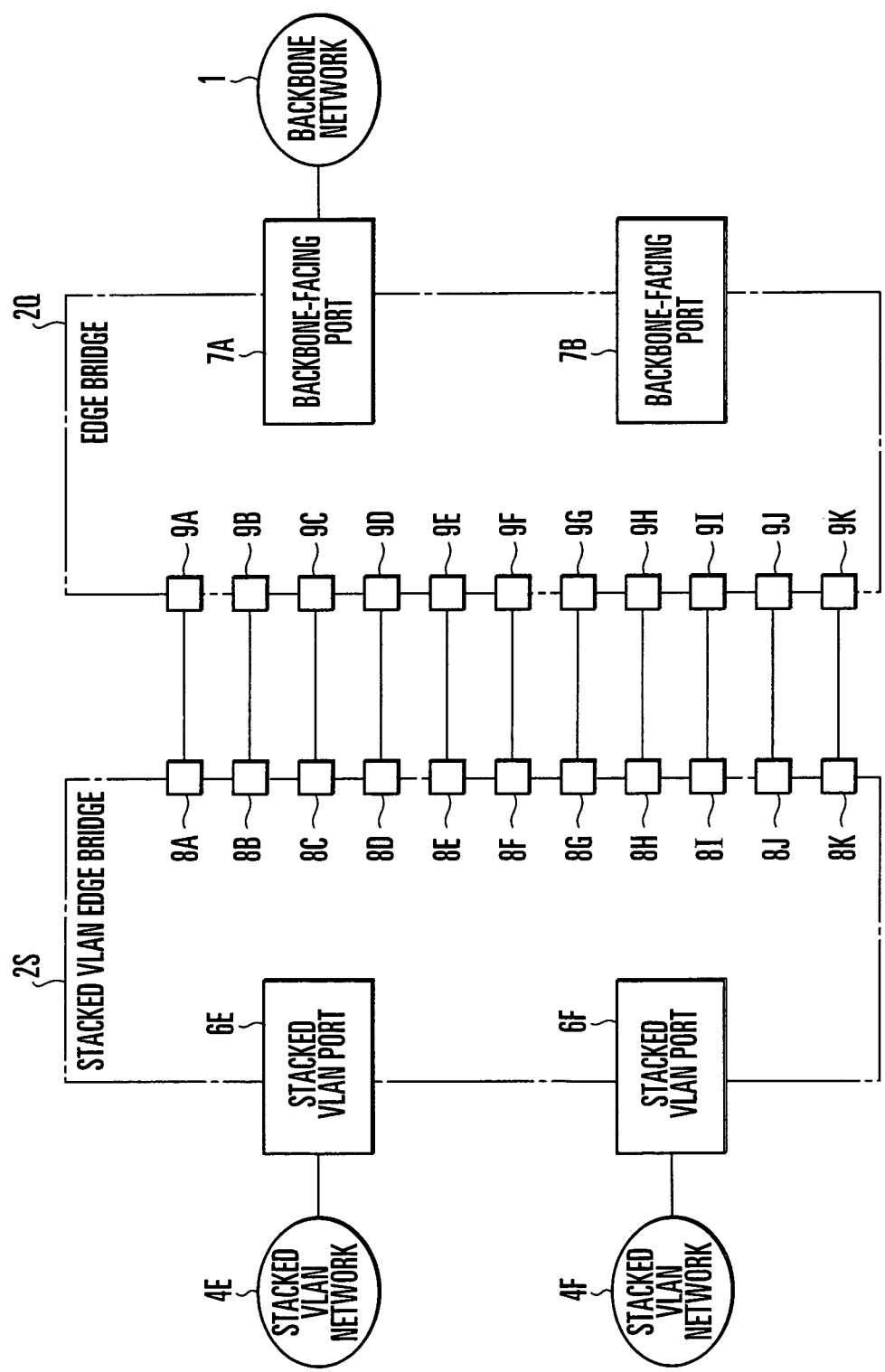
FIG. 23 is a view showing a network configuration to which a conventional customer MAC frame forwarding method is applied.

FIG. 22 is a view showing the format of a backbone MAC frame transmitted/received from a backbone-facing port of the edge Bridge shown in FIG. 15A (fifth embodiment) (corresponding to claims 17 and 18).

As indicated by 15 in FIG. 8, the backbone MAC frame may have a plurality of VLAN tags. When the Service VLAN IDs in all VLAN tags are connected and handled as the Service VLAN ID of the backbone MAC frame, the space of the Service VLAN ID can be enlarged, and a number of Service VLANs can be handled.

Operation of Third Embodiment

As the operation of the edge Bridge according to the third embodiment of the present invention, an example will be described in which a customer MAC frame is forwarded from the stacked VLAN network 4E to the backbone network 1 in FIG. 15A (corresponding to claim 16).

When a customer MAC frame is input to the stacked VLAN network 4E, a VLAN tag is added to the customer MAC frame, and the customer MAC frame is converted into the stacked VLAN/MAC frame format.

The edge Bridge 2A receives the stacked VLAN/MAC frame from the stacked VLAN port 6E connected to the stacked VLAN network 4E. The edge Bridge 2A refers to the Provider VLAN ID in the stacked VLAN/MAC frame and the fixed value 13B preset in the edge Bridge 2A. The edge Bridge 2A connects the Provider VLAN ID and fixed value 13B to form the Service VLAN ID of the customer MAC frame with the Provider VLAN ID. An arbitrary connection method can be employed. The Provider VLAN ID may be set to upper bits, and the fixed value may be set to lower bits. Conversely, the Provider VLAN ID may be set to lower bits, and the fixed value may be set to upper bits. Alternatively, the Provider VLAN ID may be assigned to arbitrary bits of the Service VLAN ID, and the fixed value may be assigned to the remaining arbitrary bits.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port. The edge Bridge 2A adds a VLAN tag containing a Provider VLAN ID to the customer MAC frame and transmits it to the stacked VLAN port.

If no corresponding field is present in the table, the edge Bridge 2A handles the customer MAC frame equally to a broadcast customer MAC frame.

The edge Bridge 2A sets the MAC address preset for the backbone-facing port, customer-facing port, or another edge Bridge as the source backbone MAC address of the customer MAC frame.

The edge Bridge 2A encapsulates the customer MAC frame into the backbone MAC frame format 14C (FIG. 20) on the basis of the destination backbone MAC address, source backbone MAC address, and Service VLAN ID. The edge Bridge 2A transmits the encapsulated backbone MAC frame to the backbone-facing port 7A or 7B.

An operation of forwarding the customer MAC frame from the backbone network 1 to the stacked VLAN network 4E will be described next.

When a customer MAC frame is input to the backbone network 1, the customer MAC frame is encapsulated into the backbone MAC frame format.

The edge Bridge 2A receives the backbone MAC frame from the backbone-facing port 7A connected to the backbone network 1. The edge Bridge 2A refers to the Service VLAN ID in the backbone MAC frame and sets it to the Service VLAN ID of the customer MAC frame contained in the backbone MAC frame.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port. The edge Bridge 2A sets part of the Service VLAN ID to the Provider VLAN ID to be added to the customer MAC frame.

The Provider VLAN ID can be extracted from an arbitrary position. The Provider VLAN ID can be extracted from either the upper bits or lower bits of the Service VLAN ID. Alternatively, the Provider VLAN ID may be formed by connecting arbitrary bits of the Service VLAN ID. The edge Bridge 2A adds a VLAN tag containing the Provider VLAN ID to the customer MAC frame and transmits it to the stacked VLAN port.

If no corresponding field is present in the table, the edge Bridge 2A handles the customer MAC frame equally to a broadcast customer MAC frame.

As described above, according to this embodiment, the stacked VLAN and backbone network are connected by a single apparatus. Hence, two apparatuses, i.e., a stacked VLAN edge Bridge and edge Bridge are unnecessary. In addition, the problem of absence of the means for identifying the Provider VLAN and Service VLAN of the customer MAC frame forwarded between the two, stacked VLAN edge Bridge and edge Bridge is solved. It is unnecessary to prepare ports for the respective Provider VLANs and Service VLANs as an alternate means for identifying the Provider VLAN and Service VLAN of the customer MAC frame. Hence, many ports and cables need not be provided (corresponding to claims 16 to 18).

Furthermore, forwarding processing (fixed value assignment) is executed at a high speed. When the stacked VLAN network and backbone network are connected to each other, conversion of the provider and Service VLAN is executed by the edge Bridge at a high speed. In addition, no table having an enormous memory space is necessary for conversion of the Provider VLAN ID and Service VLAN ID (corresponding to claims 19 and 20).

Fourth Embodiment

Figures 16A, 16B, 16C:
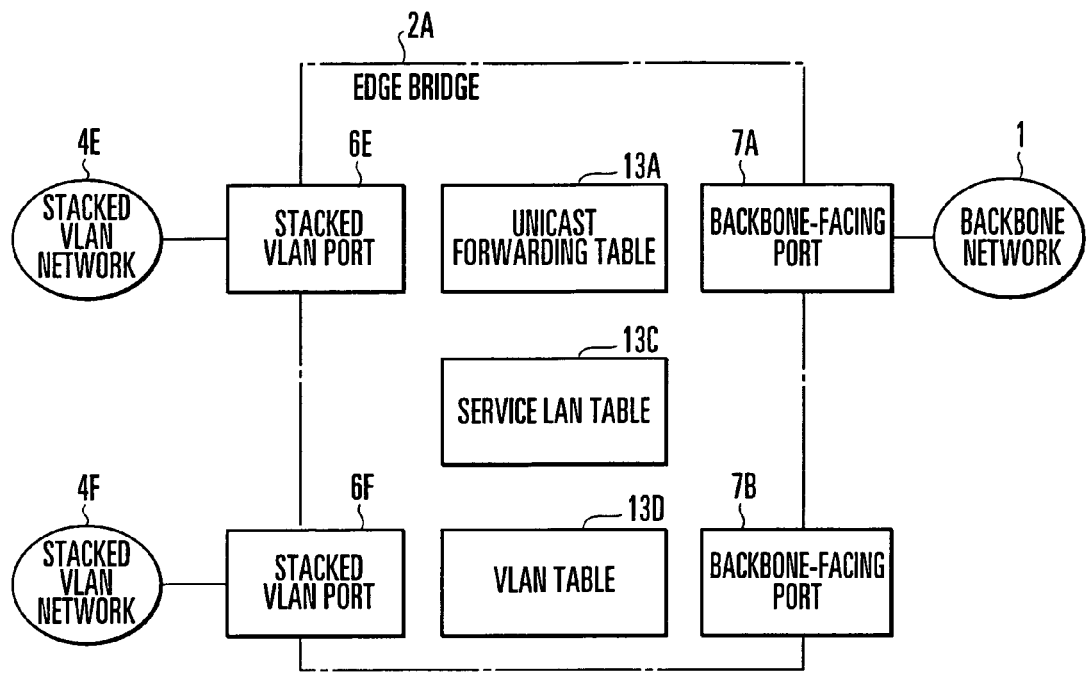
FIG. 16A is a block diagram showing an arrangement example of a network to which a customer MAC frame forwarding method according to the fourth embodiment of the present invention is applied.
FIG. 16B is a view showing an arrangement example of a Service VLAN table used in an edge Bridge according to the fourth embodiment of the present invention.
FIG. 16C is a view showing an arrangement example of a VLAN table used in an edge Bridge according to the fourth embodiment of the present invention.

A customer MAC frame forwarding method and edge Bridge according to the fourth embodiment of the present invention will be described next with reference to FIGS. 16A to 16C. FIG. 16A is a block diagram showing an arrangement example of a network to which the customer MAC frame forwarding method according to the fourth embodiment of the present invention is applied. The same reference numerals as in FIGS. 1, 2, and 15A described above denote the same or similar parts in FIG. 16A (corresponding to claims 16 to 18, 21, and 22). FIG. 16B is a view showing an arrangement example of a Service VLAN table used in the edge Bridge according to the fourth embodiment of the present invention.

FIG. 16C is a view showing an arrangement example of a VLAN table used in the edge Bridge according to the fourth embodiment of the present invention.

Referring to FIG. 16A, an edge Bridge 2A has a plurality of stacked VLAN ports 6E and 6F and a plurality of backbone-facing ports 7A and 7B. The number of stacked VLAN ports 6E and 6F and the number of backbone-facing ports 7A and 7B are determined as needed. A plurality of stacked VLAN ports or backbone-facing ports need not always be provided. The edge Bridge 2A may also have one or a plurality of customer-facing ports to transmit/receive a customer MAC frame.

The edge Bridge 2A has a Service VLAN table 13C and a VLAN table 13D in addition to a forwarding table 13A.

In the example shown in FIG. 16A, the edge Bridge 2A is connected to a backbone network 1 through the backbone-facing port 7A, to a stacked VLAN network 4E through the stacked VLAN port 6E, and to a stacked VLAN network 4F through the stacked VLAN port 6F.

Operation of Fourth embodiment

As the operation of the edge Bridge according to the fourth embodiment of the present invention, an example will be described in which a customer MAC frame is forwarded from the stacked VLAN network 4E to the backbone network 1 in FIG. 16A (corresponding to claim 16).

When a customer MAC frame is input to the stacked VLAN network 4E, a VLAN tag is added to the customer MAC frame, and the customer MAC frame is converted into the stacked VLAN/MAC frame format.

The edge Bridge 2A receives the stacked VLAN/MAC frame from the stacked VLAN port 6C connected to the stacked VLAN network 4E.

The edge Bridge 2A determines the Service VLAN ID of the customer MAC frame on the basis of at least one of the Provider VLAN ID in the stacked VLAN/MAC frame, the VLAN ID of the customer MAC frame with the Provider VLAN ID, and the stacked VLAN port.

For example, a search result obtained by searching a table like the Service VLAN table 13C on the basis of the Provider VLAN ID, VLAN ID, and stacked VLAN port is connected to the Provider VLAN ID to form the Service VLAN ID of the customer MAC frame. An arbitrary connection method can be employed. The Provider VLAN ID may be set to upper bits, and the search result may be set to lower bits. Conversely, the Provider VLAN ID may be set to lower bits, and the search result may be set to upper bits. Alternatively, the Provider VLAN ID may be assigned to arbitrary bits of the Service VLAN ID, and the search result may be assigned to the remaining arbitrary bits.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port. The edge Bridge 2A adds a VLAN tag containing a Provider VLAN ID to the customer MAC frame and transmits it to the stacked VLAN port.

If no corresponding field is present in the table, the edge Bridge 2A handles the customer MAC frame equally to a broadcast customer MAC frame.

The edge Bridge 2A sets the MAC address preset for the backbone-facing port, customer-facing port, or another edge Bridge as the source backbone MAC address of the customer MAC frame.

The edge Bridge 2A encapsulates the customer MAC frame into a backbone MAC frame format 14C (FIG. 20) on the basis of the destination backbone MAC address, source backbone MAC address, and VLAN ID. The edge Bridge 2A transmits the encapsulated backbone MAC frame to the backbone-facing port.

An operation of forwarding the customer MAC frame from the backbone network 1 to the stacked VLAN network 4E will be described next.

When a customer MAC frame is input to the backbone network 1, the customer MAC frame is encapsulated into the backbone MAC frame format.

The edge Bridge 2A receives the backbone MAC frame from the backbone-facing port 7A connected to the backbone network 1. The edge Bridge 2A refers to the Service VLAN ID in the backbone MAC frame and sets it to the Service VLAN ID of the customer MAC frame contained in the backbone MAC frame.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port. The edge Bridge 2A sets part of the Service VLAN ID to the Provider VLAN ID to be added to the customer MAC frame. The Provider VLAN ID can be extracted from an arbitrary position. The Provider VLAN ID can be extracted from either the upper bits or lower bits of the Service VLAN ID. Alternatively, the Provider VLAN ID may be formed by connecting arbitrary bits of the Service VLAN ID.

The edge Bridge 2A searches, e.g., the VLAN table 13D on the basis of at least one of the part of the Service VLAN ID of the customer MAC frame, the VLAN ID, and the stacked VLAN port, thereby determining the VLAN ID.

The edge Bridge 2A adds a VLAN tag containing the Provider VLAN ID to the customer MAC frame and transmits it to the stacked VLAN port.

If no corresponding field is present in the table, the edge Bridge 2A handles the customer MAC frame equally to a broadcast customer MAC frame.

As described above, according to this embodiment, the provider/Service VLAN and VLAN are converted. Hence, when an arbitrary VLAN belonging to an arbitrary Provider VLAN is to be connected to an arbitrary VLAN belonging to an arbitrary Service VLAN, setting for it is unnecessary for both the stacked VLAN edge Bridge and the edge Bridge (corresponding to claims 21 and 22).

Fifth Embodiment

Figures 17A, 17B, 17C:
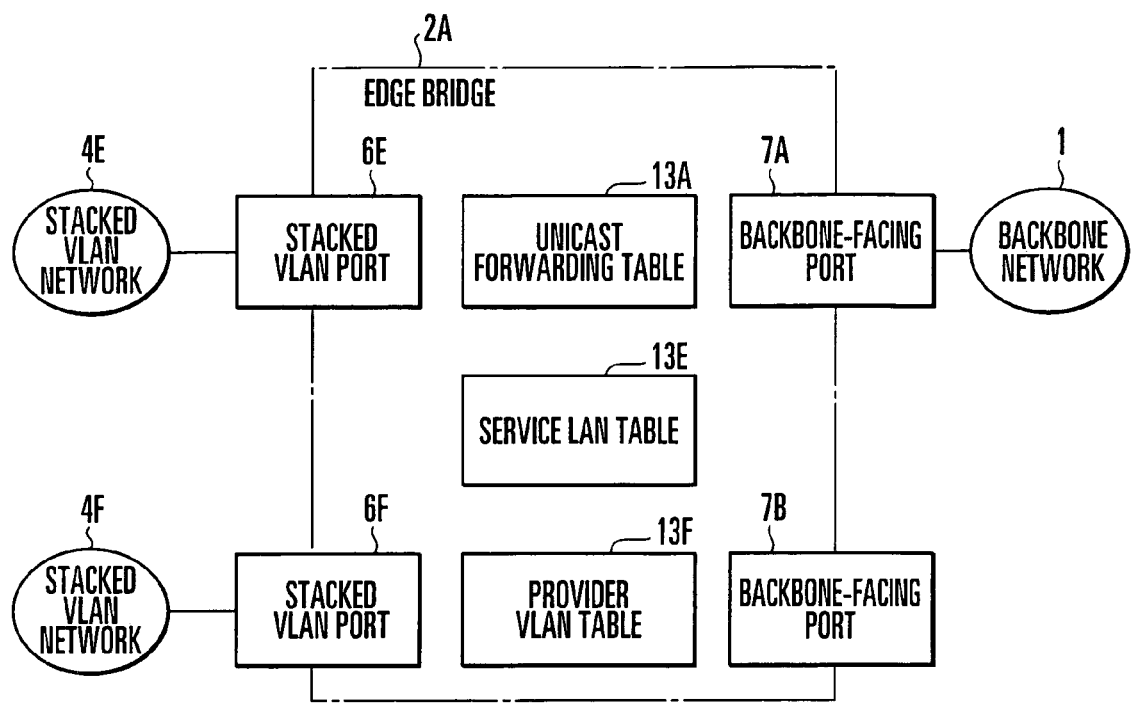
FIG. 17A is a block diagram showing an arrangement example of a network to which a customer MAC frame forwarding method according to the fifth embodiment of the present invention is applied.
FIG. 17B is a view showing an arrangement example of a Service VLAN table used in an edge Bridge according to the fifth embodiment of the present invention.
FIG. 17C is a view showing an arrangement example of a Provider VLAN table used in an edge Bridge according to the fifth embodiment of the present invention.

A customer MAC frame forwarding method and edge Bridge according to the fifth embodiment of the present invention will be described next with reference to FIGS. 17A to 17C. FIG. 17A is a block diagram showing an arrangement example of a network to which the customer MAC frame forwarding method according to the fifth embodiment of the present invention is applied. The same reference numerals as in FIGS. 1, 2, and 15A described above denote the same or similar parts in FIG. 17A (corresponding to claims 16 to 18, 23, and 24). FIG. 17B is a view showing an arrangement example of a Service VLAN table used in the edge Bridge according to the fifth embodiment of the present invention. FIG. 17C is a view showing an arrangement example of a VLAN table used in the edge Bridge according to the fifth embodiment of the present invention.

Referring to FIG. 17A, an edge Bridge 2A has a plurality of stacked VLAN ports 6E and 6F and a plurality of backbone-facing ports 7A and 7B. The number of stacked VLAN ports and the number of backbone-facing ports are determined as needed. A plurality of stacked VLAN ports or backbone-facing ports need not always be provided.

The edge Bridge 2A may also have one or a plurality of customer-facing ports to transmit/receive a customer MAC frame.

The edge Bridge 2A has a Service VLAN table 13E and a Provider VLAN table 13F in addition to a forwarding table 13A.

In the example shown in FIG. 3, the edge Bridge 2A is connected to a backbone network 1 through the backbone-facing port 7A, to a stacked VLAN network 4E through the stacked VLAN port 6E, and to a stacked VLAN network 4F through the stacked VLAN port 6F.

Operation of Fifth Embodiment

As the operation of the edge Bridge according to the fifth embodiment of the present invention, an example will be described in which a customer MAC frame is forwarded from the stacked VLAN network 4E to the backbone network 1 in FIG. 17A (corresponding to claim 16).

When a customer MAC frame is input to the stacked VLAN network 4E, a VLAN tag is added to the customer MAC frame, and the customer MAC frame is converted into the stacked VLAN/MAC frame format.

The edge Bridge 2A receives the stacked VLAN/MAC frame from the stacked VLAN port 6E connected to the stacked VLAN network 4E.

The edge Bridge 2A determines the Service VLAN ID and VLAN ID of the customer MAC frame on the basis of at least one of the Provider VLAN ID in the stacked VLAN/MAC frame, the VLAN ID of the customer MAC frame with the Provider VLAN ID, and the stacked VLAN port.

For example, a table like the Service VLAN table 13E is searched on the basis of the Provider VLAN ID, VLAN ID, and stacked VLAN port to determine the Service VLAN ID and VLAN ID of the customer MAC frame.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port. The edge Bridge 2A adds a VLAN tag containing a Provider VLAN ID to the customer MAC frame and transmits it to the stacked VLAN port.

If no corresponding field is present in the table, the edge Bridge 2A handles the customer MAC frame equally to a broadcast customer MAC frame.

The edge Bridge 2A sets the MAC address preset for the backbone-facing port, customer-facing port, or another edge Bridge as the source backbone MAC address of the customer MAC frame.

The edge Bridge 2A encapsulates the customer MAC frame into a backbone MAC frame format 14C (FIG. 20) on the basis of the destination backbone MAC address, source backbone MAC address, and Service VLAN ID. The edge Bridge 2A transmits the encapsulated backbone MAC frame to the backbone-facing port.

An operation of forwarding the customer MAC frame from the backbone network 1 to the stacked VLAN network 4E will be described next.

When a customer MAC frame is input to the backbone network 1, the customer MAC frame is encapsulated into the backbone MAC frame format.

The edge Bridge 2A receives the backbone MAC frame from the backbone-facing port 7A connected to the backbone network 1. The edge Bridge 2A refers to the Service VLAN ID in the backbone MAC frame and sets it to the Service VLAN ID of the customer MAC frame contained in the backbone MAC frame.

The edge Bridge 2A searches, e.g., the forwarding table 13A on the basis of at least one of the Service VLAN ID, VLAN ID, and destination MAC address of the customer MAC frame, thereby determining the destination backbone MAC address and backbone-facing port to transmit. When the destination of the customer MAC frame is present ahead of the stacked VLAN port of the edge Bridge 2A and is learned by the edge Bridge 2A in advance, the search result is not a destination backbone MAC address and backbone-facing port but a stacked VLAN port.

The edge Bridge 2A searches, e.g., the Provider VLAN table 13F on the basis of at least one of the part of the Service VLAN ID of the customer MAC frame, the VLAN ID, and the stacked VLAN port, thereby determining the Provider VLAN ID and VLAN ID.

The edge Bridge 2A adds a VLAN tag containing the Provider VLAN ID to the customer MAC frame and transmits it to the stacked VLAN port.

If no corresponding field is present in the table, the edge Bridge 2A handles the customer MAC frame equally to a broadcast customer MAC frame.

As described above, according to this embodiment, the provider/Service VLAN and VLAN are converted. Hence, when an arbitrary VLAN belonging to an arbitrary Provider VLAN is to be connected to an arbitrary VLAN belonging to an arbitrary Service VLAN, setting for it is unnecessary for both the stacked VLAN edge Bridge and the edge Bridge (corresponding to claims 23 and 24).

[Operation Flow]

Figure 24A:
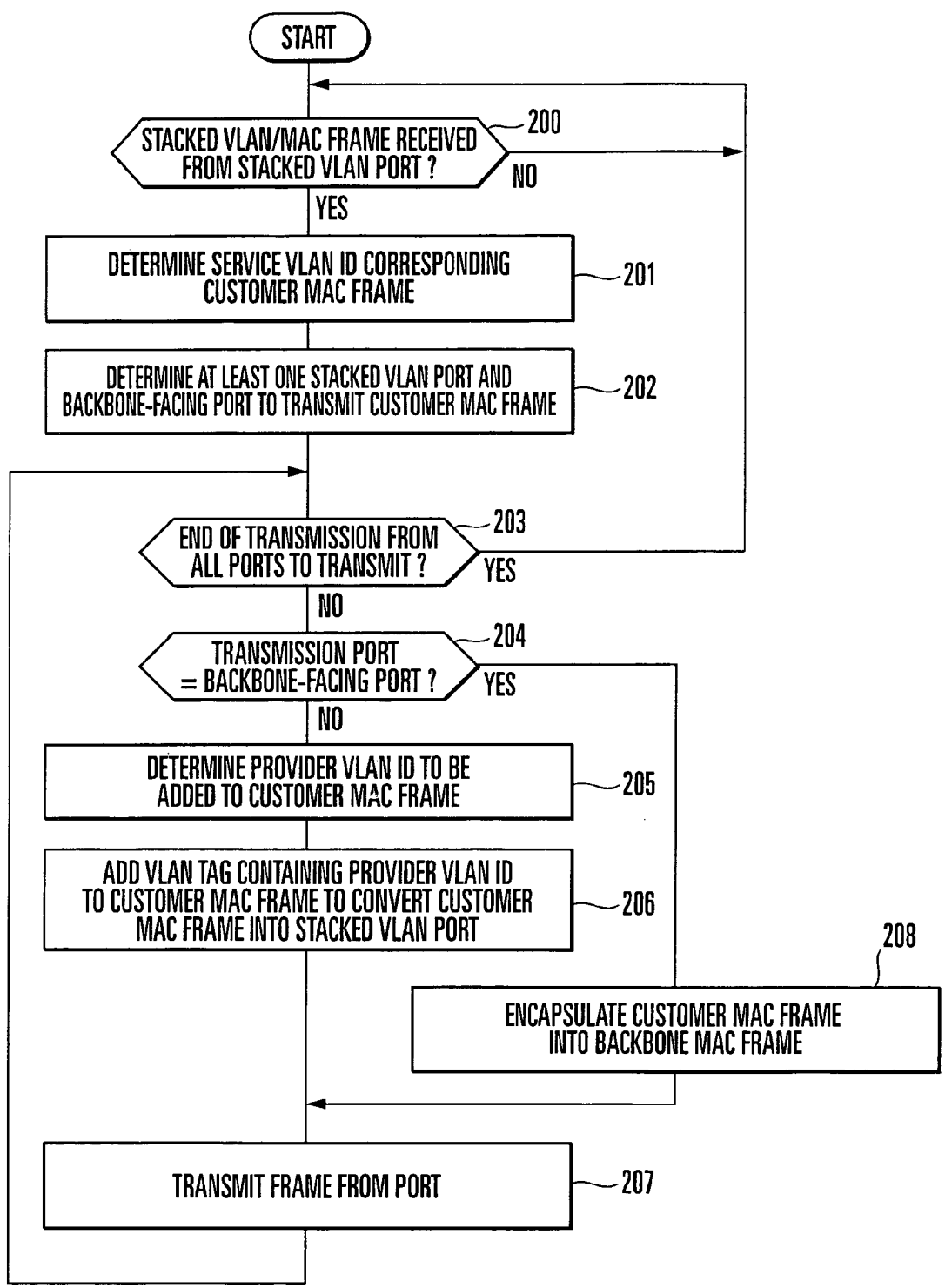
FIG. 24A is a flowchart (transmitting side) showing customer MAC frame forwarding processing of the edge Bridges according to the third to fifth embodiments of the present invention.
Figure 24B:
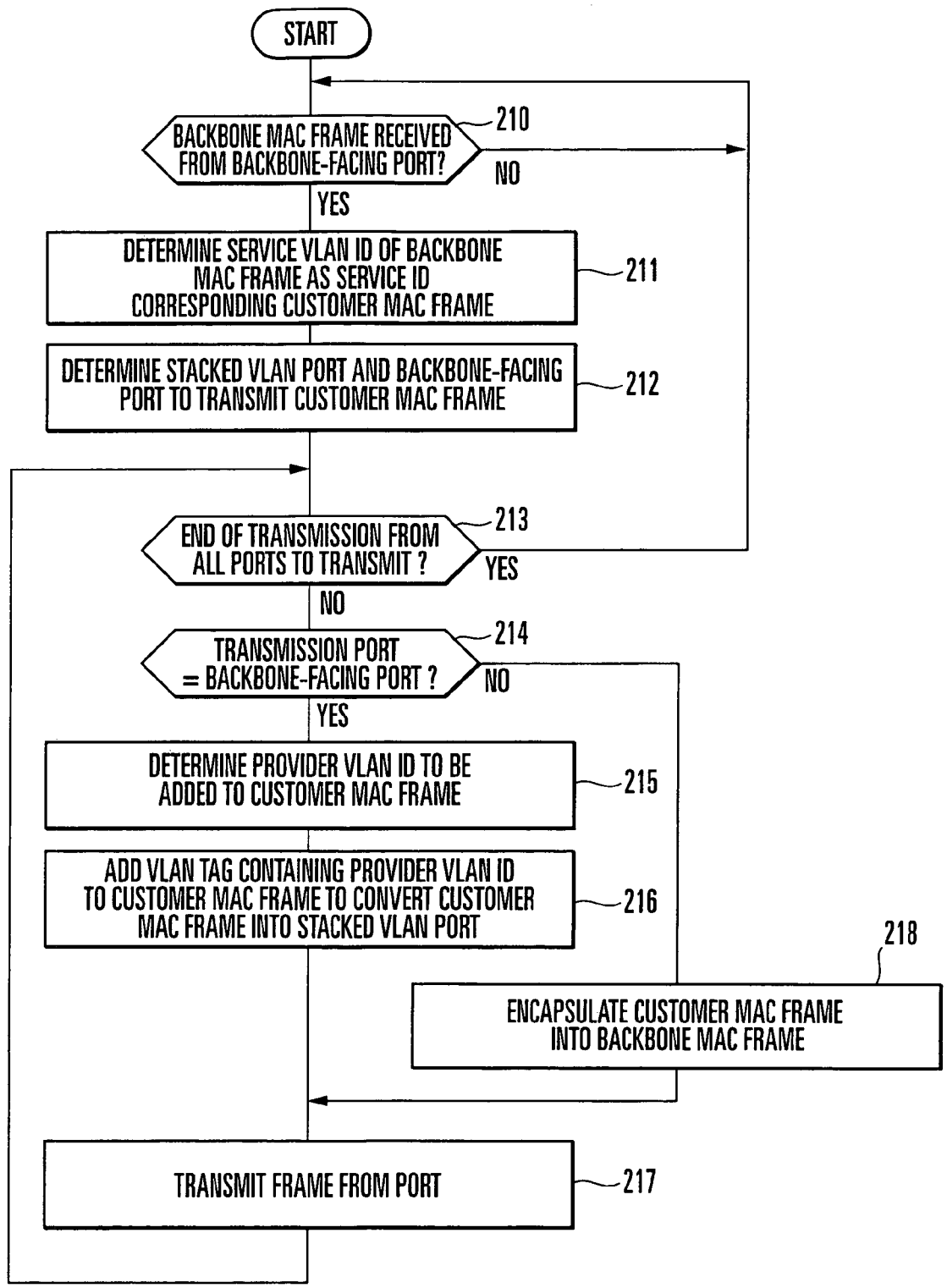
FIG. 24B is a flowchart (receiving side) showing customer MAC frame forwarding processing of the edge Bridges according to the third to fifth embodiments of the present invention.

An example of the operation flow of the customer MAC frame forwarding methods according to the above-described third to fifth embodiments will be described next with reference to FIGS. 24A and 24B (corresponding to claim 16). FIG. 24A is a flowchart (transmitting side) showing customer MAC frame forwarding processing of the edge Bridges according to the third to fifth embodiments of the present invention. FIG. 24B is a flowchart (receiving side) showing customer MAC frame forwarding processing of the edge Bridges according to the third to fifth embodiments of the present invention.

FIG. 24A shows processing of determining the frame format in advance and processing executed when a stacked VLAN frame is received from a stacked VLAN port. FIG. 24B shows processing executed when a backbone MAC frame is received from a backbone-facing port.

Referring to FIG. 24A, when a stacked VLAN/MAC frame is received from a stacked VLAN port (step 200: YES), on the basis of at least one of the Provider VLAN ID contained in the stacked VLAN/MAC frame, the VLAN ID of the customer MAC frame with the Provider VLAN ID, and the stacked VLAN port, a Service VLAN ID corresponding to the customer MAC frame is determined (step 201).

Next, on the basis of at least one of the Service VLAN ID, Provider VLAN ID, VLAN ID, and the destination MAC address of the customer MAC frame, at least one stacked VLAN port and backbone-facing port to transmit the customer MAC frame are determined (step 202).

When the stacked VLAN/MAC frame is transmitted from all transmission ports (step 203: YES), the flow returns to step 200. Otherwise (step 203: NO), it is determined whether the transmission port is a backbone-facing port or stacked VLAN port (step 204).

If the transmission port is not a backbone-facing port but a stacked VLAN port (step 204: NO), the Provider VLAN ID to be added to the customer MAC frame is determined (step 205).

A VLAN tag containing the Provider VLAN ID is added to the customer MAC frame to convert the customer MAC frame into a stacked VLAN frame (step 206). After the stacked VLAN frame is transmitted from the port (step 207), the flow returns to step 203 to repeat the processing in steps 203 to 208 again.

On the other hand, if the transmission port is a backbone-facing port (step 204: YES), the customer MAC frame is encapsulated into a backbone MAC frame (step 208). The backbone MAC frame formed by encapsulating the customer MAC frame is transmitted from the backbone-facing port (step 206). The flow returns to step 203 to repeat the processing in steps 203 to 208 again.

Referring to FIG. 24B, when a backbone MAC frame is received from a backbone-facing port (step 210), the Service VLAN ID contained in the backbone MAC frame is set to the Service VLAN ID corresponding to the customer MAC frame contained in the backbone MAC frame (step 211).

On the basis of at least one of the Service VLAN ID, the destination MAC address of the customer MAC frame, the VLAN ID, and the destination backbone MAC address of the backbone MAC frame, a stacked VLAN port and backbone-facing port to transmit the customer MAC frame are determined (step 212).

When the customer MAC frame is transmitted from all transmission ports (step 213: YES), the flow returns to step 210 to execute processing up to step 212 again. Otherwise (step 213: NO), it is determined whether the transmission port is a backbone-facing port or stacked VLAN port (step 214).

If the transmission port is not a backbone-facing port but a stacked VLAN port (step 214: NO), the Provider VLAN ID to be added to the customer MAC frame is determined (step 217).

A VLAN tag containing the Provider VLAN ID is added to the customer MAC frame to convert the customer MAC frame into a stacked VLAN/MAC frame (step 216). After the stacked VLAN frame is transmitted from the port (step 217), the flow returns to step 213 to repeat the processing in steps 213 to 218 again.

On the other hand, if the transmission port is a backbone-facing port (step 214: YES), the customer MAC frame is encapsulated into a backbone MAC frame (step 215). The backbone MAC frame formed by encapsulating the customer MAC frame is transmitted from the backbone-facing port (step 216). The flow returns to step 213 to repeat the processing in steps 203 to 208 again.

Figure 25A:
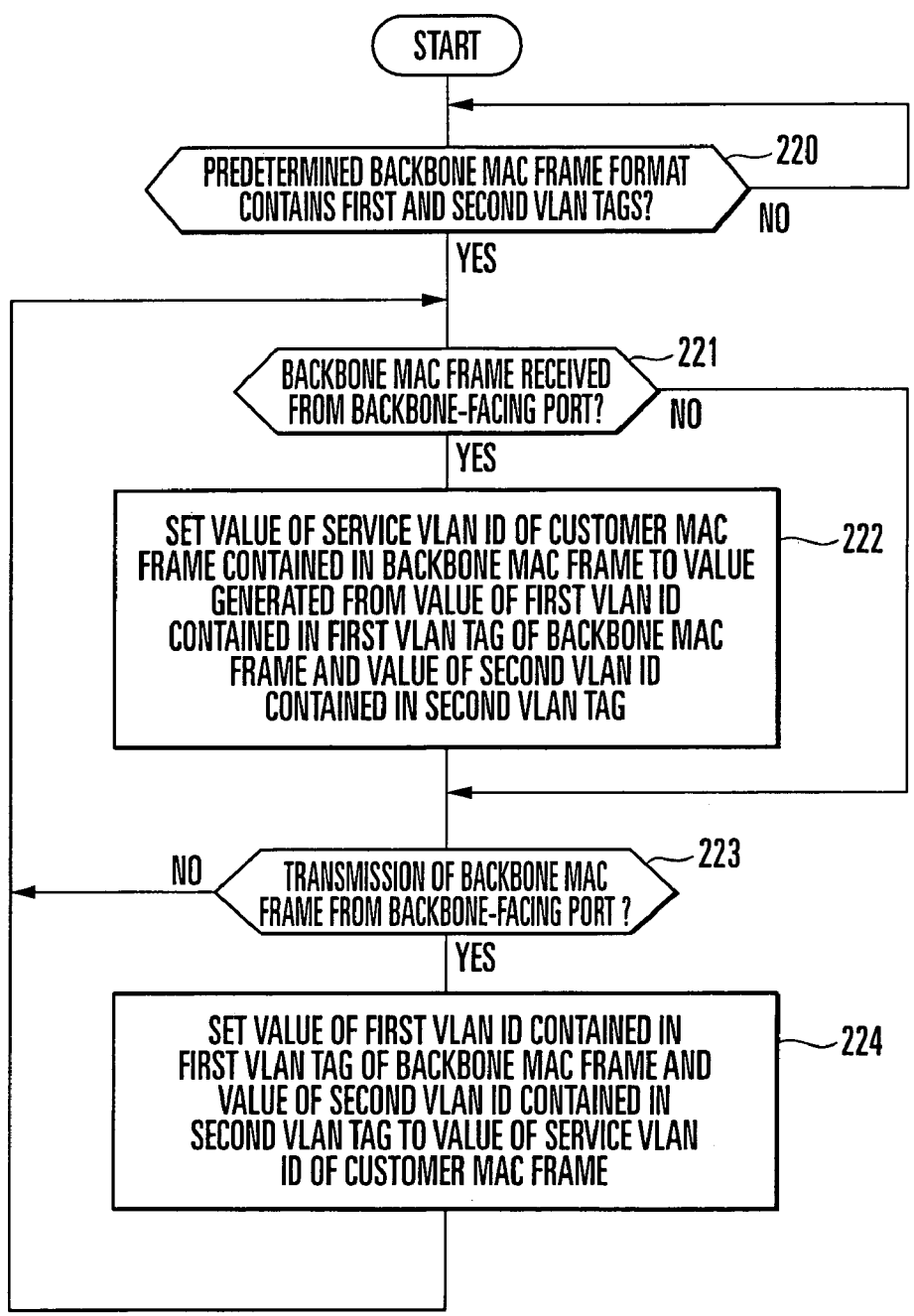
FIG. 25A is a flowchart (transmitting side) showing another customer MAC frame forwarding processing of the edge Bridges according to the third to fifth embodiments of the present invention.
Figure 25B:
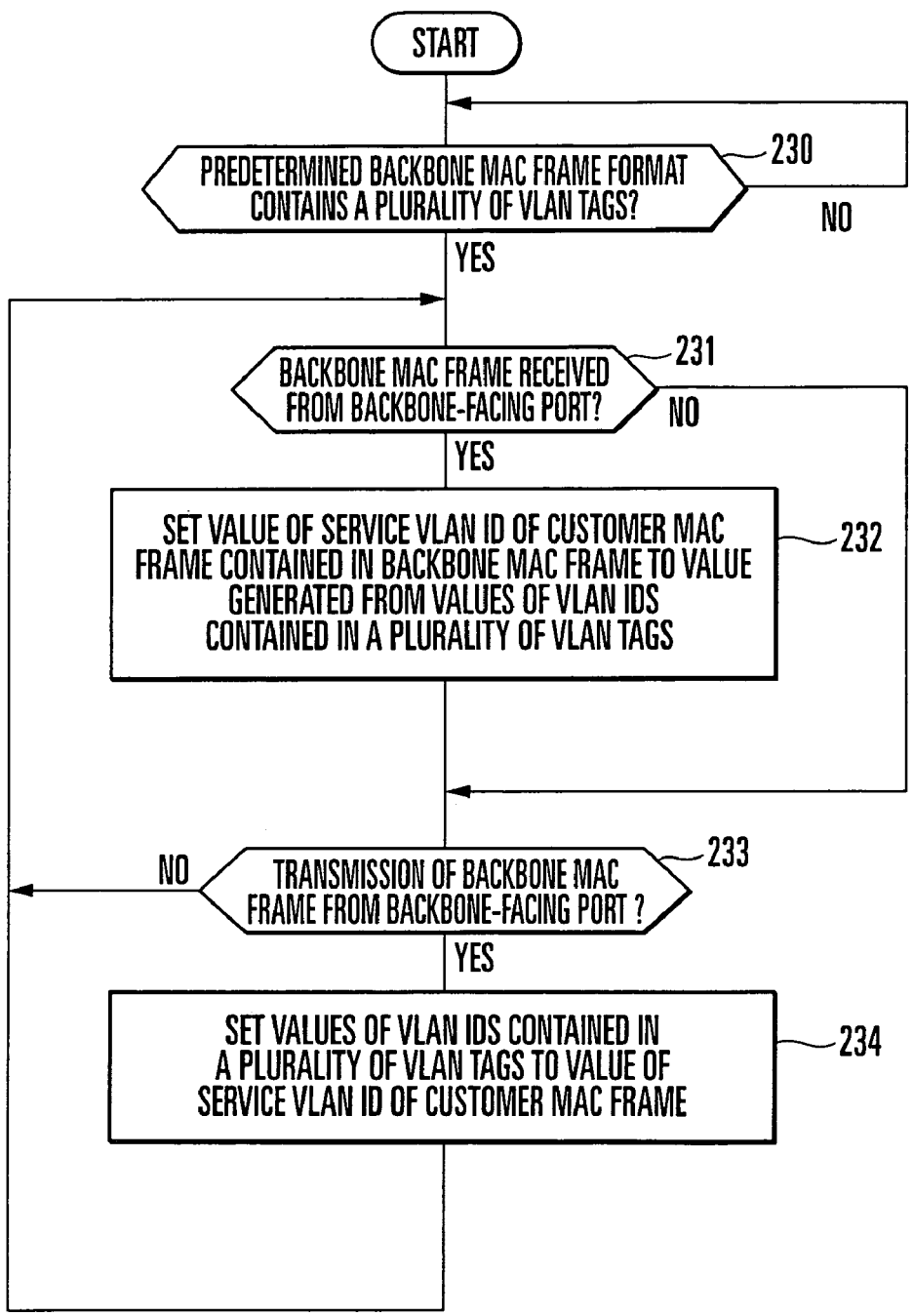
FIG. 25B is a flowchart (receiving side) showing another customer MAC frame forwarding processing of the edge Bridges according to the third to fifth embodiments of the present invention.

Another example of the operation flow of the customer MAC frame forwarding methods according to the above-described third to fifth embodiments will be described next with reference to FIGS. 25A and 25B (corresponding to claims 16 and 17). FIG. 25A is a flowchart (transmitting side) showing another customer MAC frame forwarding processing of the edge Bridges according to the third to fifth embodiments of the present invention. FIG. 25B is a flowchart (receiving side) showing another customer MAC frame forwarding processing of the edge Bridges according to the third to fifth embodiments of the present invention.

Referring to FIG. 25A, in addition to the processing shown in FIG. 24A, the edge Bridge 2A confirms that the predetermined backbone MAC frame format contains first and second VLAN tags (step 220: YES). When a backbone MAC frame is received from the backbone-facing port (step 221: YES), the value of the Service VLAN ID of the customer MAC frame contained in the backbone MAC frame is set to a value generated from the value of the first VLAN ID contained in the first VLAN tag of the backbone MAC frame and the value of the second VLAN ID contained in the second VLAN tag (step 222).

It is determined whether to transmit the backbone MAC frame from a backbone-facing port (step 223). If the backbone MAC frame is not to be transmitted from a backbone-facing port (step 223: NO), the flow returns to step 221. If the backbone MAC frame is to be transmitted from a backbone-facing port (step 223: YES), the value of the first VLAN ID contained in the first VLAN tag of the backbone MAC frame and the value of the second VLAN ID contained in the second VLAN tag are set to values generated from the value of the Service VLAN ID of the customer MAC frame (step 224). The flow returns to step 221 to repeatedly execute the processing up to step 224 (claim 17).

Referring to FIG. 25B, in addition to the processing shown in FIG. 24B, the edge Bridge 2A confirms that the predetermined backbone MAC frame format contains a plurality of VLAN tags (step 230: YES). It is determined whether a backbone MAC frame is received from a backbone-facing port (step 231). If a backbone MAC frame is received (step 231: YES), the value of the Service VLAN ID of the customer MAC frame contained in the backbone MAC frame is set to a value generated from the values of the VLAN IDs contained in the plurality of VLAN tags of the backbone MAC frame (step 232).

It is determined whether to transmit the backbone MAC frame from a backbone-facing port (step 233). If the backbone MAC frame is not to be transmitted from a backbone-facing port (step 233: NO), the flow returns to step 231. If the backbone MAC frame is to be transmitted from a backbone-facing port (step 233: YES), the values of the VLAN IDs contained in the plurality of VLAN tags of the backbone MAC frame are set to values generated from the value of the Service VLAN ID of the customer MAC frame (step 234). The flow returns to step 231 to repeatedly execute the processing up to step 234 (claim 18).

[Functional Arrangement]

Figure 26:
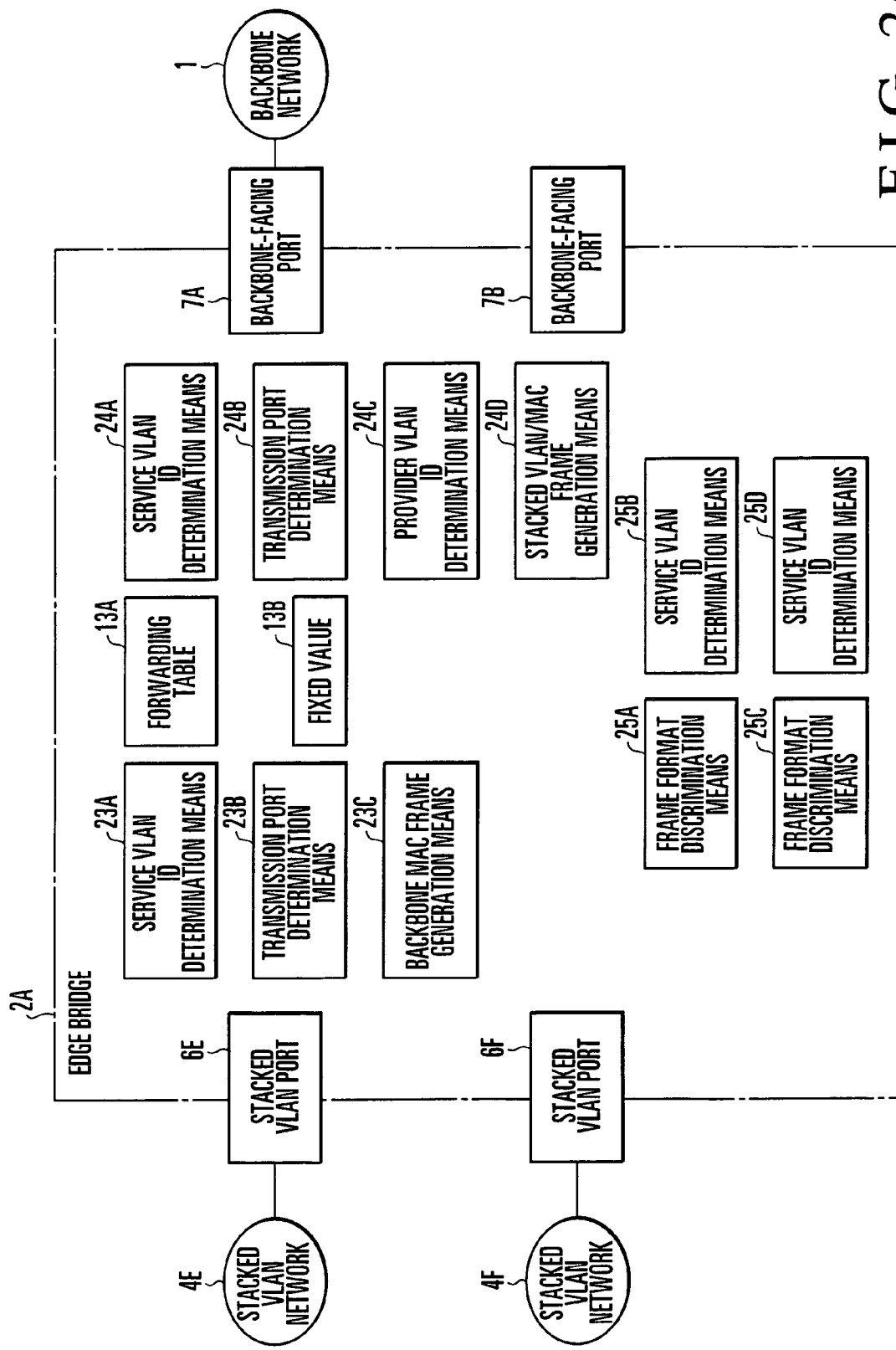
FIG. 26 is a functional block diagram showing an arrangement example of the edge Bridges according to the third to fifth embodiments of the present invention.

The functional arrangement of the edge Bridges according to the third to fifth embodiments of the present invention will be described next with reference to FIG. 26. FIG. 26 is a functional block diagram of the edge Bridges according to the third to fifth embodiments of the present invention.

The edge Bridge 2A according to the third to fifth embodiments of the present invention comprises, as functional means necessary for frame forwarding, a Service VLAN ID determination means 23A, transmission port determination means 23B, backbone MAC frame generation means 23C, Service VLAN ID determination means 24A, transmission port determination means 24B, Provider VLAN ID determination means 24C, and stacked VLAN/MAC frame generation means 24D in addition to the functional arrangement (FIGS. 1 and 2) of the above-described first or second embodiment or to replace similar functions (corresponding to claim 16).

Another edge Bridge 2A according to the third to fifth embodiments of the present invention further comprises a frame format discrimination means 25A and Service VLAN ID determination means 25B (corresponding to claim 17).

Still another edge Bridge 2A according to the third to fifth embodiments of the present invention further comprises a frame format discrimination means 25C and Service VLAN ID determination means 25D (corresponding to claim 18).

These functional means may be implemented by an information processing unit (not shown) having a CPU and peripheral circuits thereof. That is, these means are implemented by reading and executing a predetermined program to make the hardware and program cooperate. These means may be formed by a dedicated processing circuit.

The edge Bridge 2A comprises at least the stacked VLAN ports 6E and 6F which transmit/receive a stacked VLAN/MAC frame, and the backbone-facing ports 7A and 7B which transmit/receive a backbone MAC frame. In the example shown in FIG. 15 (third embodiment) described above, the forwarding table 13A and fixed value 13B are provided. In the examples shown in FIGS. 16A and 17A (fourth and fifth embodiments), the Service VLAN table 13C or 13G and the VLAN table 13D or Provider VLAN table 13F are provided in addition to the forwarding table 13A.

The Service VLAN ID determination means 23A has a function of, upon receiving a stacked VLAN/MAC frame from a stacked VLAN port, determining the Service VLAN ID corresponding to the customer MAC frame on the basis of at least one of the Provider VLAN ID contained in the stacked VLAN/MAC frame, the VLAN ID of the customer MAC frame with the Provider VLAN ID, and the stacked VLAN port.

The transmission port determination means 23B has a function of determining, on the basis of at least one of the Service VLAN ID, Provider VLAN ID, VLAN ID, and the destination MAC address of the customer MAC frame, at least one stacked VLAN port and backbone-facing port to transmit the customer MAC frame.

The backbone MAC frame generation means 23C has a function of encapsulating the customer MAC frame into a backbone MAC frame when it is determined that the customer MAC frame is to be transmitted from the backbone-facing port.

The Service VLAN ID determination means 24A has a function of, upon receiving a backbone MAC frame from a backbone-facing port, setting the Service VLAN ID contained in the backbone MAC frame to the Service VLAN ID corresponding to the customer MAC frame contained in the backbone MAC frame.

The transmission port determination means 24B has a function of determining, on the basis of at least one of the Service VLAN ID, the destination MAC address of the customer MAC frame, the VLAN ID, and the destination backbone MAC address of the backbone MAC frame, at least one stacked VLAN port and backbone-facing port to transmit the customer MAC frame.

The Provider VLAN ID determination means 24C has a function of, when the customer MAC frame is to be transmitted from a stacked VLAN port, determining the Provider VLAN ID to be added to the customer MAC frame on the basis of at least one of the Service VLAN ID, VLAN ID, and stacked VLAN port.

The stacked VLAN/MAC frame generation means 24D has a function of converting the customer MAC frame into a stacked VLAN/MAC frame by adding the Provider VLAN ID to the customer MAC frame.

The frame format discrimination means 25A has a function of discriminating that the predetermined backbone MAC frame format contains first and second VLAN tags.

The Service VLAN ID determination means 25B has a function of, when a backbone MAC frame is to be transmitted/received from a backbone-facing port, setting the value of the Service VLAN ID of the backbone MAC frame to a value generated from the value of the first VLAN ID contained in the first VLAN tag and the value of the second VLAN ID contained in the second VLAN tag.

The frame format discrimination means 25C has a function of discriminating that the predetermined backbone MAC frame format contains a plurality of VLAN tags.

The Service VLAN ID determination means 25D has a function of, when a backbone MAC frame is to be transmitted/received from a backbone-facing port, setting the value of the Service VLAN ID of the backbone MAC frame to a value generated from the values of the VLAN IDs contained in the plurality of VLAN tags.

[Program]

The flows shown in FIGS. 24A and 25A are prepared as a program. The generated customer MAC frame forwarding program is stored in a recording medium such as a CD-ROM and loaded in the computer in the edge Bridge 2A. When the edge Bridge 2A is activated, the customer MAC frame forwarding program is installed in the main memory and executed by the computer. In this case, the present invention can easily be implemented.

Sixth Embodiment

Figure 27:
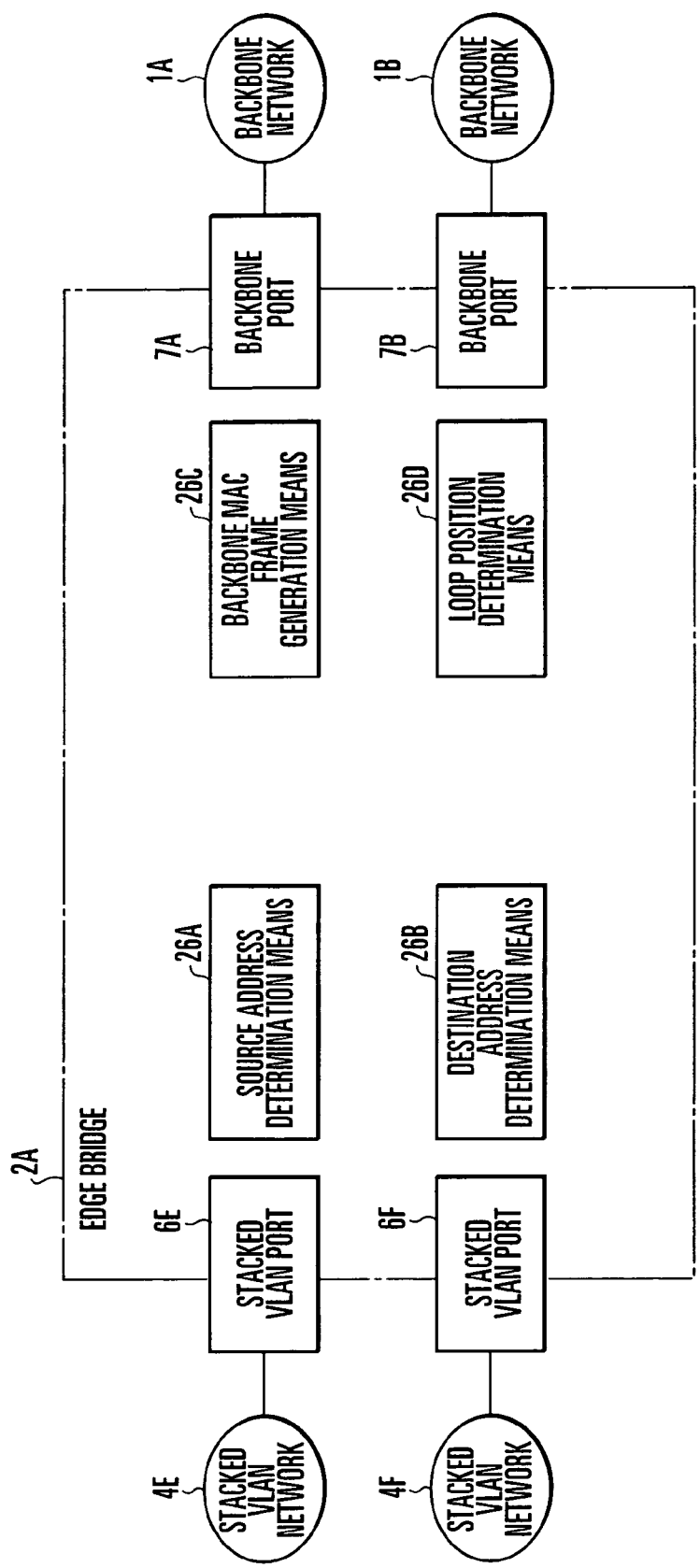
FIG. 27 is a block diagram showing an arrangement example of a network to which a customer MAC frame forwarding method according to the sixth embodiment of the present invention is applied.

A customer MAC frame forwarding method and edge Bridge according to the sixth embodiment of the present invention will be described next with reference to FIG. 27. FIG. 27 is a block diagram showing an arrangement example of a network to which the customer MAC frame forwarding method according to the sixth embodiment of the present invention is applied. The same reference numerals as in FIGS. 1 and 2 described above denote the same or similar parts in FIG. 27 (corresponding to claims 25 to 40).

Referring to FIG. 27, an edge Bridge 2A has a plurality of customer-facing ports 6E and 6F and a plurality of backbone-facing ports 7A and 7B. The number of customer-facing ports 6E and 6F and the number of backbone-facing ports 7A and 7B are determined as needed. A plurality of customer-facing ports or backbone-facing ports need not always be provided. In the edge Bridge 2A, a backbone MAC address is assigned in advance for each Bridge or each backbone-facing port.

The edge Bridge 2A is connected to a customer network 4E through the customer-facing port 6E, to a customer network 4F through the customer-facing port 6F, to a backbone network 1A through the backbone-facing port 7A, and to a backbone network 1B through the backbone-facing port 7B.

The edge Bridge 2A comprises, as functional means necessary for frame forwarding, a source address determination means 26A, destination address determination means 26B, backbone MAC frame generation means 26C, and loop position determination means 26D in addition to the functional arrangement of the above-described first to fifth embodiments or to replace similar functions.

These functional means may be implemented by an information processing unit (not shown) having a CPU and peripheral circuits thereof. That is, these means are implemented by reading and executing a predetermined program to make the hardware and program cooperate. These means may be formed by a dedicated processing circuit.

Figure 29:
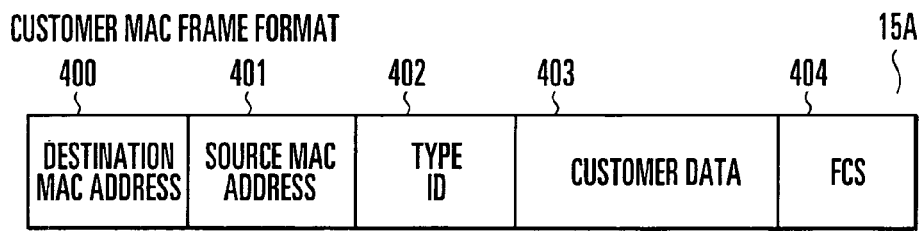
FIG. 29 is a view showing a format of a customer MAC frame transmitted/received by a customer-facing port of the edge Bridge according to the sixth embodiment of the present invention.

FIG. 29 is a view showing a format of a customer MAC frame transmitted/received by a customer-facing port of the edge Bridge according to the sixth embodiment of the present invention.

A customer MAC frame 15A shown in FIG. 29 is an example in which customer data is encapsulated in a MAC frame defined by IEEE802.3-202 standards. A destination MAC address 400 indicates Destination Address. A source MAC address 401 indicates Source Address. A type ID 402 indicates Length/Type.

The type of MAC Client Data as data to be encapsulated in a MAC frame is identified by the type ID 402. When the value of the type ID 402 is 0x0800, encapsulated customer data 403 is an IPv4 packet. An FCS 404 indicates Frame Check Sequence.

Figure 30:
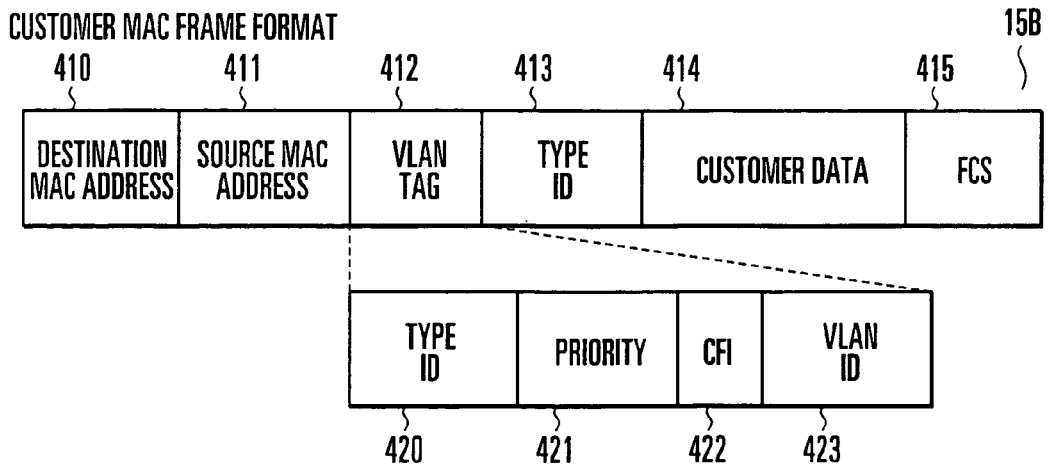
FIG. 30 is a view showing another format of the customer MAC frame transmitted/received by a customer-facing port of the edge Bridge according to the sixth embodiment of the present invention.
Figure 31:
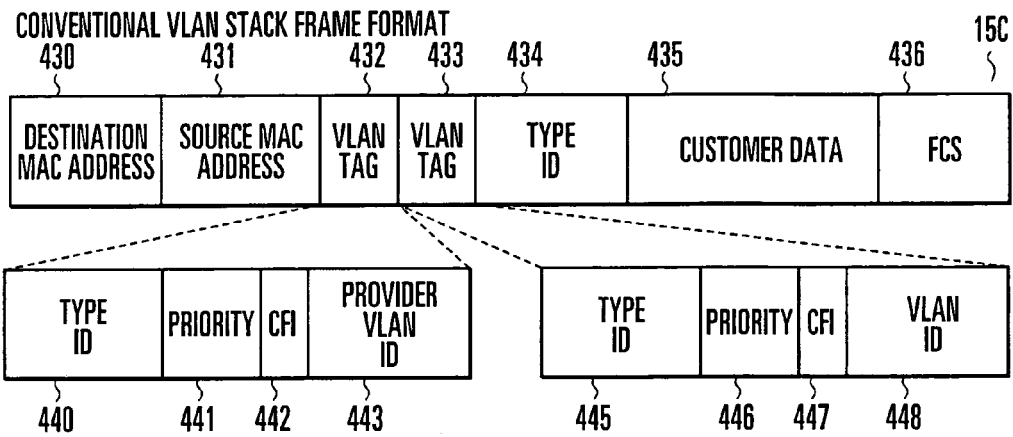
FIG. 31 is a view showing the format of a conventional VLAN stack frame.

FIG. 30 is a view showing another format of the customer MAC frame transmitted/received by a customer-facing port of the edge Bridge according to the sixth embodiment of the present invention.

A customer MAC frame 15B shown in FIG. 30 is an example in which Tag Header defined by IEEE802.1Q-2003 standards is added to the example of the customer MAC frame 15A. A type ID 420 indicates Tag Protocol ID which identifies the attribute of Tag Header. When the value of the type ID 420 is 0x8100, Tag Header is a VLAN tag 412.

A VLAN ID 423 is encapsulated in the VLAN tag 412, thereby tagging the MAC frame with the VLAN ID. The VLAN ID identifies a subset of topology of the network formed by the virtual LANs of the provider and the customer sites. A priority 421 indicates Customer Priority. A CFI 609 indicates Canonical Format ID. A type ID 413 identifies the type of encapsulated data, like the type ID 402 shown in FIG. 29.

Figure 35:
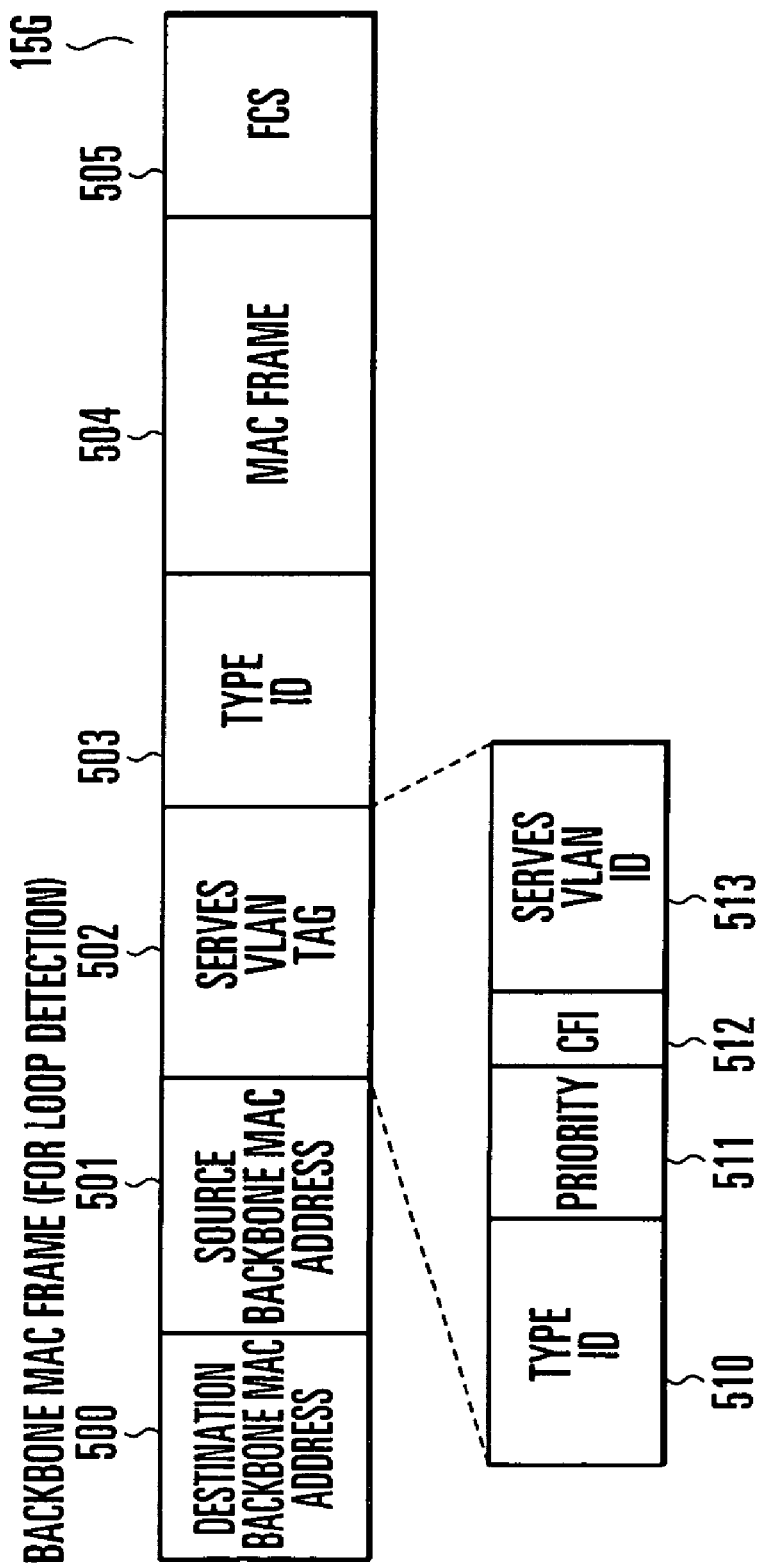
FIG. 35 is a view showing still another format of the loop detection backbone MAC frame used in the edge Bridge according to the sixth embodiment of the present invention.

FIG. 35 is a view showing a format of a loop detection backbone MAC frame used in the edge Bridge according to the sixth embodiment of the present invention.

A backbone MAC frame 15G shown in FIG. 35 is an example of a backbone frame which is formed by encapsulating a MAC frame 504 by a MAC frame tagged by a Service VLAN ID 500. This backbone frame is based on the IEEE standard shown in FIG. 30 except that the maximum frame length is longer than the maximum length of the MAC frame defined by the IEEE standard and that a Service VLAN tag is used in place of a customer VLAN tag.

Figure 36:
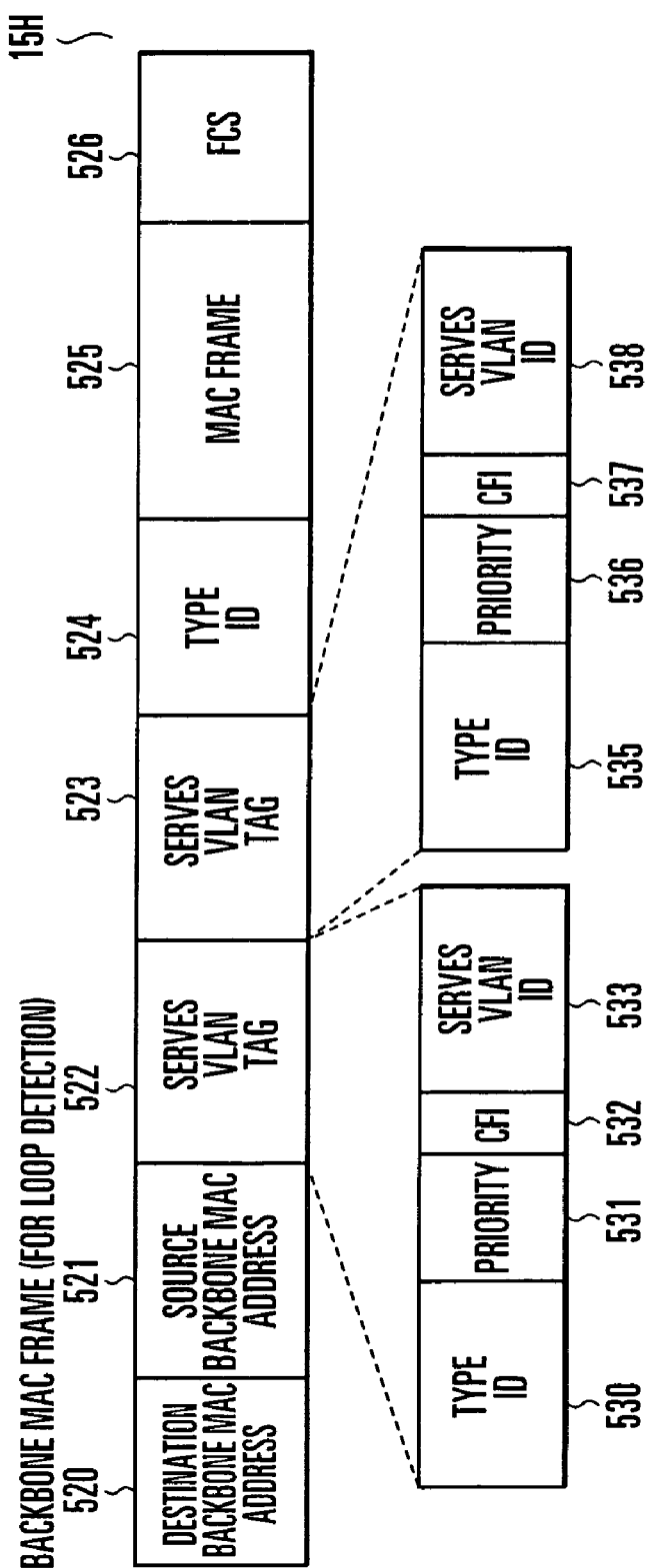
FIG. 36 is a view showing still another format of the loop detection backbone MAC frame used in the edge Bridge according to the sixth embodiment of the present invention.
Figure 37:
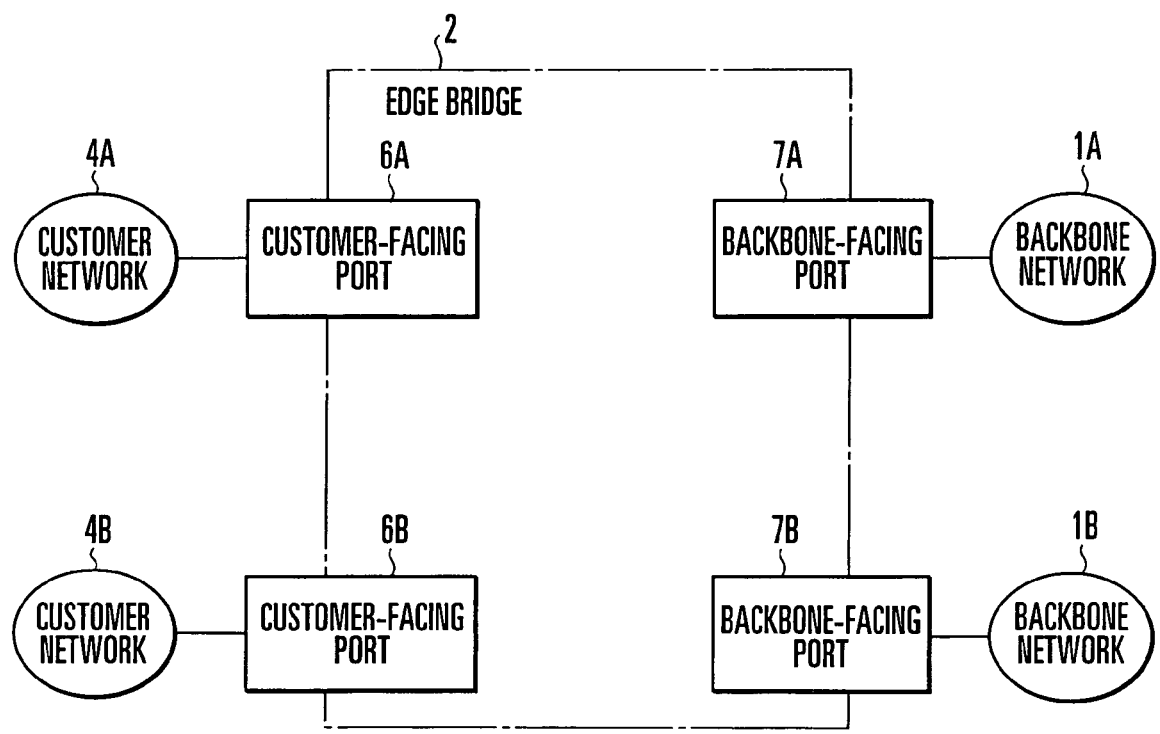
FIG. 37 is a block diagram showing an arrangement example of a network to which a conventional customer MAC frame forwarding method is applied.

The encapsulated MAC frame 504 may be a MAC frame formed by encapsulating customer data shown in FIG. 29 or 30. These are identified by a type ID 503. As indicated by a backbone MAC frame 15H shown in FIG. 36, a plurality of Service VLAN IDs 533 and 537 may be tagged to the backbone frame by a plurality of Service VLAN tags 522 and 523 and virtual LANs provided by the provider to customers may be identified by the plurality of Service VLAN IDs 533 and 537.

Operation of Sixth Embodiment

Figure 28:
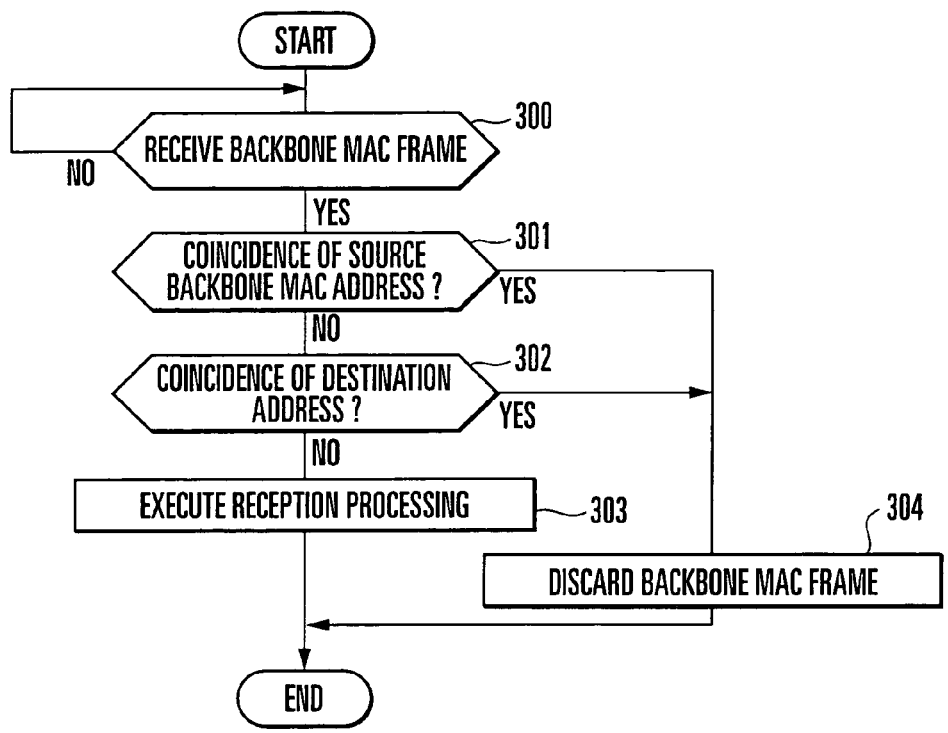
FIG. 28 is a flowchart showing customer MAC frame forwarding processing of an edge Bridge according to the sixth embodiment of the present invention.

The operation of the edge Bridge according to the sixth embodiment of the present invention will be described next with reference to FIG. 28. FIG. 28 is a flowchart showing customer MAC frame forwarding processing of the edge Bridge according to the sixth embodiment of the present invention.

The edge Bridge 2A receives a backbone MAC frame from the backbone-facing port 7A or 7B or customer-facing port 6A or 6B (step 300). The source address determination means 26A checks whether any one of a single or a plurality of addresses assigned to the edge Bridge 2A coincides with the source address of the received backbone MAC frame (step 301).

If the two addresses coincide (step 301: YES), it is determined that a loop is generated in the backbone network 1A or 1B. The received backbone MAC frame is discarded (step 304). An instruction to display warning and the check result is sent to the administration apparatus, and the series of frame forwarding processing operations is ended.

If no coincidence is detected by check, the source address determination means 26A checks whether the source address of the received backbone MAC frame is a broadcast address or multicast address.

If the addresses coincide, the received backbone MAC frame is discarded (step 304). An instruction to display warning and the check result is sent to the administration apparatus, and the series of frame forwarding processing operations is ended.

If no coincidence is detected by check (step 301: NO), and the edge Bridge executes no loop-back forwarding between the backbone-facing ports, the destination address determination means 26B checks whether any one of a single or a plurality of addresses assigned to the edge Bridge 2A coincides with the destination address of the received backbone MAC frame (step 302). If no coincidence is detected, the received backbone MAC frame is discarded (step 304), and the series of frame forwarding processing operations is ended. When addresses coincide, reception processing is executed (step 303), and the series of frame forwarding processing operations is ended.

Figure 32:
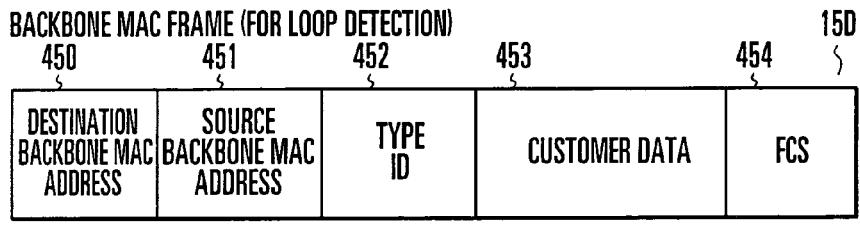
FIG. 32 is a view showing a format of a loop detection backbone MAC frame used in the edge Bridge according to the sixth embodiment of the present invention.

The backbone MAC frame generation means 26C generates a loop detection backbone MAC frame to detect a loop immediately when it is generated, and sends the loop detection backbone MAC frame from the backbone-facing ports 7A and 7B. FIG. 32 is a view showing a format of a loop detection backbone MAC frame used in the edge Bridge according to the sixth embodiment of the present invention.

In a backbone MAC frame 15D shown in FIG. 32, a broadcast address or a multicast address defined for loop detection is used as a destination MAC address 450. The backbone MAC address of the edge Bridge to transmit or the backbone MAC address of the backbone-facing port to transmit is used as a source MAC address 451. A type defined for loop detection is used as a type ID 452. Customer data 453 is an option.

Figure 33:
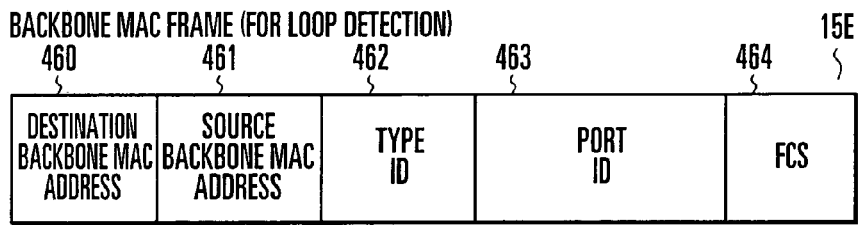
FIG. 33 is a view showing another format of the loop detection backbone MAC frame used in the edge Bridge according to the sixth embodiment of the present invention.

FIG. 33 is a view showing another format of the loop detection backbone MAC frame used in the edge Bridge according to the sixth embodiment of the present invention.

In a backbone MAC frame 15E shown in FIG. 33, a broadcast address or a multicast address defined for loop detection is used as a destination MAC address 460. The backbone MAC address of the edge Bridge to transmit is used as a source MAC address 461. A type defined for loop detection is used as a type ID 462. The port ID of a backbone-facing port to transmit is used as a port ID 463.

Figure 34:
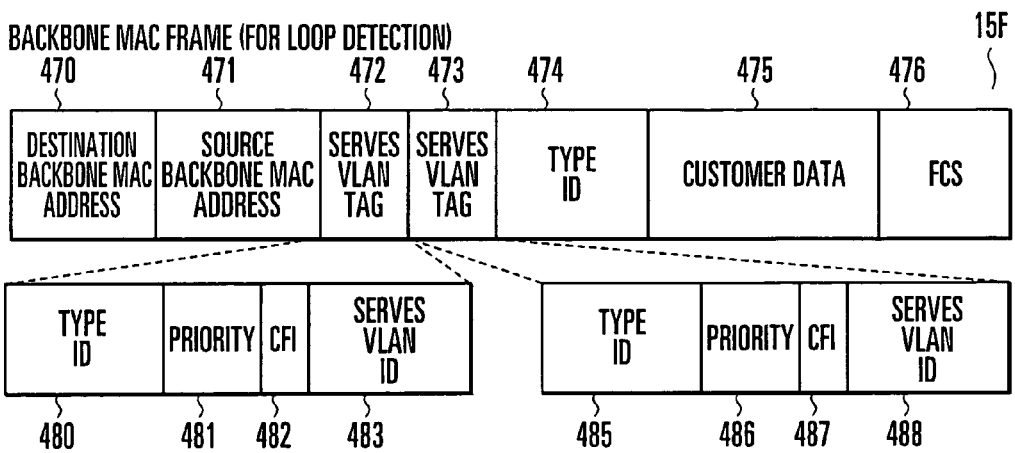
FIG. 34 is a view showing still another format of the loop detection backbone MAC frame used in the edge Bridge according to the sixth embodiment of the present invention.

FIG. 34 is a view showing still another format of the loop detection backbone MAC frame used in the edge Bridge according to the sixth embodiment of the present invention.

In a backbone MAC frame 15F shown in FIG. 34, a broadcast address or a multicast address defined for loop detection is used as a destination MAC address 470. The backbone MAC address of the edge Bridge to transmit or the backbone MAC address of the backbone-facing port to transmit is used as a source MAC address 471.

One of service LANs to forward, which are set in the edge Bridge, is used as Service VLAN IDs 483 and 488 in Service VLAN tags 472 and 473. The backbone MAC frame generation means 26C generates a loop detection backbone MAC frame for each of all Service VLANs set in the edge Bridge 2A. The number of Service VLAN tags is not limited to two in the example shown in FIG. 34. A type defined for loop detection is used as a type ID 474. Customer data 475 is an option or the port ID of the backbone-facing port to transmit.

The loop detection backbone MAC frame generated by the backbone MAC frame generation means 26C is sent from the backbone-facing ports 7A and 7B. If a loop is generated in a backbone network, the loop detection backbone MAC frame is received by the edge Bridge 2A which has generated the frame. The source address determination means 26A executes the above-described check and detects the loop.

When it is determined that the backbone MAC frame determined as a loop is received from a plurality of ports within a predetermined period, when a backbone MAC address is assigned to each backbone-facing port, and it is determined that the source address of the backbone MAC frame determined as a loop is different from the backbone MAC address of the backbone-facing port which has received the backbone MAC frame, or when the backbone MAC frame generation means 26C generates a backbone MAC frame containing a backbone-facing port ID, and it is determined that the backbone-facing port ID contained in the backbone MAC frame determined as a loop is different from the backbone-facing port ID of the backbone-facing port which has received the backbone MAC frame, the loop position determination means 26D determines that the loop can have passed through the edge Bridge.

As described above, according to this embodiment, the edge Bridge checks the source address or destination address of the backbone MAC frame, thereby identifying whether the backbone MAC frame is normal. If the received backbone MAC frame is abnormal, the backbone MAC frame is discarded. Especially when the source address belongs to the edge Bridge which has received the frame, it can be detected that the backbone MAC frame has returned by a loop.

According to the above embodiment, the position of the loop can be specified on the basis of the number of backbone-facing ports which have received the abnormal backbone MAC frame, the source backbone address of the abnormal backbone MAC frame, or the backbone-facing port ID.

The above embodiments are merely examples of the present invention. The present invention is not limited to these embodiments, and various changes and modifications can be made without departing from the spirit and scope of the present invention.

As described above, the customer MAC frame forwarding method according to the present invention is preferably executed by program control by a computer. The present invention can also be commercialized as a computer control program for it, and a computer-readable recording medium on which the program is recorded.

The invention claimed is:

1. A customer MAC frame forwarding method by an edge Bridge which includes a customer-facing port to transmit/receive a customer MAC frame and a backbone-facing port to transmit/receive a backbone MAC frame and in which a backbone MAC frame format containing at least a destination backbone MAC address, a source backbone MAC address, a Service VLAN ID, and a customer MAC frame is predetermined, one or a plurality of Service VLAN IDs corresponding to each customer-facing port are predetermined, and the customer MAC frame is forwarded only between customer-facing ports corresponding to the same Service VLAN ID, characterized by comprising the steps of:

when an origination-side edge Bridge receives the customer MAC frame from the customer-facing port, selecting the Service VLAN ID corresponding to the customer MAC frame from Service VLAN IDs corresponding to the customer-facing port;

determining, on the basis of at least one of the Service VLAN ID, a VLAN ID of the customer MAC frame, and a destination MAC address, at least one customer-facing port and backbone-facing port to transmit the customer MAC frame;

when it is determined that the customer MAC frame is to be transmitted from the backbone-facing port, encapsulating the customer MAC frame into a backbone MAC frame;

when a termination-side edge Bridge receives the backbone MAC frame from the backbone-facing port, setting the Service VLAN ID corresponding to the customer MAC frame contained in the backbone MAC frame to the Service VLAN ID contained in the backbone MAC frame;

determining, on the basis of at least one of the Service VLAN ID, the destination MAC address of the customer MAC frame contained in the backbone MAC frame, the VLAN ID, and the destination backbone MAC address of the backbone MAC frame, the customer-facing port and backbone-facing port to transmit the backbone MAC frame; and when the backbone MAC frame is to be transmitted from the customer-facing port, extracting the customer MAC frame from the backbone MAC frame.

2. The customer MAC frame forwarding method according to claim 1, characterized in that the predetermined backbone MAC frame format contains a first VLAN tag and a second VLAN tag, and the method further comprises the step of, when the backbone MAC frame is to be transmitted/received from the backbone-facing port, setting a value of the Service VLAN ID of the backbone MAC frame to a value generated from a value of a first Service VLAN ID contained in the first VLAN tag and a value of a second Service VLAN ID contained in the second VLAN tag.

3. The customer MAC frame forwarding method according to claim 1, characterized in that the predetermined backbone MAC frame format contains a plurality of VLAN tags, and the method further comprises the step of, when the backbone MAC frame is to be transmitted/received from the backbone-facing port, setting a value of the Service VLAN ID of the backbone MAC frame to a value generated from values of Service VLAN IDs contained in the plurality of VLAN tags.

4. The customer MAC frame forwarding method according to claim 1, characterized in that the edge Bridge has a forwarding table to search for one of a set of the destination backbone MAC address and the backbone-facing port and the customer-facing port by using a combination of at least one of the Service VLAN ID, the VLAN ID, and the destination MAC address as a search key, a flooding forwarding table to search for at least one backbone-facing port and customer-facing port by using a combination of at least one of the Service VLAN ID and the VLAN ID as a search key, and a backbone-facing port table to search for the backbone-facing port by using the destination backbone MAC address as a search key, and the method further comprises the steps of when the origination-side edge Bridge receives the backbone MAC frame from the backbone-facing port, registering, as the source backbone MAC address of the backbone MAC frame in the forwarding table, the destination backbone MAC address of the customer MAC frame which has the Service VLAN ID of the backbone MAC frame as the Service VLAN ID, the VLAN ID of the customer MAC frame contained in the backbone MAC frame as the VLAN ID, and the source MAC address of the customer MAC frame as the destination MAC address, registering, as the backbone-facing port in the backbone-facing port table, the backbone-facing port corresponding to a backbone frame which has the source backbone MAC address of the backbone MAC frame as the destination backbone MAC address, and when the customer MAC frame is received from the customer-facing port, registering, as the customer-facing port in the forwarding table, the customer-facing port corresponding to the customer MAC frame which has the Service VLAN ID corresponding to the customer MAC frame as the Service VLAN ID, the VLAN ID of the customer MAC frame as the VLAN ID, and the source MAC address as the destination MAC address.

5. The customer MAC frame forwarding method according to claim 4, characterized by further comprising the steps of when the origination-side edge Bridge receives the backbone MAC frame from the backbone-facing port, and the destination backbone MAC address of the backbone MAC frame is neither a MAC address assigned to the customer-facing port or backbone-facing port of the edge Bridge in advance nor a MAC address assigned to the edge Bridge in advance, searching the backbone-facing port table by using the destination backbone MAC address as the search key and determining the backbone-facing port to transmit the backbone MAC frame, when the destination backbone MAC address of the backbone MAC frame coincides with one of the MAC address assigned to the customer-facing port or backbone-facing port of the edge Bridge in advance and the MAC address assigned to the edge Bridge in advance, searching the forwarding table by using a combination of at least one of the Service VLAN ID, the VLAN ID, and the destination MAC address as the search key, and if a search result is present, determining one of the set of the destination backbone MAC address and backbone-facing port and the customer-facing port to transmit the backbone MAC frame, when the forwarding table is searched in the step, and no search result is present, searching the flooding forwarding table by using at least one of the Service VLAN ID and the VLAN ID as the search key, if a search result is present, determining at least one customer-facing port and backbone-facing port except the backbone-facing port which has received the backbone MAC frame to transmit the backbone MAC frame, and if the backbone MAC frame is to be transmitted from the backbone-facing port, setting the destination backbone MAC address to a broadcast address, when the flooding forwarding table is searched in the step, and no search result is present, discarding the backbone MAC frame, when the termination-side edge Bridge receives the customer MAC frame from the customer-facing port, searching the forwarding table by using a combination of at least one of the Service VLAN ID, the VLAN ID, and the destination MAC address as the search key, and if a search result is present, determining one of the set of the destination backbone MAC address and backbone-facing port and the customer-facing port to transmit the customer MAC frame, when the forwarding table is searched in the step, and no search result is present, searching the flooding forwarding table by using at least one of the Service VLAN ID and the VLAN ID as the search key, if a search result is present, determining at least one customer-facing port except the customer-facing port which has received the customer MAC frame and a backbone-facing port to transmit the customer MAC frame, and if the customer MAC frame is to be transmitted from the backbone-facing port, setting the destination backbone MAC address to a broadcast address, and when the flooding forwarding table is searched in the step, and no search result is present, discarding the customer MAC frame.

6. The customer MAC frame forwarding method according to claim 1, characterized by further comprising the step of, when the customer MAC frame is received from the customer-facing port, and a single Service VLAN ID corresponds to the customer-facing port, setting the Service VLAN ID to the Service VLAN ID of the customer MAC frame.

7. The customer MAC frame forwarding method according to claim 1, characterized by further comprising the step of, when the customer MAC frame is to be transmitted from the customer-facing port, transmitting the customer MAC frame only when one of the Service VLAN IDs corresponding to the customer-facing port coincides with the Service VLAN ID corresponding to the customer MAC frame.

8. The customer MAC frame forwarding method according to claim 1, characterized by further comprising the step of, when a relationship is predetermined so that the VLAN ID corresponds, in a one-to-many correspondence, to the single Service VLAN ID or the plurality of Service VLAN IDs corresponding to the customer-facing port, when the customer MAC frame is received from the customer-facing port, and the plurality of Service VLAN IDs correspond to the customer-facing port, determining the Service VLAN ID of the customer MAC frame to the Service VLAN ID of the customer-facing port corresponding to the Service VLAN ID of the customer MAC frame.

9. The customer MAC frame forwarding method according to claim 6, characterized by further comprising the steps of when a set of at least one of the Service VLAN ID and the VLAN ID and a conversion relationship of the set of at least one of the Service VLAN ID and the VLAN ID are predetermined for each customer-facing port, when the customer MAC frame is received from the customer-facing port, and the Service VLAN ID of the customer MAC frame is determined by a method of any one of claims 6 to 8, converting a combination of at least one of the Service VLAN ID corresponding to the customer-facing port and the customer MAC frame and the VLAN ID of the customer MAC frame into both or one of the predetermined Service VLAN ID and VLAN ID, and adding a VLAN tag representing the VLAN ID to the customer MAC frame.

10. The customer MAC frame forwarding method according to claim 1, characterized by further comprising the steps of
when a set of at least one of the Service VLAN ID and the VLAN ID and a conversion relationship of the set of at least one of the Service VLAN ID and the VLAN ID are predetermined for each customer-facing port,
when the customer MAC frame is to be transmitted from the customer-facing port, converting a combination of at least one of the Service VLAN ID corresponding to the customer-facing port and the customer MAC frame, the VLAN ID of the customer MAC frame, and the destination MAC address into both or one of the predetermined Service VLAN ID and VLAN ID, and
when the customer MAC frame contains a VLAN tag, and the VLAN ID of the customer MAC frame is determined to a value which requires no predetermined VLAN tag, removing the VLAN tag of the customer MAC frame.

11. The customer MAC frame forwarding method according to claim 1, characterized by further comprising the step of
when a set of at least one of the Service VLAN ID, the VLAN ID, the source MAC address, and the destination MAC address and a correspondence relationship of transmission or discard are predetermined for each customer-facing port,
when the customer MAC frame is received from the customer-facing port, determining whether to transmit or discard the customer MAC frame on the basis of a combination of at least one of the Service VLAN ID corresponding to the customer MAC frame, the VLAN ID of the customer MAC frame, the source MAC address, and the destination MAC address.

12. The customer MAC frame forwarding method according to claim 1, characterized by further comprising the step of
when a set of at least one of the Service VLAN ID, the VLAN ID, the source MAC address, and the destination MAC address and a correspondence relationship of transmission or discard are predetermined for each customer-facing port,
when the customer MAC frame is to be transmitted from the customer-facing port, determining whether to transmit or discard the customer MAC frame on the basis of a combination of at least one of the Service VLAN ID corresponding to the customer MAC frame, the VLAN ID of the customer MAC frame, the source MAC address, and the destination MAC address.

13. The customer MAC frame forwarding method according to claim 1, characterized by further comprising the step of using a MAC address predetermined for the backbone-facing port as the source backbone MAC address of the backbone MAC frame to be transmitted from the backbone-facing port to a backbone network.

14. The customer MAC frame forwarding method according to claim 1, characterized by further comprising the step of using a MAC address predetermined for the customer-facing port as the source backbone MAC address in encapsulating the customer MAC frame received from the customer-facing port into the backbone MAC frame.

15. The customer MAC frame forwarding method according to claim 1, characterized by further comprising the step of using a MAC address uniquely predetermined for each edge Bridge as the source backbone MAC address of the backbone MAC frame to be transmitted from the edge Bridge to a backbone network.

16. The customer MAC frame forwarding method according to claim 1, characterized in that the backbone MAC frame format containing at least the destination backbone MAC address, the source backbone MAC address, the Service VLAN ID, and the customer MAC frame is predetermined, and a stacked VLAN/MAC frame format obtained by adding a Provider VLAN ID to the customer MAC frame is predetermined, and
the method further comprises the steps of
when a stacked VLAN/MAC frame is received from a stacked VLAN port of the edge Bridge, determining the Service VLAN ID corresponding to the customer MAC frame on the basis of at least one of the Provider VLAN ID contained in the stacked VLAN/MAC frame, the VLAN ID of the customer MAC frame with the Provider VLAN ID, and the stacked VLAN port,
determining, on the basis of at least one of the Service VLAN ID, the Provider VLAN ID, the VLAN ID, and the destination MAC address of the customer MAC frame, at least one stacked VLAN port and backbone-facing port to transmit the customer MAC frame,
when it is determined that the customer MAC frame is to be transmitted from the backbone-facing port, encapsulating the customer MAC frame into the backbone MAC frame,
when the backbone MAC frame is received from the backbone-facing port, setting the Service VLAN ID contained in the backbone MAC frame to the Service VLAN ID corresponding to the customer MAC frame contained in the backbone MAC frame,
determining, on the basis of at least one of the Service VLAN ID, the destination MAC address of the customer MAC frame, the VLAN ID, and the destination backbone MAC address of the backbone MAC frame, the stacked VLAN port and backbone-facing port to transmit the customer MAC frame,
when the customer MAC frame is to be transmitted from the stacked VLAN port, determining, on the basis of at least one of the Service VLAN ID, the VLAN ID, and the stacked VLAN port, the Provider VLAN ID to be added to the customer MAC frame, and
adding the Provider VLAN ID to the customer MAC frame to convert the customer MAC frame into the stacked VLAN/MAC frame.

17. The customer MAC frame forwarding method according to claim 16, characterized in that the predetermined backbone MAC frame format contains a first VLAN tag and a second VLAN tag, and
the method further comprises the step of, when the backbone MAC frame is to be transmitted/received from the backbone-facing port, setting a value of the Service VLAN ID of the backbone MAC frame to a value generated from a value of a first Service VLAN ID contained in the first VLAN tag and a value of a second Service VLAN ID contained in the second VLAN tag.

18. The customer MAC frame forwarding method according to claim 16, characterized in that the predetermined backbone MAC frame format contains a plurality of VLAN tags, and
the method further comprises the step of, when the backbone MAC frame is to be transmitted/received from the backbone-facing port, setting a value of the Service VLAN ID of the backbone MAC frame to a value generated from values of Service VLAN IDs contained in the plurality of VLAN tags.

19. The customer MAC frame forwarding method according to claim 16, characterized by further comprising the steps of
when the stacked VLAN/MAC frame is received from the stacked VLAN port, adding the Provider VLAN ID contained in the stacked VLAN/MAC frame to a predetermined part of the Service VLAN ID corresponding to the customer MAC frame with the Provider VLAN ID, and setting a predetermined value to the predetermined part of the Service VLAN ID corresponding to the customer MAC frame.

20. The customer MAC frame forwarding method according to claim 16, characterized by further comprising the step of, when the customer MAC frame is to be transmitted from the stacked VLAN port, setting a predetermined part of the Service VLAN ID corresponding to the customer MAC frame to the Provider VLAN ID to be added to the customer MAC frame.

21. The customer MAC frame forwarding method according to claim 16, characterized in that the edge Bridge has a Service VLAN ID search table to search for the Service VLAN ID by using a combination of at least one of the Provider VLAN ID, the VLAN ID, and the stacked VLAN port as a search key, and
the method further comprises the steps of
when the stacked VLAN/MAC frame is received from the stacked VLAN port, setting the Provider VLAN ID contained in the stacked VLAN/MAC frame to a predetermined part of the Service VLAN ID corresponding to the customer MAC frame with the Provider VLAN ID, and
searching the Service VLAN ID search table by using a combination of at least one of the Provider VLAN ID, the VLAN ID of the customer MAC frame, and the stacked VLAN port as the search key to determine the predetermined part of the Service VLAN ID corresponding to the customer MAC frame.

22. The customer MAC frame forwarding method according to claim 16, characterized in that the edge Bridge has a VLAN ID search table to search for the VLAN ID by using a combination of at least one of a part of the Service VLAN ID, the VLAN ID, and the stacked VLAN port as a search key, and
the method further comprises the steps of
when the customer MAC frame is to be transmitted from the stacked VLAN port, setting a predetermined part of the Service VLAN ID corresponding to the customer MAC frame as the Provider VLAN ID to be assigned to the customer MAC frame, and
searching the VLAN ID search table by using a combination of at least one of the predetermined part of the Service VLAN ID, the VLAN ID of the customer MAC frame, and the stacked VLAN port as the search key to determine the VLAN ID contained in the customer MAC frame.

23. The customer MAC frame forwarding method according to claim 16, characterized in that the edge Bridge has a Service VLAN ID search table to search for the Service VLAN ID and the VLAN ID by using a combination of at least one of the Provider VLAN ID, the VLAN ID, and the stacked VLAN port as a search key, and
the method further comprises the step of, when the stacked VLAN/MAC frame is received from the stacked VLAN port, searching the Service VLAN ID search table by using a combination of at least one of the Provider VLAN ID contained in the stacked VLAN/MAC frame, the VLAN ID of the customer MAC frame with the Provider VLAN ID, and the stacked VLAN port as the search key to determine the Service VLAN ID and VLAN ID corresponding to the customer MAC frame.

24. The customer MAC frame forwarding method according to claim 16, characterized in that the edge Bridge has a Provider VLAN ID search table to search for the Provider VLAN ID and the VLAN ID by using a combination of at least one of the Service VLAN ID, the VLAN ID, and the stacked VLAN port as a search key, and
the method further comprises the step of, when the customer MAC frame is to be transmitted from the stacked VLAN port, searching the Provider VLAN ID search table by using a combination of at least one of the Service VLAN ID of the customer MAC frame, the VLAN ID, and the stacked VLAN port as the search key to determine the Provider VLAN ID contained in the stacked VLAN/MAC frame and the VLAN ID of the customer MAC frame.

25. The customer MAC frame forwarding method according to claim 1, characterized in that the edge Bridge is assigned one or a plurality of backbone MAC addresses in advance, and
the method further comprises one or both of the steps of,
when the backbone MAC frame is received,
checking whether the source backbone MAC address of the backbone MAC frame coincides with any one of a single predetermined address or a plurality of predetermined addresses or none of the single predetermined address or the plurality of predetermined addresses, and when the check result indicates coincidence, determining that the backbone MAC frame is an abnormal MAC frame, and discarding the backbone MAC frame, and
checking whether the destination backbone MAC address of the backbone MAC frame coincides with any one of a single predetermined address or a plurality of predetermined addresses or none of the single predetermined address or the plurality of predetermined addresses, and when the check result indicates coincidence, determining that the backbone MAC frame is an abnormal MAC frame, and discarding the backbone MAC frame.

26. The customer MAC frame forwarding method according to claim 25, characterized by further comprising the steps of,
when the backbone MAC frame is received from the backbone-facing port,
checking whether the source backbone MAC address of the backbone MAC frame coincides with any one of backbone MAC addresses assigned to the edge Bridge in advance, and
when the check result indicates coincidence, determining that the backbone MAC frame is the abnormal MAC frame, and discarding the backbone MAC frame.

27. The customer MAC frame forwarding method according to claim 26, characterized by further comprising the steps of
when the check result indicates that one backbone-facing port has received the abnormal MAC frame within a predetermined period, determining that the edge Bridge is outside a loop, and
when a plurality of backbone-facing ports have received the abnormal MAC frame within the predetermined period, determining that the loop probably passes through the edge Bridge.

28. The customer MAC frame forwarding method according to claim 26, characterized in that in the edge Bridge, a single backbone MAC address is predetermined for each backbone-facing port, and
the method further comprises the steps of
when it is revealed by the check that a source address of the abnormal MAC frame coincides with the backbone MAC address predetermined for the backbone-facing port which has received the abnormal MAC frame, determining that the edge Bridge is outside a loop, and when the addresses do not coincide, determining that the loop probably passes through the edge Bridge.

29. The customer MAC frame forwarding method according to claim 25, characterized by further comprising the steps of,
when the backbone MAC frame is received from the backbone-facing port,
checking whether the source backbone MAC address of the backbone MAC frame is one of a multicast address and a broadcast address, and
when the check result indicates coincidence, determining that the backbone MAC frame is an abnormal MAC frame, and discarding the backbone MAC frame.

30. The customer MAC frame forwarding method according to claim 25, characterized by further comprising the steps of,
when the backbone MAC frame is received from the backbone-facing port,
checking whether to execute loop-back forwarding between the backbone-facing ports,
when the check result indicates incoincidence, checking whether the destination backbone MAC address of the backbone MAC frame is a unicast address which is not assigned to the edge Bridge, and
when the check result indicates coincidence, determining that the backbone MAC frame is an abnormal MAC frame, and discarding the backbone MAC frame.

31. The customer MAC frame forwarding method according to claim 25, characterized in that in the edge Bridge, a single backbone MAC address is predetermined, and
the method further comprises the step of transmitting, from all of the backbone-facing ports set in advance to transmit, the backbone MAC frame having the destination backbone MAC address set to one of a broadcast address and a predetermined multicast address and the source backbone MAC address set to the backbone MAC address predetermined in the edge Bridge periodically at a predetermined interval, in accordance with a predetermined event, or at an arbitrary timing corresponding to an instruction of an administrator of the edge Bridge.

32. The customer MAC frame forwarding method according to claim 25, characterized in that in the edge Bridge, a single backbone MAC address is predetermined for each backbone-facing port, and
the method further comprises the step of transmitting, from all of the backbone-facing ports set in advance to transmit, the backbone MAC frame having the destination backbone MAC address set to one of a broadcast address and a predetermined multicast address and the source backbone MAC address set to the backbone MAC address predetermined for the backbone-facing port to transmit periodically at a predetermined interval, in accordance with a predetermined event, or at an arbitrary timing corresponding to an instruction of an administrator of the edge Bridge.

33. The customer MAC frame forwarding method according to claim 25, characterized in that in the edge Bridge, a single backbone MAC address is predetermined,
a backbone-facing port ID is predetermined for each backbone-facing port in advance, and
the method further comprises the step of transmitting, from all of the backbone-facing ports set in advance to transmit, the backbone MAC frame having the destination backbone MAC address set to one of a broadcast address and a predetermined multicast address and the source backbone MAC address set to the backbone MAC address predetermined in the edge Bridge and containing the backbone-facing port ID predetermined for the backbone-facing port to transmit periodically at a predetermined interval, in accordance with a predetermined event, or at an arbitrary timing corresponding to an instruction of an administrator of the edge Bridge.

34. The customer MAC frame forwarding method according to claim 31, characterized in that in the edge Bridge, one or a plurality of Service VLAN IDs to be forwarded by the edge Bridge itself are predetermined, and
the method further comprises the step of transmitting the backbone MAC frame having the Service VLAN ID as the Service VLAN ID for each Service VLAN ID.

35. The customer MAC frame forwarding method according to claim 25, characterized by further comprising the step of determining, in the check, that a loop is probably present from the Service VLAN ID contained in the abnormal MAC frame to a Service VLAN indicated by the Service VLAN ID.

36. The customer MAC frame forwarding method according to claim 25, characterized by further comprising the steps of
when it is revealed by the check that a backbone-facing port ID contained in the abnormal MAC frame coincides with a backbone-facing port ID predetermined for the backbone-facing port which has received the abnormal MAC frame, determining that the edge Bridge is outside a loop, and
when the backbone-facing port IDs do not coincide, determining that the loop probably passes through the edge Bridge.

37. The customer MAC frame forwarding method according to claim 25, characterized by further comprising the step of
when the backbone MAC frame is determined as the abnormal MAC frame,
closing some or all of the backbone-facing ports which have received the backbone MAC frame.

38. The customer MAC frame forwarding method according to claim 25, characterized by further comprising the step of
when the backbone MAC frame is determined as the abnormal MAC frame,
decreasing one of a priority and a band of the backbone MAC frame to be transmitted from some or all of the backbone-facing ports which have received the backbone MAC frame.

39. The customer MAC frame forwarding method according to claim 25, characterized by further comprising the step of
when the backbone MAC frame is determined as the abnormal MAC frame,
displaying warning of reception of the abnormal backbone MAC frame on an administration apparatus of the edge Bridge.

40. The customer MAC frame forwarding method according to claim 25, characterized by further comprising the steps of
when the backbone MAC frame is determined as the abnormal MAC frame,
displaying warning of loop generation on an administration apparatus of the edge Bridge,
displaying, on the administration apparatus, the number of backbone-facing ports which have received the abnormal MAC frame,
when one backbone-facing port has received the abnormal MAC frame, displaying, on the administration apparatus, that the edge Bridge is outside the loop, and when a plurality of backbone-facing ports have received the abnormal MAC frame, displaying, on the administration apparatus, that the loop probably passes through the edge Bridge.

41. An edge Bridge of a system in which a backbone MAC frame format containing at least a destination backbone MAC address, a source backbone MAC address, a Service VLAN ID, and a customer MAC frame is predetermined, and one or a plurality of Service VLAN IDs corresponding to each customer-facing port are predetermined, characterized by comprising:

means, having a customer-facing port to transmit/receive a customer MAC frame and a backbone-facing port to transmit/receive a backbone MAC frame, for forwarding the customer MAC frame only between customer-facing ports corresponding to the same Service VLAN ID; and storage means for storing a forwarding table to search for one of a set of the destination backbone MAC address and backbone-facing port and the customer-facing port by using a combination of at least one of the Service VLAN ID, the VLAN ID, and the destination MAC address as a search key, a flooding forwarding table to search for at least one backbone-facing port and customer-facing port by using a combination of at least one of the Service VLAN ID and the VLAN ID as a search key, and a backbone-facing port table to search for the backbone-facing port by using the destination backbone MAC address as a search key.

42. The edge Bridge according to claim 41, characterized in that the backbone MAC frame format containing at least the destination backbone MAC address, the source backbone MAC address, the Service VLAN ID, and the customer MAC frame is predetermined, and a stacked VLAN/MAC frame format obtained by adding a Provider VLAN ID to the customer MAC frame is predetermined, and the edge Bridge further comprises first means for, when a stacked VLAN/MAC frame is received from a stacked VLAN port, determining the Service VLAN ID corresponding to the customer MAC frame on the basis of at least one of the Provider VLAN ID contained in the stacked VLAN/MAC frame, the VLAN ID of the customer MAC frame with the Provider VLAN ID, and the stacked VLAN port, second means for determining, on the basis of at least one of the Service VLAN ID, the Provider VLAN ID, the VLAN ID, and the destination MAC address of the customer MAC frame, at least one stacked VLAN port and backbone-facing port to transmit the customer MAC frame, third means for, when it is determined that the customer MAC frame is to be transmitted from the backbone-facing port, encapsulating the customer MAC frame into the backbone MAC frame, fourth means for, when the backbone MAC frame is received from the backbone-facing port, setting the Service VLAN ID contained in the backbone MAC frame to the Service VLAN ID corresponding to the customer MAC frame contained in the backbone MAC frame, fifth means for determining, on the basis of at least one of the Service VLAN ID, the destination MAC address of the customer MAC frame, the VLAN ID, and the destination backbone MAC address of the backbone MAC frame, the stacked VLAN port and backbone-facing port to transmit the customer MAC frame, sixth means for, when the customer MAC frame is to be transmitted from the stacked VLAN port, determining, on the basis of at least one of the Service VLAN ID, the VLAN ID, and the stacked VLAN port, the Provider VLAN ID to be added to the customer MAC frame, and seventh means for adding the Provider VLAN ID to the customer MAC frame to convert the customer MAC frame into the stacked VLAN/MAC frame.

43. The edge Bridge according to claim 42, characterized by further comprising means for discriminating that the predetermined backbone MAC frame format contains a first VLAN tag and a second VLAN tag, and means for, when the backbone MAC frame is to be transmitted/received from the backbone-facing port, setting a value of the Service VLAN ID of the backbone MAC frame to a value generated from a value of a first Service VLAN ID contained in the first VLAN tag and a value of a second Service VLAN ID contained in the second VLAN tag.

44. The edge Bridge according to claim 42, characterized by further comprising means for discriminating that the predetermined backbone MAC frame format contains a plurality of VLAN tags, and means for, when the backbone MAC frame is to be transmitted/received from the backbone-facing port, setting a value of the Service VLAN ID of the backbone MAC frame to a value generated from values of Service VLAN IDs contained in the plurality of VLAN tags.

45. The edge Bridge according to claim 41, characterized in that the backbone MAC frame format containing at least the destination backbone MAC address, the source backbone MAC address, the Service VLAN ID, and the customer MAC frame is predetermined, the edge Bridge is assigned one or a plurality of backbone MAC addresses in advance, and the edge Bridge further comprises means for checking whether the source backbone MAC address of the backbone MAC frame coincides with any one of a single or a plurality of predetermined addresses or none of the single predetermined address or the plurality of predetermined addresses, and when the check result indicates coincidence, determining that the backbone MAC frame is an abnormal MAC frame, and discarding the backbone MAC frame.

* * * * *